US007246030B2

(12) United States Patent
Raab et al.

(10) Patent No.: US 7,246,030 B2
(45) Date of Patent: Jul. 17, 2007

(54) PORTABLE COORDINATE MEASUREMENT MACHINE WITH INTEGRATED LINE LASER SCANNER

(75) Inventors: Simon Raab, Maitland, FL (US); Seyed Ali Sajedi, Winter Park, FL (US); Paul Christopher Atwell, Longwood, FL (US); Joel Wyatt Upchurch, Orlando, FL (US); Jacint R. Barba, Lake Mary, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 11/334,091

(22) Filed: Jan. 18, 2006

(65) Prior Publication Data

US 2006/0129349 A1 Jun. 15, 2006

Related U.S. Application Data

(63) Continuation-in-part of application No. 11/141,444, filed on May 31, 2005, now Pat. No. 7,050,930, which is a continuation of application No. 10/366,678, filed on Feb. 13, 2003, now Pat. No. 6,965,843.

(60) Provisional application No. 60/394,908, filed on Jul. 10, 2002, provisional application No. 60/357,599, filed on Feb. 14, 2002.

(51) Int. Cl.
*G06F 15/00* (2006.01)

(52) U.S. Cl. ............... 702/152; 702/150; 702/151; 702/155; 702/159

(58) Field of Classification Search ............... 702/150, 702/151, 152, 155, 159; 356/4.02, 5.01; 33/503, 556, 559, 561; 382/254, 266, 279; 358/412, 486
See application file for complete search history.

(56) References Cited

U.S. PATENT DOCUMENTS

| 2,906,179 | A | 9/1959 | Bower |
| 3,531,868 | A | 10/1970 | Stevenson |
| 3,944,798 | A | 3/1976 | Eaon |
| 3,945,124 | A | 3/1976 | Jacob et al. |
| 3,945,129 | A | 3/1976 | Bergkvist |
| 4,136,458 | A | 1/1979 | Bell et al. |
| 4,153,990 | A | 5/1979 | Kamimura |
| 4,153,998 | A | 5/1979 | McMurtry |

(Continued)

FOREIGN PATENT DOCUMENTS

DE 2711593 9/1978

(Continued)

OTHER PUBLICATIONS

English Abstract for JP 06313710 dated Nov. 8, 1994.

(Continued)

*Primary Examiner*—Bryan Bui
(74) *Attorney, Agent, or Firm*—Cantor Colburn LLP

(57) ABSTRACT

A portable coordinate measurement machine for measuring the position of an object in a selected volume includes a positionable articulated arm having a plurality of jointed arm segments. The arm includes a measurement probe having an integrated line laser scanner mounted thereon. The laser may be a thermally stabilized laser.

28 Claims, 60 Drawing Sheets

U.S. PATENT DOCUMENTS

| | | |
|---|---|---|
| 4,274,205 A | 6/1981 | Starr et al. |
| 4,301,338 A | 11/1981 | McMurtry |
| 4,313,263 A | 2/1982 | McMurtry |
| 4,333,238 A | 6/1982 | McMurtry |
| 4,338,722 A | 7/1982 | Delmas |
| 4,384,407 A | 5/1983 | Miyamoto |
| 4,430,796 A | 2/1984 | Nakagawa |
| 4,449,191 A | 5/1984 | Mehnert |
| 4,449,292 A | 5/1984 | Kaufman |
| 4,492,036 A | 1/1985 | Beckwith, Jr. |
| 4,516,327 A | 5/1985 | Kanda et al. |
| 4,567,462 A | 1/1986 | Leiby |
| 4,570,065 A | 2/1986 | Pryor |
| 4,571,834 A | 2/1986 | Fraser et al. |
| 4,580,046 A | 4/1986 | Sasaki et al. |
| 4,580,047 A | 4/1986 | Sasaki et al. |
| 4,593,470 A | 6/1986 | Davies |
| 4,606,696 A | 8/1986 | Slocum |
| 4,653,011 A | 3/1987 | Iwano |
| 4,662,814 A | 5/1987 | Suzuki et al. |
| 4,675,502 A | 6/1987 | Haefner et al. |
| 4,676,002 A | 6/1987 | Slocum |
| 4,679,331 A | 7/1987 | Koontz |
| 4,703,443 A | 10/1987 | Moriyasu |
| 4,730,923 A | 3/1988 | Kosugi et al. |
| 4,769,763 A | 9/1988 | Trieb et al. |
| 4,779,211 A | 10/1988 | March |
| 4,786,847 A | 11/1988 | Daggett et al. |
| 4,791,934 A | 12/1988 | Brunnett |
| 4,808,064 A | 2/1989 | Bartholet |
| 4,819,195 A | 4/1989 | Bell et al. |
| 4,888,877 A | 12/1989 | Enderle et al. |
| 4,891,889 A | 1/1990 | Tomelleri |
| 4,932,131 A | 6/1990 | McMurtry et al. |
| 4,937,759 A | 6/1990 | Vold |
| 4,937,769 A | 6/1990 | Verbanets |
| 4,939,678 A | 7/1990 | Beckwith, Jr. |
| 4,945,501 A | 7/1990 | Bell et al. |
| 4,990,767 A | 2/1991 | Ernst et al. |
| 5,008,555 A | 4/1991 | Mundy |
| 5,040,306 A | 8/1991 | McMurtry et al. |
| 5,050,608 A | 9/1991 | Watanabe et al. |
| 5,065,013 A | 11/1991 | Taylor |
| 5,084,981 A | 2/1992 | McMurtry et al. |
| 5,086,401 A | 2/1992 | Glassman et al. |
| 5,088,046 A | 2/1992 | McMurtry |
| 5,088,055 A | 2/1992 | Oyama |
| 5,104,225 A | 4/1992 | Masreliez |
| 5,111,590 A | 5/1992 | Park |
| 5,126,736 A | 6/1992 | Okutani |
| 5,146,691 A | 9/1992 | McMurtry |
| 5,148,377 A | 9/1992 | McDonald |
| 5,174,039 A | 12/1992 | Mural |
| 5,187,874 A | 2/1993 | Takahaski et al. |
| 5,189,797 A | 3/1993 | Granger |
| 5,189,806 A | 3/1993 | McMurtry et al. |
| 5,204,824 A | 4/1993 | Fujimaki |
| 5,230,623 A | 7/1993 | Guthrie et al. |
| 5,237,390 A | 8/1993 | Chaney |
| 5,251,127 A | 10/1993 | Raab |
| 5,251,156 A | 10/1993 | Heier et al. |
| 5,259,120 A | 11/1993 | Chapman et al. |
| 5,268,953 A | 12/1993 | Van Viljimen |
| 5,274,203 A | 12/1993 | Skalski et al. |
| 5,276,974 A | 1/1994 | Chanoni et al. |
| D344,279 S | 2/1994 | Koyama et al. |
| 5,283,682 A | 2/1994 | Ostaszewski |
| 5,396,712 A | 3/1995 | Herzog |
| 5,402,582 A | 4/1995 | Raab |
| 5,411,502 A | 5/1995 | Zair |
| 5,412,880 A | 5/1995 | Raab |
| 5,424,835 A | 6/1995 | Cosnard et al. |
| 5,430,643 A | 7/1995 | Seraji |
| 5,486,923 A | 1/1996 | Mitchell et al. |
| 5,502,377 A | 3/1996 | Freund |
| 5,510,977 A | 4/1996 | Raab |
| 5,519,393 A | 5/1996 | Brandestini |
| 5,559,600 A | 9/1996 | Mitchell |
| D377,932 S | 2/1997 | Shena et al. |
| 5,610,846 A | 3/1997 | Trapet et al. |
| 5,611,147 A | 3/1997 | Raab |
| 5,669,150 A | 9/1997 | Guertin et al. |
| 5,724,264 A | 3/1998 | Rosenberg et al. |
| 5,724,745 A | 3/1998 | Brenner et al. |
| 5,768,792 A | 6/1998 | Raab |
| 5,807,449 A | 9/1998 | Hooker et al. |
| 5,829,148 A | 11/1998 | Eaton |
| 5,899,658 A | 5/1999 | Hofmeister |
| D410,477 S | 6/1999 | Nihei et al. |
| 5,909,939 A | 6/1999 | Fugmann |
| 5,926,782 A | 7/1999 | Raab |
| 5,956,857 A | 9/1999 | Raab |
| 5,978,748 A | 11/1999 | Raab |
| 5,991,704 A | 11/1999 | Rekar et al. |
| D423,534 S | 4/2000 | Raab et al. |
| 6,044,569 A | 4/2000 | Ogihara et al. |
| 6,064,497 A | 5/2000 | Hannah |
| 6,081,339 A | 6/2000 | Southam et al. |
| 6,131,299 A | 10/2000 | Raab et al. |
| 6,151,789 A | 11/2000 | Raab et al. |
| 6,157,188 A | 12/2000 | Steinke |
| 6,215,119 B1 | 4/2001 | Markham et al. |
| 6,219,928 B1 | 4/2001 | Raab et al. ............... 33/503 |
| 6,253,458 B1 | 7/2001 | Raab et al. |
| 6,271,661 B2 | 8/2001 | Andermo et al. |
| 6,298,569 B1 | 10/2001 | Raab et al. |
| 6,366,831 B1 | 4/2002 | Raab |
| 6,435,297 B1 | 8/2002 | Barber et al. |
| 6,435,315 B1 | 8/2002 | Zaharia |
| 6,493,957 B1 | 12/2002 | Takatsuji et al. |
| 6,519,860 B1 | 2/2003 | Bieg et al. |
| 6,543,149 B1 | 4/2003 | Carlisle |
| 6,612,048 B2 | 9/2003 | Peterlechner et al. |
| 6,668,466 B1 | 12/2003 | Bieg et al. |
| 7,050,930 B2 * | 5/2006 | Raab et al. ............... 702/152 |

FOREIGN PATENT DOCUMENTS

| | | |
|---|---|---|
| DE | 3527128 | 1/1987 |
| DE | 4231040 A1 | 3/1994 |
| DE | 10112977 C1 | 2/2002 |
| DE | 10053033 | 5/2002 |
| EP | 0 155 084 A1 | 9/1985 |
| EP | 0 302 194 A2 | 2/1989 |
| EP | 0395811 | 9/1989 |
| EP | 0 640 902 A2 | 3/1995 |
| EP | 0 735 653 A1 | 10/1996 |
| FR | 86 06186 | 4/1986 |
| FR | 2634379 | 7/1988 |
| FR | 2 634 279 | 1/1990 |
| GB | 2264601 A | 1/1993 |
| GB | 2264602 A | 1/1993 |
| GB | 2 264 601 A | 9/1993 |
| GB | 2 264 602 A | 9/1993 |
| JP | 56062783 | 5/1981 |
| JP | 57073602 | 5/1982 |
| JP | 2168303 | 6/1990 |
| JP | 2212085 | 8/1990 |
| JP | 02309223 | 12/1990 |
| WO | WO94/15173 | 7/1994 |
| WO | WO98/08050 | 2/1998 |
| WO | WO01/63202 A1 | 2/2001 |

| | | |
|---|---|---|
| WO | WO03/069266 A2 | 8/2003 |

OTHER PUBLICATIONS

English Abstract for JP 07178689 dated Jul. 18, 1995.
Faro Gold Arm-Marketed 1998.
PCT International Preliminary Examination Report dated May 6, 2004 for PCT/US 03/04312.
PCT International Preliminary Examination Report dated May 6, 2004 for PCT/US 03/04319.
PCT Search Report PCT/US03/04312 dated Feb. 13, 2003.
PCT International Search Report for PCT/US2004/026387 dated Nov. 30, 2004.
PCT International Search Report for PCT/US2004/026388 dated Dec. 28, 2004.
PCT International Search Report for PCT/US2004/026260 dated Dec. 28, 2004.
PERCEPTRON, [online]; [retrieved on Feb. 6, 2003] from the Internet http://www.perceptron.com.
Scan Works Lite, [online]; [retrieved on Jan. 18, 2002] from the Internet http://scanworks.perceptron.com.
ROMER, [online]; [retrieved on Feb. 7, 2003]; retrieved from the Internet http://www.romer.fr.
Kreon Technologies, [online]; [retrieved on Feb. 11, 2003]; retrieved from the Internet http://www.kreon3d.com.
MODELMAKER, [online], [retrieved on Feb. 11, 2003]; retrieved from the Internet http://www.3dscanners.com.
OPTIMET, [online], [retrieved on Feb. 11, 2003]; retrieved from the Internet http://www.optimet.com.
Takehis Komino, "Three Dimensional Coordinate Measuring System" Vectoron, Model VSC-07, VSC-14, vol. 30, No. 12, pp. 52-59, no date.
PCT Search Report PCT/US 03/04319.
PCT Search Report PCT/US 03/04289.
Romer Brochure Re: G-SCAN RX (5 pgs.); Sep. 27, 2004.

* cited by examiner

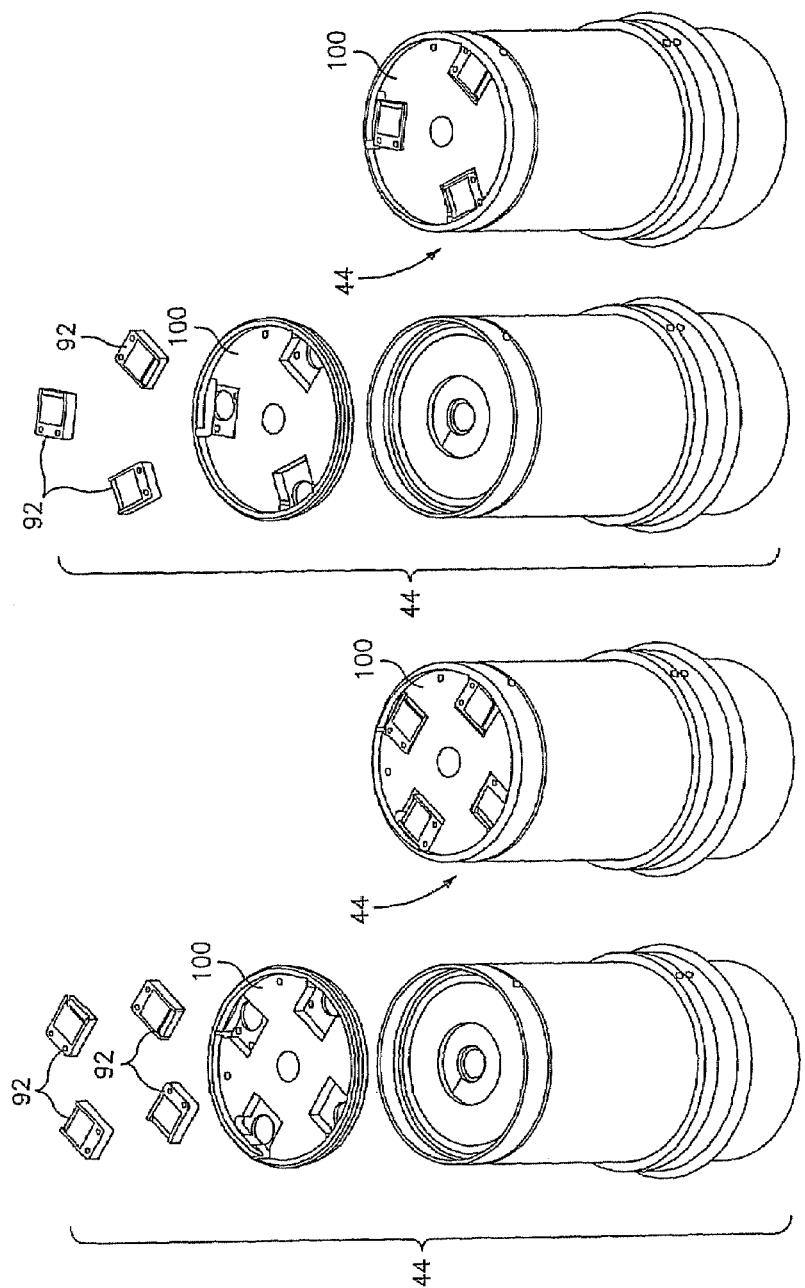

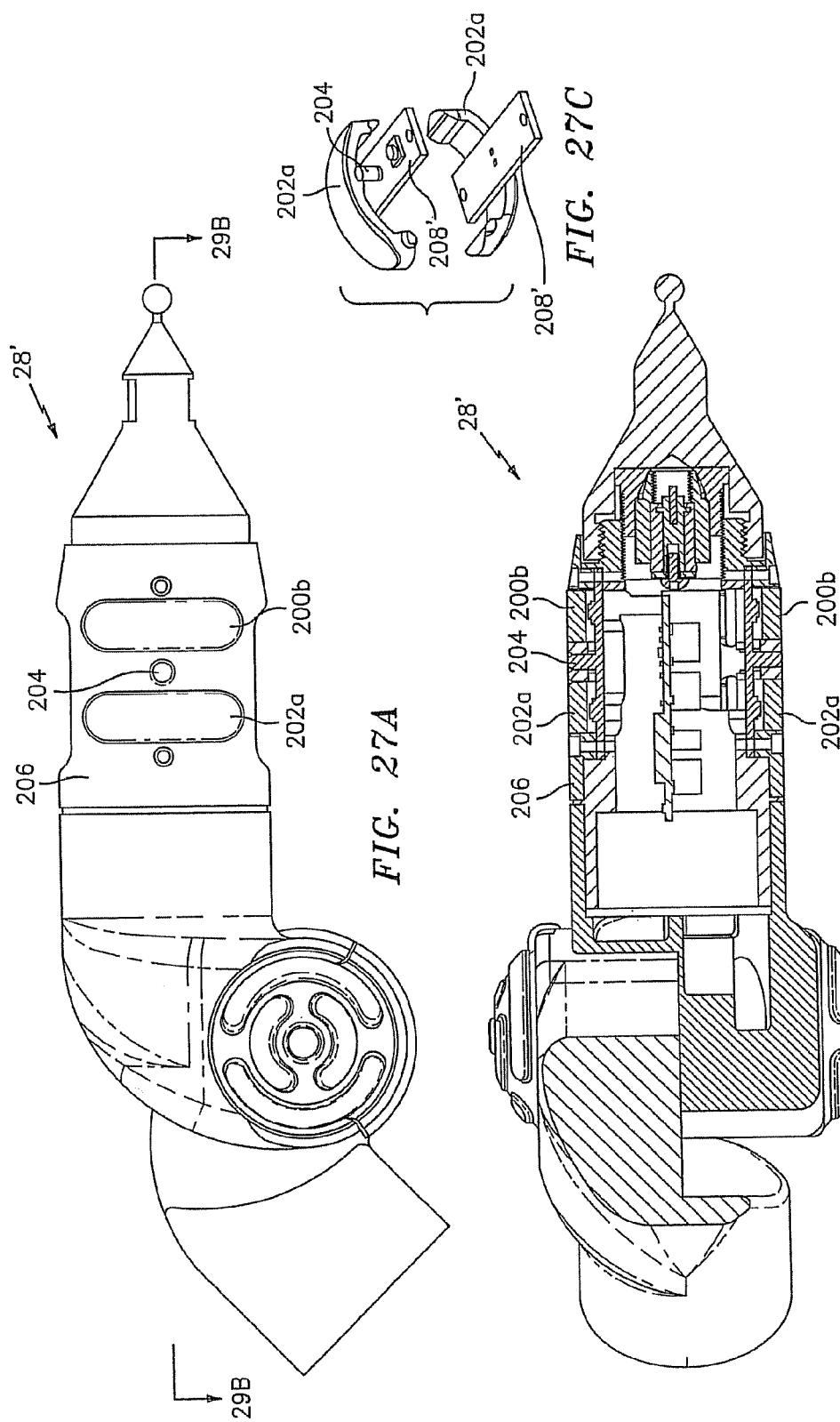

Detail of Thermally Stabilized Laser

PORTABLE COORDINATE MEASUREMENT MACHINE WITH INTEGRATED LINE LASER SCANNER

CROSS-REFERENCE TO RELATED APPLICATION

This application is a continuation-in-part (CIP) application of application Ser. No. 11/141,444, now U.S. Pat. No. 7,050,930, filed May 31, 2005 which in turn is a continuation application of application Ser. No. 10/366,678 filed Feb. 13, 2003 (now Pat. No. 6,965,843) and claims the benefit of provisional application Nos. 60/357,599 filed Feb. 14, 2002 and 60/394,908 filed Jul. 10, 2002; the contents of the Ser. No. 10/366,678 application, the Ser. No. 11/141,444 application, and both provisional applications above are hereby incorporated into the present CIP application by reference and domestic priority is claimed in the present CIP application to all of the applications listed above.

BACKGROUND OF THE INVENTION

1. Field of the Invention

The invention relates in general to coordinate measurement machines (CMMs) and in particular to portable CMM's having an articulated arm with an integrated line laser scanner.

2. Prior Art

Currently, portable articulated arms are provided as a measurement system with a host computer and applications software. The articulated arm is commonly used to measure points on an object and these measured points are compared to computer-aided design (CAD) data stored on the host computer to determine if the object is within the CAD specification. In other words, the CAD data is the reference data to which actual measurements made by the articulated arm are compared. The host computer may also contain applications software that guides the operator through the inspection process. For many situations involving complicated applications, this arrangement is appropriate since the user will observe the three-dimensional CAD data on the host computer while responding to complex commands in the applications software.

An example of a prior art portable CMM for use in the above-discussed measurement system is disclosed in U.S. Pat. No. 5,402,582 ('582), which is assigned to the assignee hereof and incorporated herein by reference. The '582 patent discloses a conventional three-dimensional measuring system composed of a manually operated multi-jointed articulated arm having a support base on one end thereof and a measurement probe at the other end. Commonly assigned U.S. Pat. No. 5,611,147 ('147), which is again incorporated herein by reference, discloses a similar CMM having an articulated arm. In this patent, the articulated arm includes a number of important features including an additional rotational axis at the probe end thus providing for an arm with either a two-one-three or a two-two-three joint configuration (the latter case being a 7 axis arm) as well as improved pre-loaded bearing constructions for the bearings in the arm.

Commonly assigned U.S. Pat. No. 5,978,748 ('748), which is incorporated herein by reference, discloses an articulated arm having an on-board controller which stores one or more executable programs and which provides the user with instructions (e.g., inspection procedures) and stores the CAD data that serves as the reference data. In the '748 patent, a controller is mounted to the arm and runs the executable program which directs the user through a process such as an inspection procedure. In such a system, a host computer may be used to generate the executable program.

The prior art devices are limited in that they are capable of measuring only one point in space at a time. Products have become available that replace the single point probe with a line laser scanner and charge-coupled device (CCD) that are capable of simultaneously measuring a locus of points on the surface of an object that lie on a plane defined by a scanning laser. An example of such a prior art product is the ScanWorks™ manufactured by Perceptron of Plymouth, Mich. However, such prior art devices are retrofit onto the existing articulated arms of portable CMM's and require external, high bandwidth data connections from the scanner to the host computer used to interpret the image data generated by the CCD as well as external connections to power supplies. Thus, the electrical lines extend outside the housing of the articulated arm. Furthermore, when the single-point probe is replaced by the line laser scanner retrofit, the highly accurate single point probe functionality is lost or at least diminished.

SUMMARY OF THE INVENTION

In accordance with the present invention, a portable CMM may comprise an articulated arm having jointed arm segments with a measurement probe at one thereof with the measurement probe having a novel, integrated line laser scanner rotatably or otherwise mounted thereon. The laser may be a thermally stabilized laser. In addition, in a preferred embodiment, this measurement probe has an integrally mounted touch trigger probe which is easily convertible to a conventional hard probe. The measurement probe also includes improved switches and a measurement indicator light. The improved switches include differing surface texture and/or height which allow the operator to easily distinguish between them while the indicator light preferably is color-coded for ease of operation.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are number alike in the several FIGURES:

FIG. 9B is an exploded, perspective view, similar to FIG. 9, but showing four read heads;

FIG. 9C is a perspective view of FIG. 9B after assembly;

FIG. 9D is an exploded, perspective view, similar to FIG. 9, but showing three read heads;

FIG. 9E is a perspective view of FIG. 9D after assembly;

FIG. 27A is a side elevation view of another embodiment of a measurement probe in accordance with the present invention;

FIG. 27B is a cross-sectional elevation view along the line 27B-27B of FIG. 27A;

FIG. 27C is a perspective view of a pair of "take" or "confirm" switches used in FIGS. 27A-B;

DETAILED DESCRIPTION OF THE INVENTION

Figure 1:
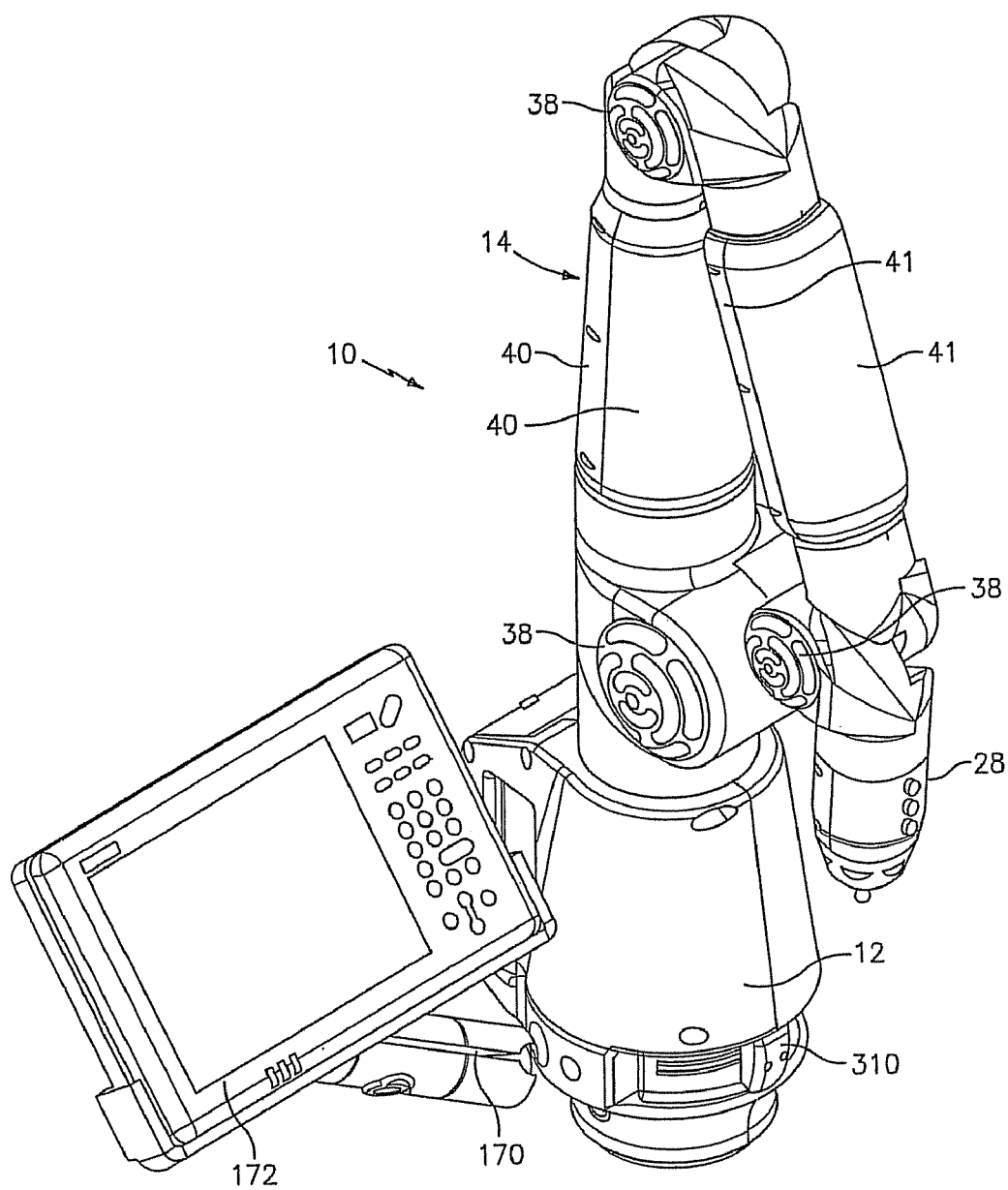
FIG. 1 is a front perspective view of the portable CMM of the present invention including an articulated arm and attached host computer.
Figure 2:
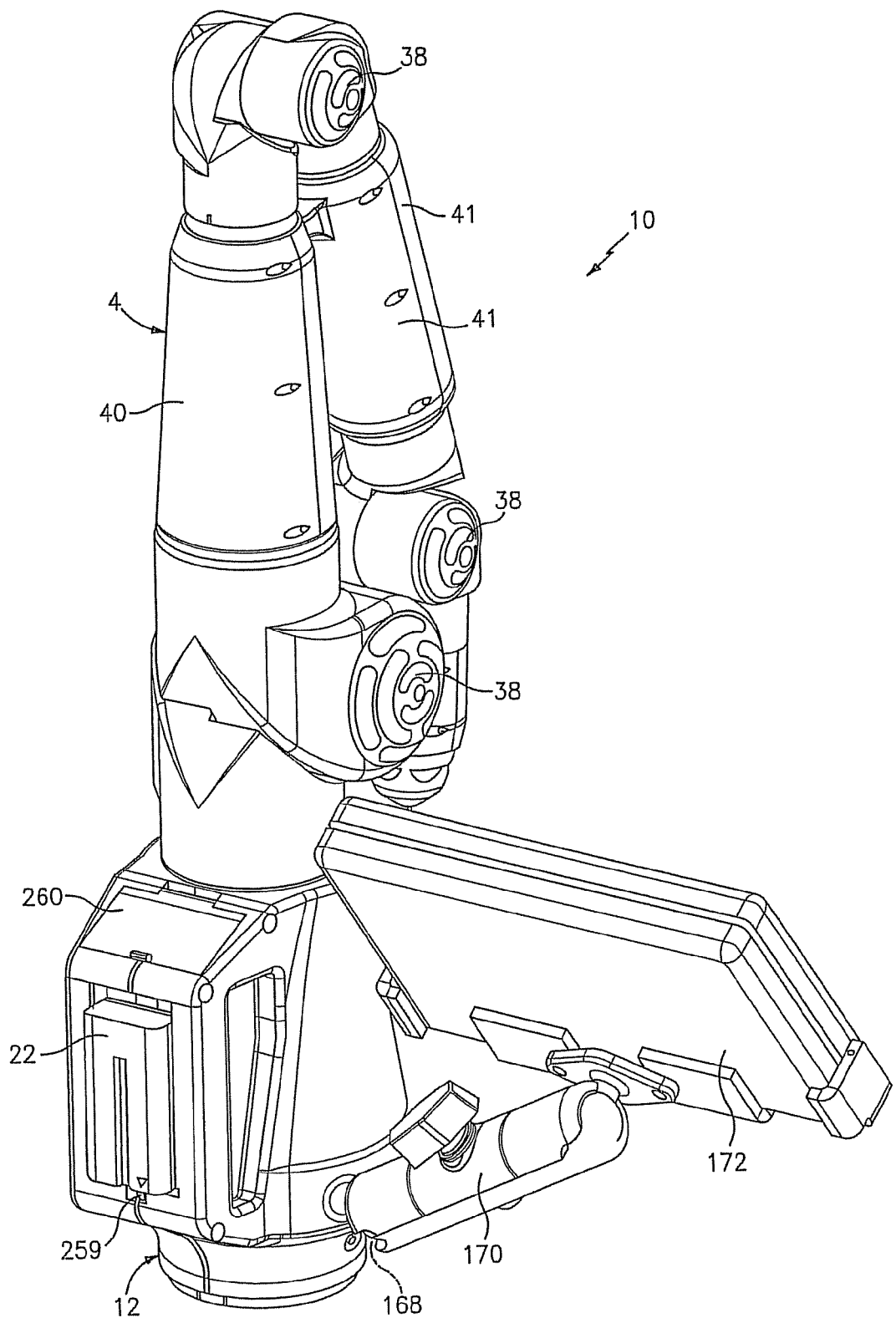
FIG. 2 is a rear perspective view of the CMM of FIG. 1.
Figure 3:
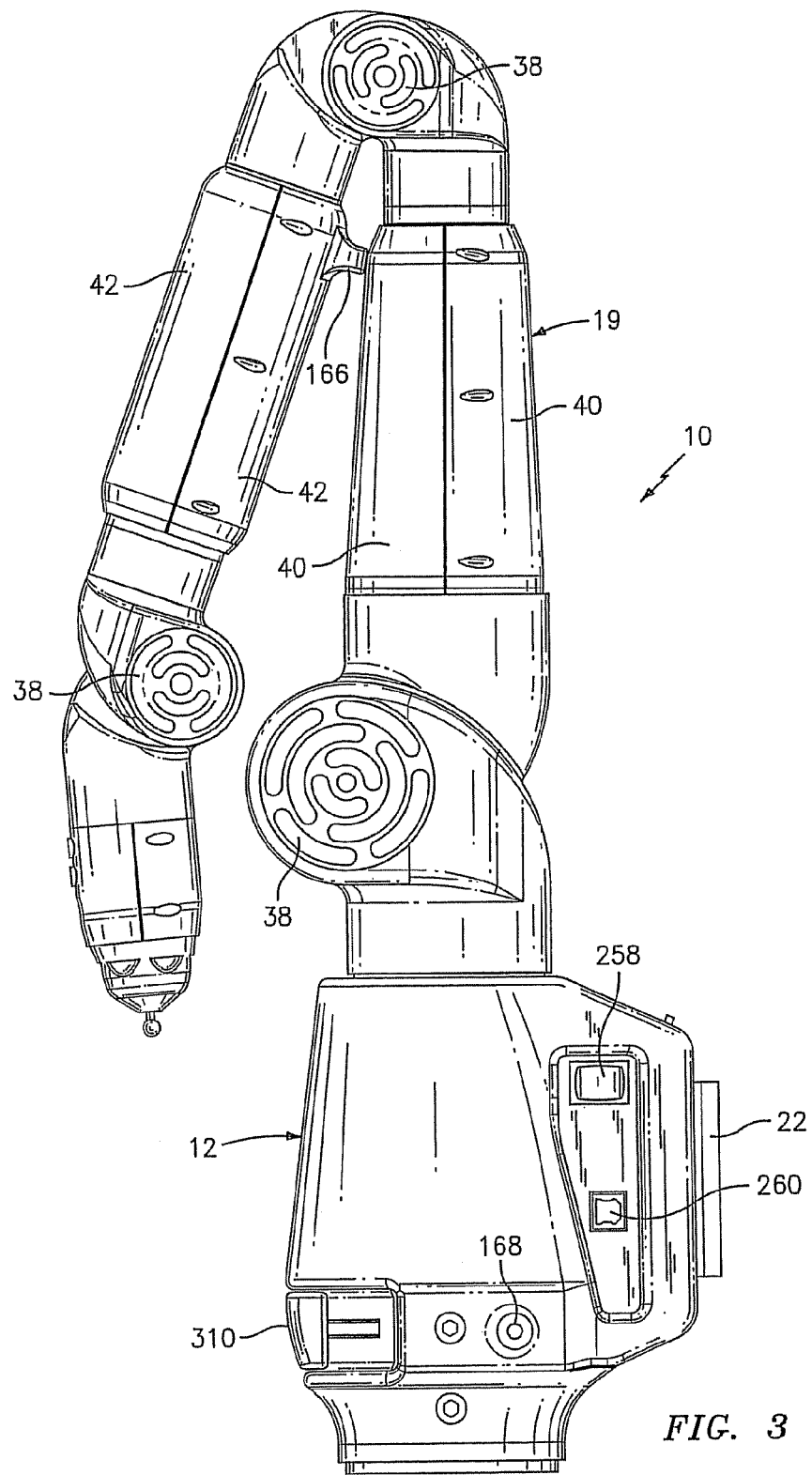
FIG. 3 is a right side view of the CMM of FIG. 1 (with the host computer removed)

Referring first to FIGS. 1-3, the CMM of the present invention is shown generally at 10. CMM 10 comprises a multijointed, manually operated, articulated arm 14 attached at one end to a base section 12 and attached at the other end to a measurement probe 28. Arm 14 is constructed of basically two types of joints, namely a long joint (for swivel motion) and a short joint (for hinge motion). The long joints are positioned substantially axially or longitudinally along the arm while the short joints are preferably positioned at 90° to the longitudinal axis of the arm. The long and short joints are paired up in what is commonly known as a 2-2-2 configuration (although other joint configurations such as 2-1-2, 2-1-3, 2-2-3, etc. may be employed) Each of these joint pairs are shown in FIGS. 4-6.

Figure 4:
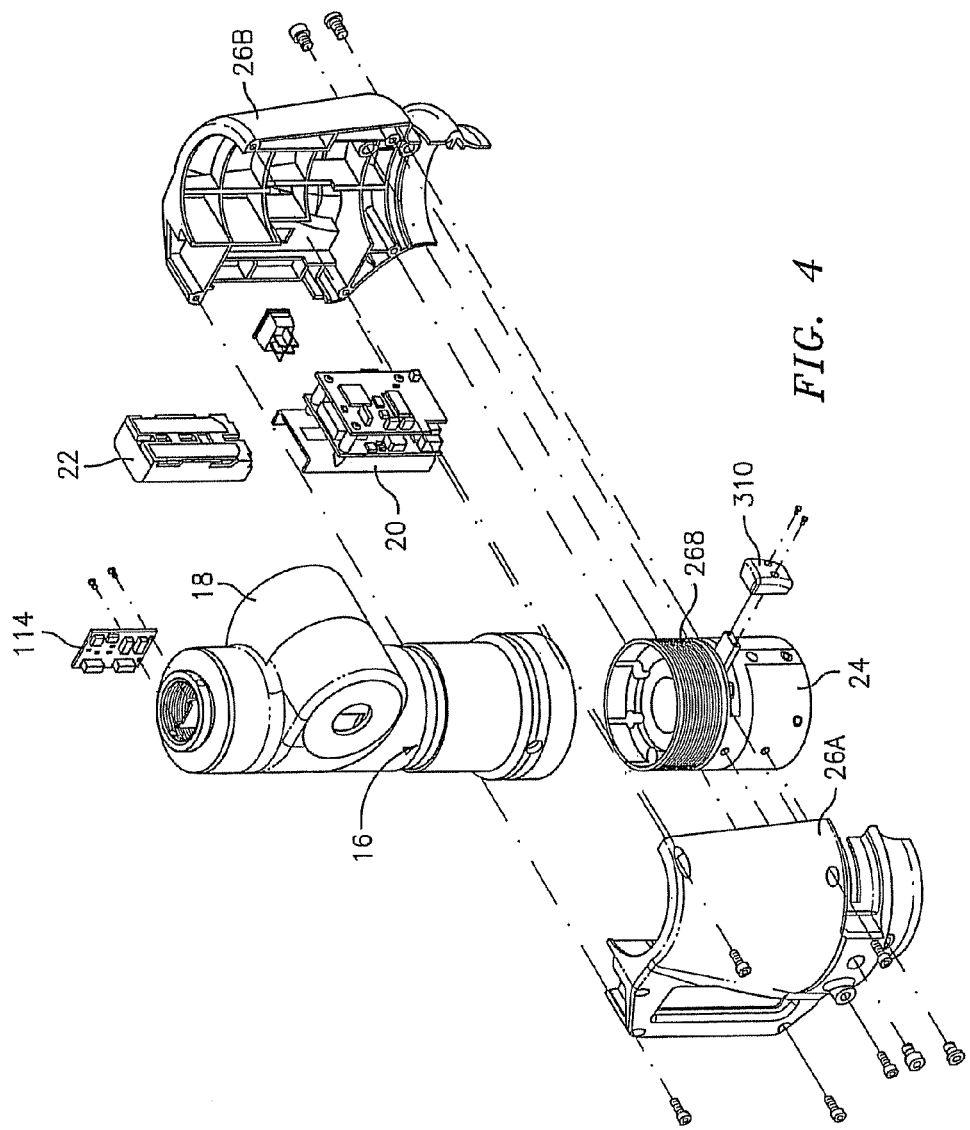
FIG. 4 is a partially exploded, perspective view of the CMM of the present invention depicting the base and the first articulated arm section.

FIG. 4 depicts an exploded view of the first joint pair, namely long joint 16 and short joint 18. FIG. 4 also depicts an exploded view of the base 12 including a portable power supply electronics 20, a portable battery pack 22, a magnetic mount 24 and a two-piece base housing 26A and 26B. All of these components will be discussed in more detail hereinafter.

Significantly, it will be appreciated that the diameters of the various primary components of articulated arm 14 will taper from the base 12 to the probe 28. Such taper may be continuous or, as in the embodiment shown in the FIGURES, the taper may be discontinuous or step-wise. In addition, each of the primary components of articulated arm 14 may be threadably attached thereby eliminating a large number of fasteners associated with prior art CMMs. For example, and as will be discussed hereafter, magnetic mount 24 is threadably attached to first long joint 16. Preferably, such threading is tapered threading which is self-locking and provides for increased axial/bending stiffness. Alternatively, as shown in FIGS. 25A and 25B, and as discussed hereafter, the primary components of the articulated arm may have complimentary tapered male and female ends with associated flanges, such flanges being bolted together.

Figure 5:
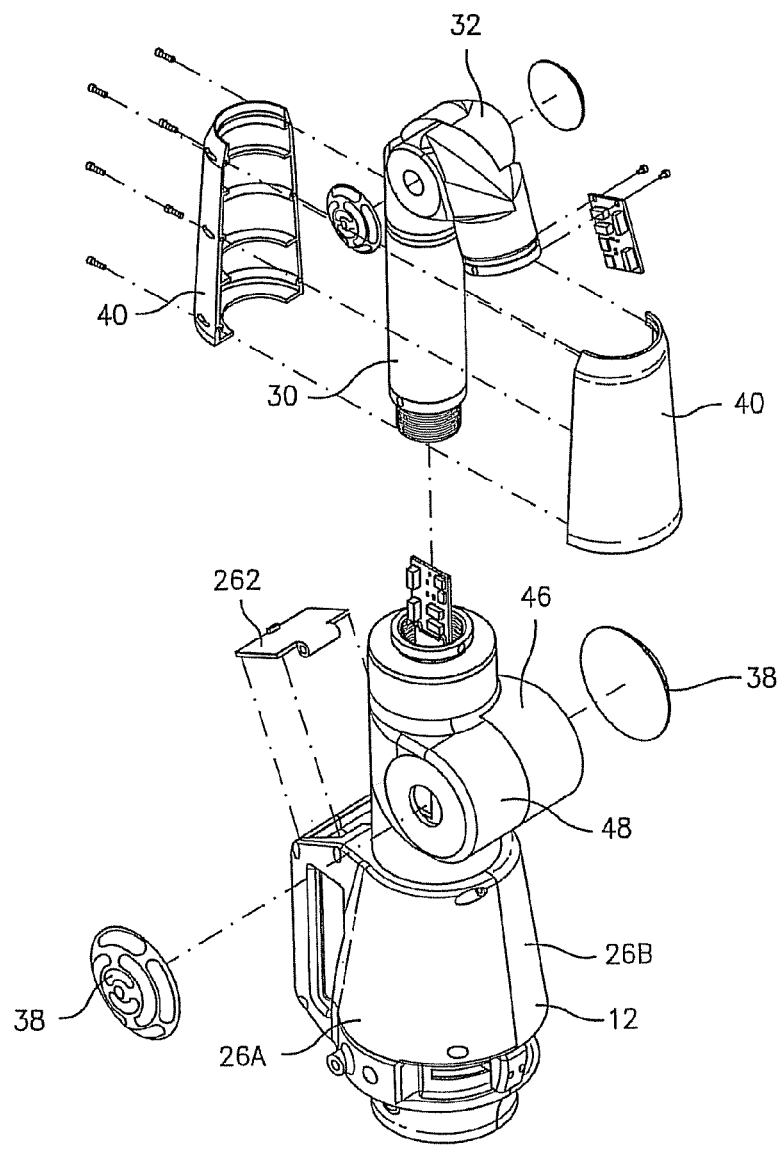
FIG. 5 is a partially exploded, perspective view of the CMM of the present invention depicting the base, first arm section and partially exploded second arm section.
Figure 6:
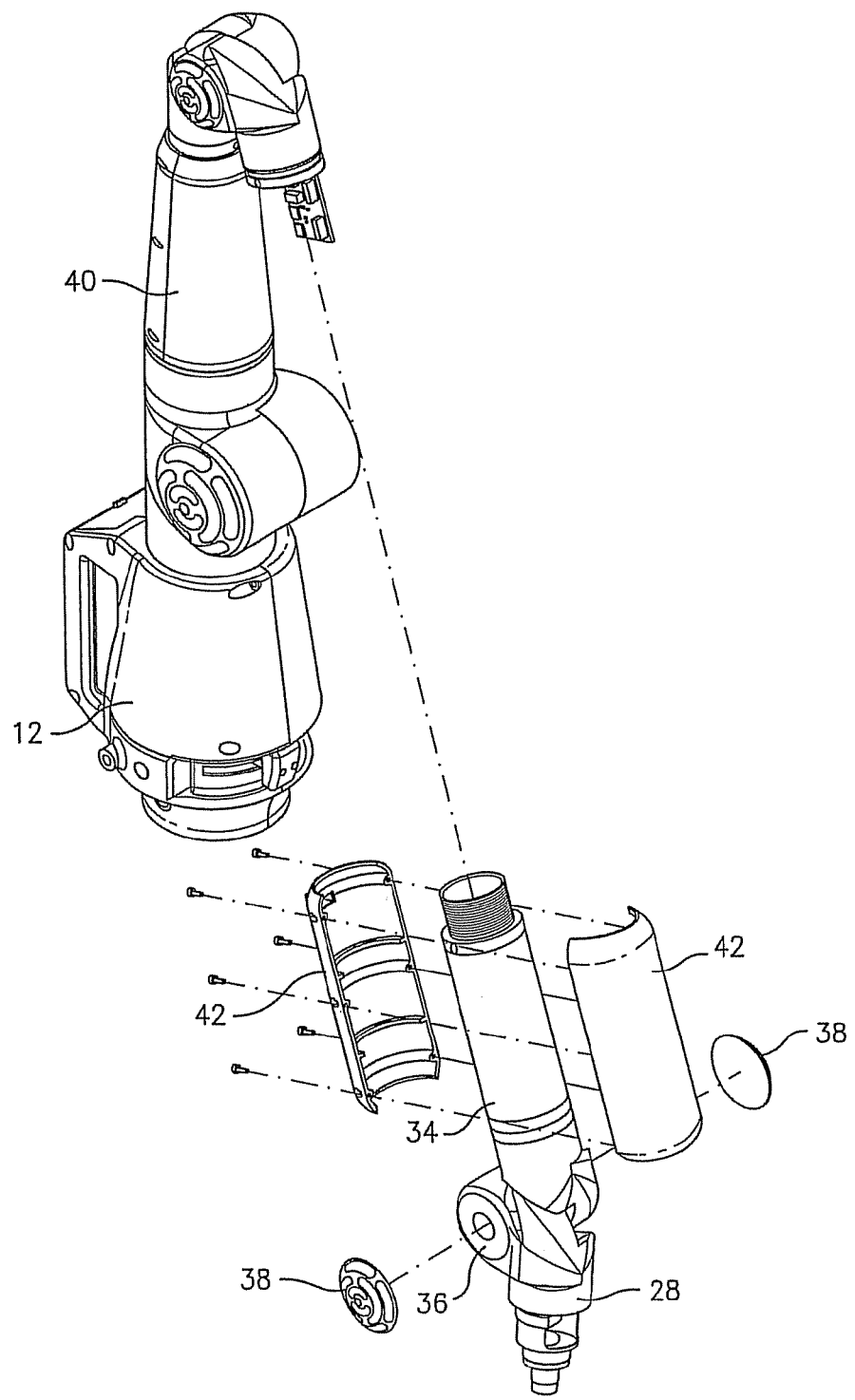
FIG. 6 is a partially exploded, perspective view of the CMM of the present invention depicting the base, first arm section, second arm section and partially exploded third arm section.

Referring to FIG. 5, the second set of a long and short joint is shown being attached to the first set. The second joint set includes long joint 30 and short joint 32. As is consistent with the attachment of magnetic mount 24 to long joint 16, long joint 30 is threadably attached to threading on the interior surface of long joint 16. Similarly, and with reference to FIG. 6, the third joint set includes a third long joint 34 and a third short joint 36. Third long joint 34 threadably attaches to threading on the interior surface of second short joint 32. As will be discussed in more detail hereinafter, probe 28 threadably attaches to short joint 36.

Preferably, each short joint 18, 32 and 36 is constructed of cast and/or machined aluminum components or alternatively, lightweight stiff alloy or composite. Each long joint 16, 30 and 34 is preferably constructed of cast and/or machined aluminum, lightweight stiff alloy and/or fiber reinforced polymer. The mechanical axes of the three aforementioned joint pairs (i.e., pair 1 comprises joint pairs 16, 18, pair 2 comprises joint pairs 30, 32 and pair 3 comprises joint pairs 34, 36) are aligned with respect to the base for smooth, uniform mechanical behavior. The aforementioned tapered construction from base 12 to probe 28 is preferred to promote increased stiffness at the base where loads are greater and smaller profile at the probe or handle where unobstructed use is important. As will be discussed in more detail hereinafter, each short joint is associated with a protective bumper 38 on either end thereof and each long probe is covered with a protective sleeve 40 or 41. It will be appreciated that the first long joint 16 is protected by the base housing 26A, B which provides the same type of protection as sleeves 40, 41 provide for the second and third long joints 30, 34.

Figure 7:
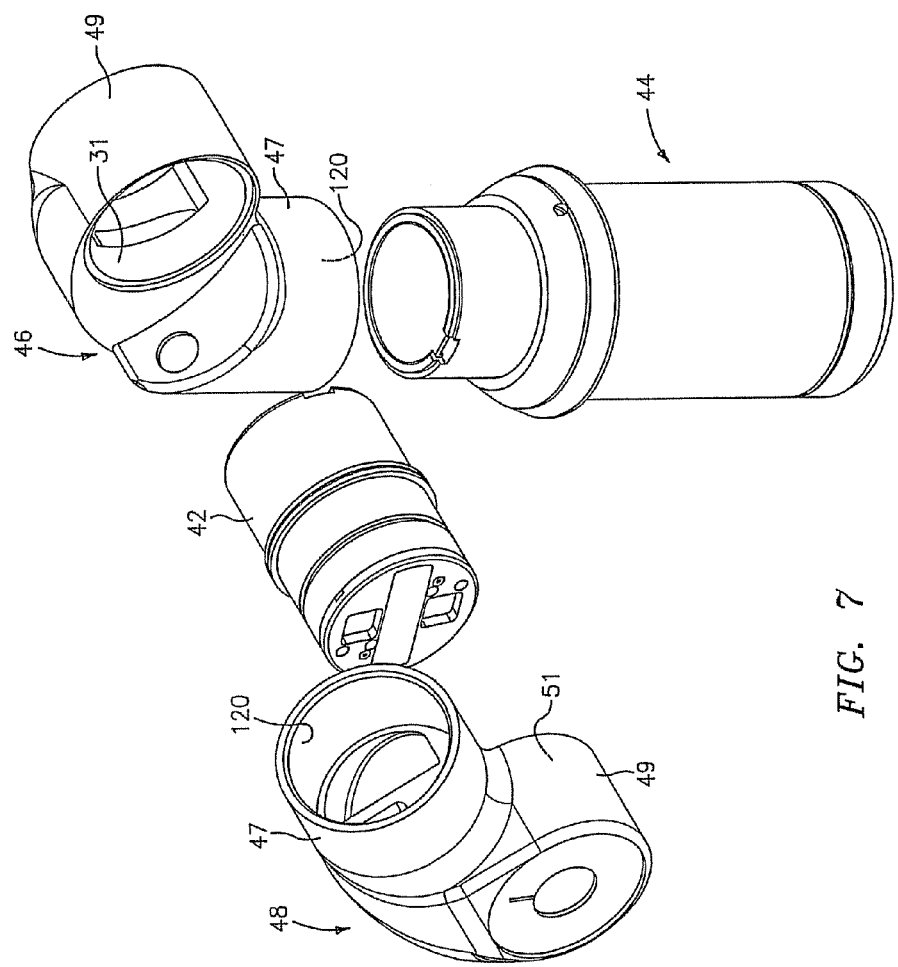
FIG. 7 is an exploded, perspective view depicting a pair of encoder/bearing cartridges being assembled between two dual socket joints in accordance with the present invention.
Figure 8:
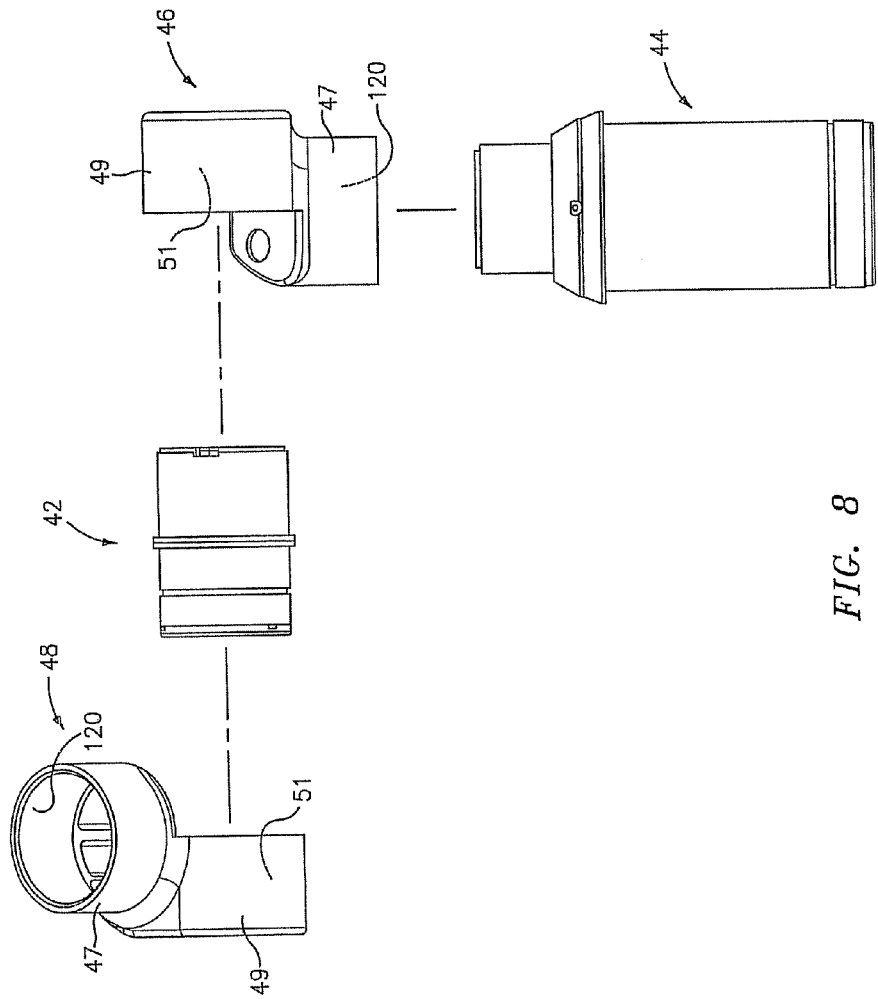
FIG. 8 is a front elevation view of the bearing/encoder cartridges and dual socket joints of FIG. 7.

In accordance with an important feature of the present invention, each of the joints of the articulated arm utilizes a modular bearing/encoder cartridge such as the short cartridge 42 and the long cartridge 44 shown in FIGS. 7 and 8. These cartridges 42, 44 are mounted in the openings of dual socket joints 46, 48. Each socket joint 46, 48 includes a first cylindrical extension 47 having a first recess or socket 120 and a second cylindrical extension 49 having a second recess or socket 51. Generally, sockets 120 and 51 are positioned 90 degrees to one another although other relative, angular configurations may be employed. Short cartridge 42 is positioned in each socket 51 of dual socket joints 46 and 48 to define a hinge joint, while long cartridge 44 is positioned in socket 120 of joint 46 (see FIG. 25) and long cartridge 44' (see FIG. 26) is positioned in socket 120 of joint 48 to each define a longitudinal swivel joint. Modular bearing/encoder cartridges 42, 44 permit the separate manufacture of a pre-stressed or preloaded dual bearing cartridge on which is mounted the modular encoder components. This bearing encoder cartridge can then be fixedly attached to the external skeletal components (i.e., the dual socket joints 46, 48) of the articulated arm 14. The use of such cartridges is a significant advance in the field as it permits high quality, high speed production of these sophisticated subcomponents of articulated arm 14.

Figure 9:
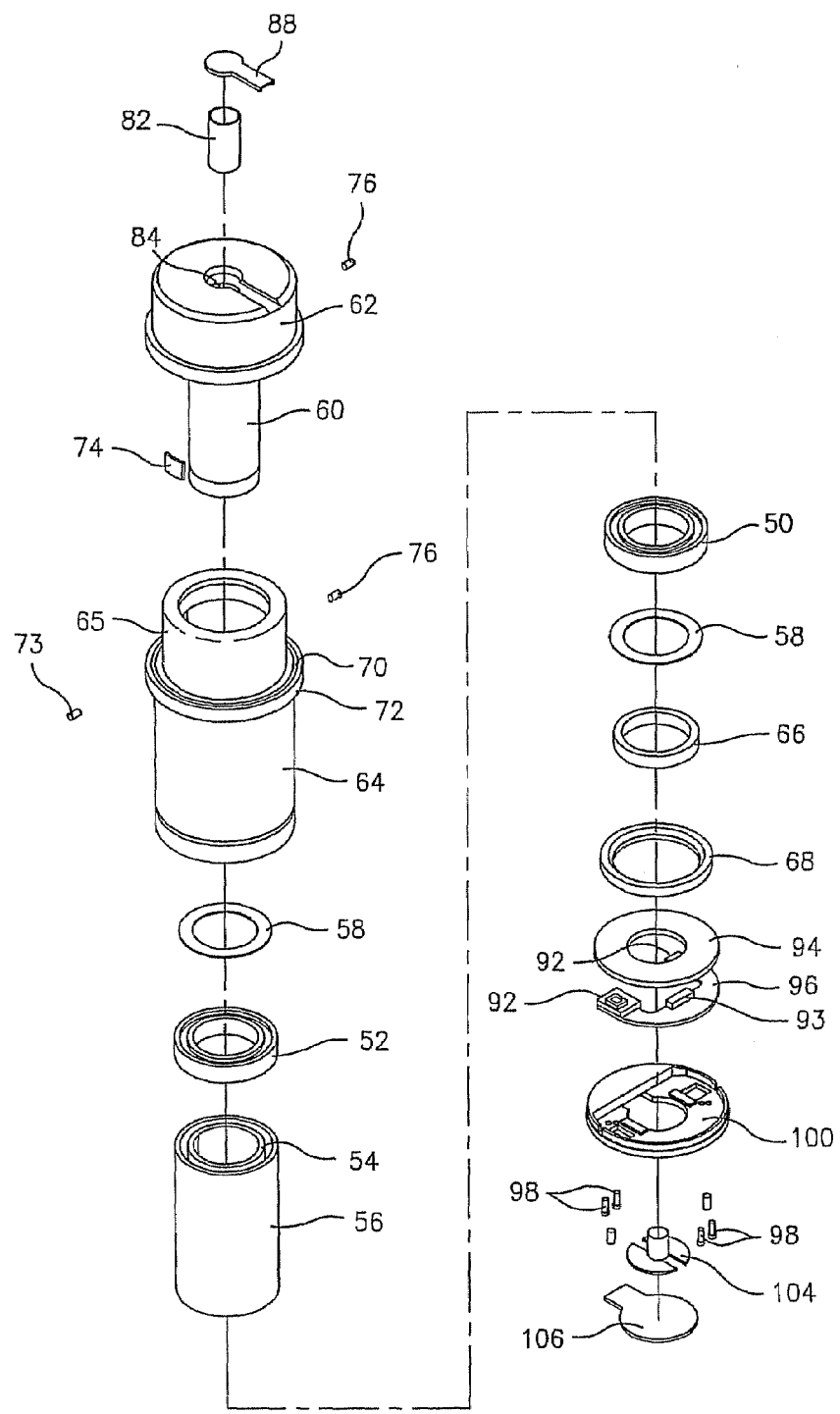
FIG. 9 is an exploded, perspective view of a short bearing/encoder cartridge in accordance with the present invention.
Figure 10:
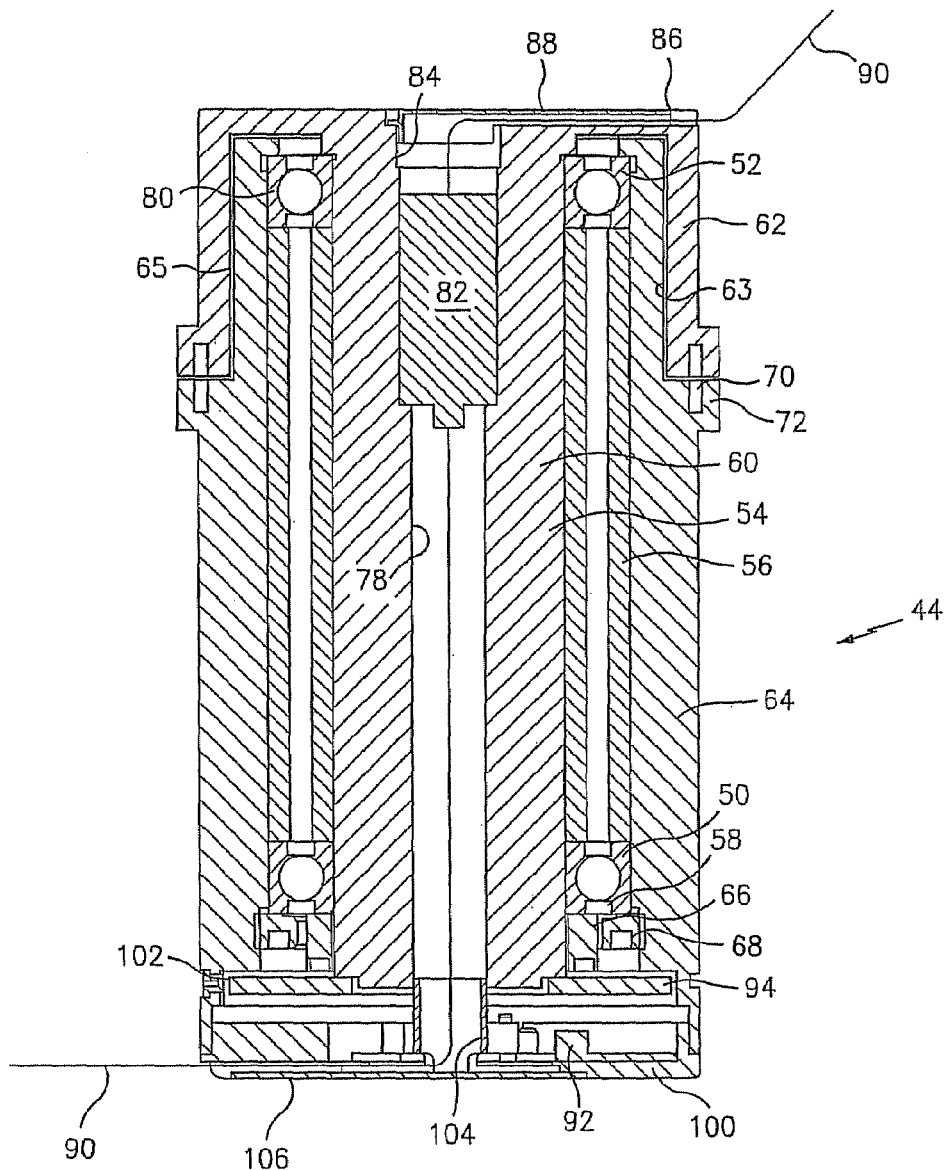
FIG. 10 is a cross-sectional elevation view of the cartridge of FIG. 9.

In the embodiment described herein, there are four different cartridge types, two long axial cartridges for joints 30 and 34, one base axial cartridge for joint 16, one base cartridge (which includes a counter balance) for short joint 18 and two hinge cartridges for joints 32 and 36. In addition, as is consistent with the taper of articulated arm 14, the cartridges nearest the base (e.g., located in long joint 16 and short joint 18) have a larger diameter relative to the smaller diameters of joints 30, 32, 34 and 36. Each cartridge includes a pre-loaded bearing arrangement and a transducer which in this embodiment, comprises a digital encoder. Turning to FIGS. 9 and 10, the cartridge 44 positioned in axial long joint 16 will now be described.

Cartridge 44 includes a pair of bearings 50, 52 separated by an inner sleeve 54 and outer sleeve 56. It is important that bearings 50, 52 are pre-loaded. In this embodiment, such preload is provided by sleeves 54, 56 being of differing lengths (inner sleeve 54 is shorter than outer sleeve 56 by approximately 0.0005 inch) so that upon tightening, a preselected preload is generated on bearings 50, 52. Bearings 50, 52 are sealed using seals 58 with this assembly being rotatably mounted on shaft 60. At its upper surface, shaft 60 terminates at a shaft upper housing 62. An annulus 63 is defined between shaft 60 and shaft upper housing 62. This entire assembly is positioned within outer cartridge housing 64 with the shaft and its bearing assembly being securely attached to housing 64 using a combination of an inner nut 66 and an outer nut 68. Note that upon assembly, the upper portion 65 of outer housing 64 will be received within annulus 63. It will be appreciated that the aforementioned preload is provided to bearings 50, 52 upon the tightening of the inner and outer nuts 66, 68 which provide compression forces to the bearings and, because of the difference in length between the inner and outer spacers 54, 56, the desired preload will be applied.

Preferably, bearings 50, 52 are duplex ball bearings. In order to obtain the adequate pre-loading, it is important that the bearing faces be as parallel as possible. The parallelism affects the evenness of the pre-loading about the circumference of the bearing. Uneven loading will give the bearing a rough uneven running torque feel and will result in unpredictable radial run out and reduced encoder performance. Radial run out of the modularly mounted encoder disk (to be discussed below) will result in an undesirable fringe pattern shift beneath the reader head. This results in significant encoder angular measurement errors. Furthermore, the stiffness of the preferably duplex bearing structure is directly related to the separation of the bearings. The farther apart the bearings, the stiffer will be the assembly. The spacers 54, 56 are used to enhance the separation of the bearings. Since the cartridge housing 64 is preferably aluminum, then the spacers 54, 56 will also preferably be made from aluminum and precision machined in length and parallelism. As a result, changes in temperature will not result in differential expansion which would compromise the preload. As mentioned, the preload is established by designing in a known difference in the length of spacers 54, 56. Once the nuts 66, 68 are fully tightened, this differential in length will result in a bearing preload. The use of seals 58 provide sealed bearings since any contamination thereof would effect all rotational movement and encoder accuracy, as well as joint feel.

While cartridge 44 preferably includes a pair of spaced bearings, cartridge 44 could alternatively include a single bearing or three or more bearings. Thus, each cartridge needs at least one bearing as a minimum.

The joint cartridges of the present invention may either have unlimited rotation or as an alternative, may have a limited rotation. For a limited rotation, a groove 70 on a flange 72 on the outer surface of housing 64 provides a cylindrical track which receives a shuttle 74. Shuttle 74 will ride within track 70 until it abuts a removable shuttle stop such as the rotation stop set screws 76 whereupon rotation will be precluded. The amount of rotation can vary depending on what is desired. In a preferred embodiment, shuttle rotation would be limited to less than 720°. Rotational shuttle stops of the type herein are described in more detail in commonly owned U.S. Pat. No. 5,611,147, all of the contents of which have been incorporated herein by reference.

As mentioned, in an alternative embodiment, the joint used in the present invention may have unlimited rotation. In this latter case, a known slip ring assembly is used. Preferably, shaft 60 has a hollow or axial opening 78 therethrough which has a larger diameter section 80 at one end thereof. Abutting the shoulder defined at the intersection between axial openings 78 and 80 is a cylindrical slip ring assembly 82. Slip ring assembly 82 is non-structural (that is, provides no mechanical function but only provides an electrical and/or signal transfer function) with respect to the preloaded bearing assembly set forth in the modular joint cartridge. While slip ring assembly 82 may consist of any commercially available slip ring, in a preferred embodiment, slip ring assembly 82 comprises a H series slip ring available from IDM Electronics Ltd. of Reading, Berkshire, United Kingdom. Such slip rings are compact in size and with their cylindrical design, are ideally suited for use in the opening 80 within shaft 60. Axial opening 80 through shaft 60 terminates at an aperture 84 which communicates with a channel 86 sized and configured to receive wiring from the slip ring assembly 82. Such wiring is secured in place and protected by a wire cover 88 which snaps onto and is received into channel 86 and aperture 84. Such wiring is shown diagrammatically at 90 in FIG. 10.

Figure 9A:
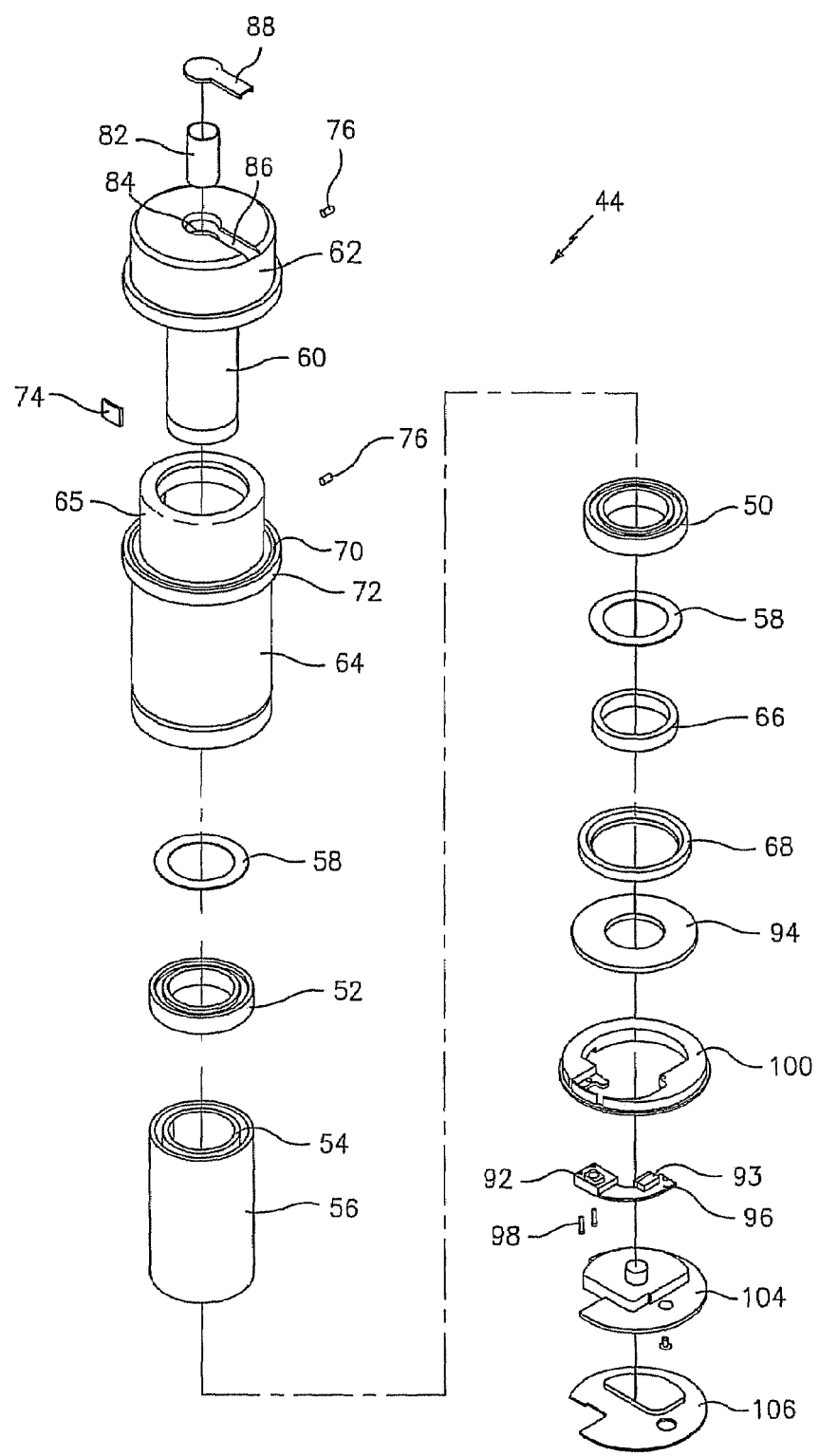
FIG. 9A is an exploded, perspective view similar to FIG. 9, but showing a single read head.

As mentioned, modular cartridge 44 include both a preloaded bearing structure which has been described above as well as a modular encoder structure which will now be described. Still referring to FIGS. 9 and 10, the preferred transducer used in the present invention comprises a modular optical encoder having two primary components, a read head 92 and a grating disk 94. In this embodiment, a pair of read heads 92 are positioned on a read head connector board 96. Connector board 96 is attached (via fasteners 98) to a mounting plate 100. Disk 94 is preferably attached to the lower bearing surface 102 of shaft 60 (preferably using a suitable adhesive) and will be spaced from and in alignment with read heads 92 (which is supported and held by plate 100). A wire funnel 104 and sealing cap 106 provide the final outer covering to the lower end of housing 64. Wire funnel 104 will capture and retain wiring 90 as best shown in FIG. 10. It will be appreciated that the encoder disk 94 will be retained by and rotate with shaft 60 due to the application of adhesive at 102. FIGS. 9 and 10 depict a double read head 92; however, it will be appreciated that more than two read heads may be used or, in the alternative, a single read head as shown in FIG. 9A may be used. FIGS. 9B-E depict examples of modular cartridges 44 with more than two read heads. FIGS. 9B-C show four read heads 92 received in a plate 100 and spaced at 90 degree intervals (although different relative spacings may be appropriate). FIGS. 9D-E show three read heads 92 received in a plate 100 and spaced at 120 degree intervals (although different relative spacing may be appropriate).

In order to properly align disk 94, a hole (not shown) is provided through housing 64 at a location adjacent disk 94. A tool (not shown) is then used to push disk 94 into proper alignment whereupon adhesive between disk 94 and shaft 66 is cured to lock disk 94 in place. A hole plug 73 is then provided through the hole in housing 64.

Figure 12:
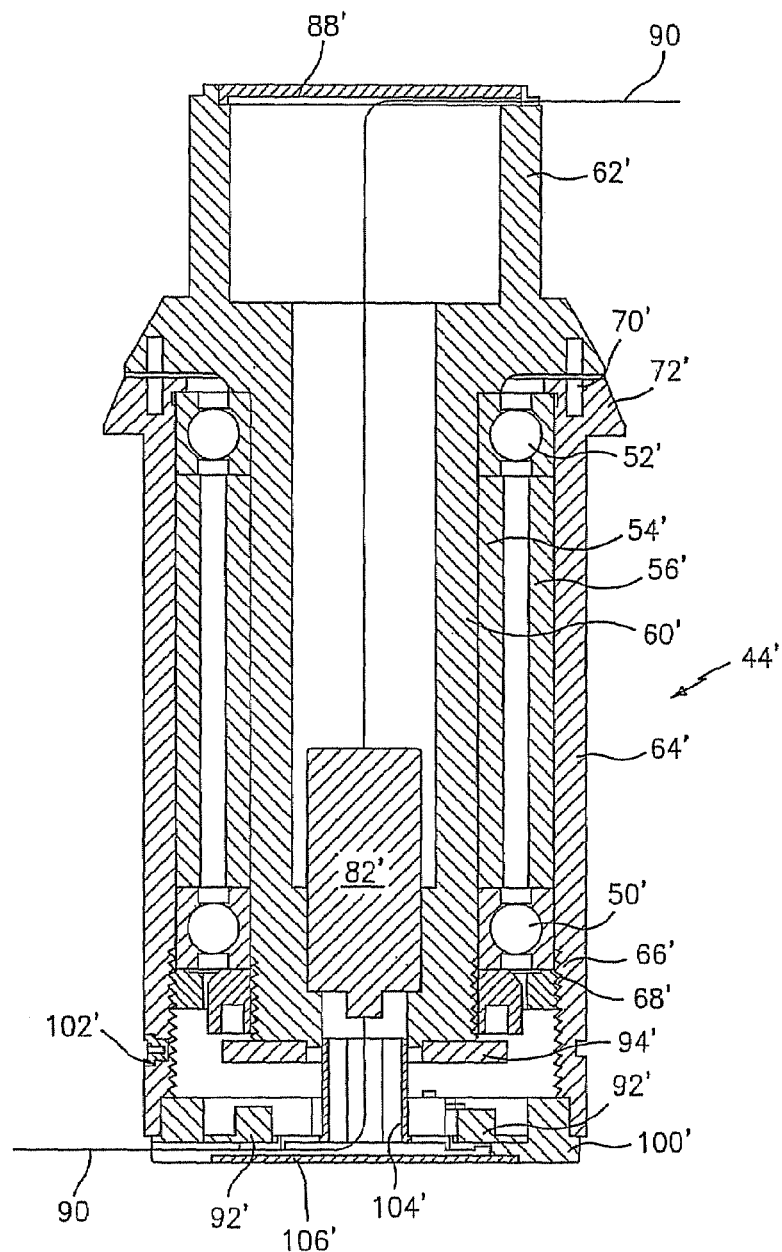
FIG. 12 is a cross-sectional elevation view of the cartridge of FIG. 11.
Figure 12A:
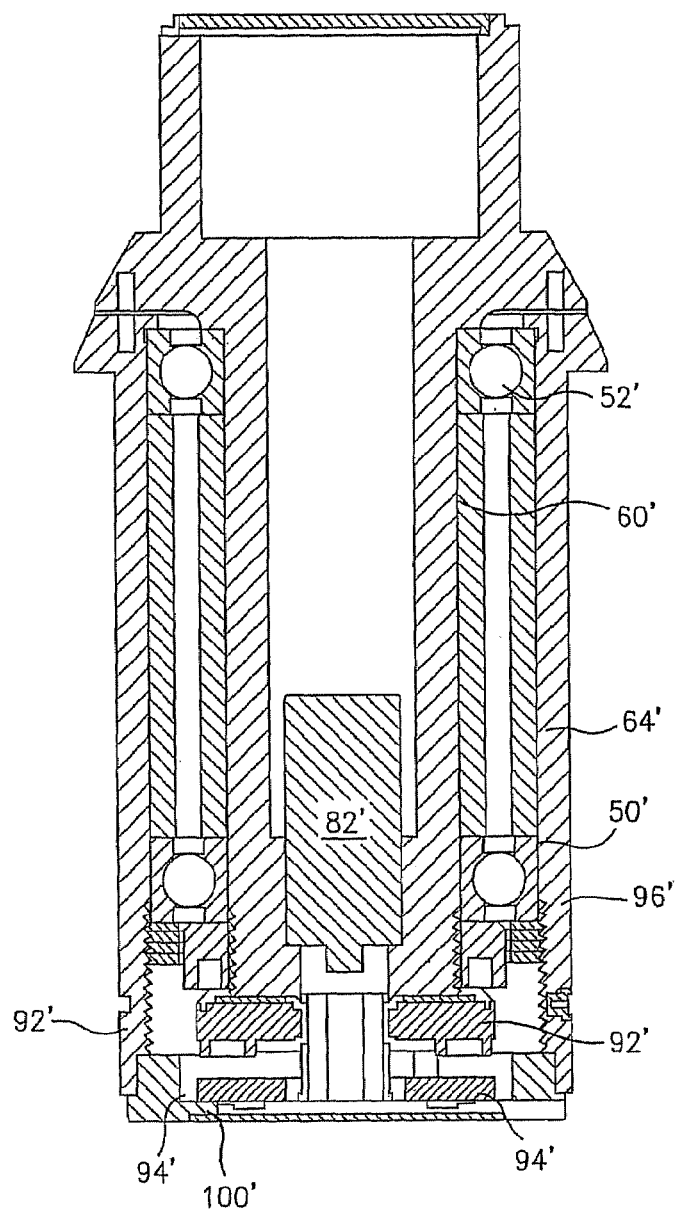
FIG. 12A is a cross-sectional elevation view of the cartridge of FIG. 12 depicting the dual read heads being rotatable with the shaft.

It is important to note that the locations of disk 94 and read head 92 may be reversed whereby disk 94 is attached to housing 56 and read head 92 rotates with shaft 60. Such an embodiment is shown in FIG. 12A where board 96' is attached (via adhesive) to shaft 60' for rotation therewith. A pair of read heads 92' are attached to board 96' and thus will rotate with shaft 60'. The disk 94' is positioned on a support 100' which is attached to housing 64'. In any event, it will be appreciated that either the disk 94 or read head 92 may be mounted for rotation with the shaft. All that is important is that disk 94 and read head 92 be positioned in a cartridge (or joint) so as to be rotatable with respect to each other while maintaining optical communication.

Preferably, the rotational encoder employed in the present invention is similar to that disclosed in U.S. Pat. Nos. 5,486,923 and 5,559,600, all of the contents of which are incorporated herein by reference. Such modular encoders are commercially available from MicroE Systems under the trade name Pure Precision Optics. These encoders are based on physical optics that detect the interference between diffraction orders to produce nearly perfect sinusoidal signals from a photo detector array (e.g., read head(s)) inserted in the fringe pattern. The sinusoidal signals are electronically interpolated to allow detection of displacement that is only a fraction of the optical fringe.

Using a laser light source, the laser beam is first collimated by a lens and then sized by an aperture. The collimated size beam passes through a grating that diffracts the light into discrete orders with the $0^{th}$ and all even orders suppressed by the grating construction. With the 0 order suppressed, a region exists beyond the diverging $3^{rd}$ order where only the $\pm 1^{st}$ orders overlap to create a nearly pure sinusoidal interference. One or more photodetector arrays (read heads) are placed within this region, and produces four channels of nearly pure sinusoidal output when there is relative motion between the grating and the detector. Electronics amplify, normalize and interpolate the output to the desired level of resolution.

The simplicity of this encoder design yields several advantages over prior art optical encoders. Measurements may be made with only a laser source and its collimating optics, a diffractive grating, and a detector array. This results in an extremely compact encoder system relative to the bulkier prior art, conventional encoders. In addition, a direct relationship between the grating and the fringe movement desensitizes the encoder from environmentally induced errors to which prior art devices are susceptible. Furthermore, because the region of interference is large, and because nearly sinusoidal interference is obtained everywhere within this region, alignment tolerances are far more relaxed than is associated with prior art encoders.

A significant advantage of the aforementioned optical encoder is that the precision of the standoff orientation and distance or the distance and orientation of the read head with respect to the encoder disk is far less stringent. This permits a high accuracy rotational measurement and an easy-to-assemble package. The result of using this "geometry tolerant" encoder technology results in a CMM 10 having significant cost reductions and ease of manufacturing.

It will be appreciated that while the preferred embodiment described above includes an optical disk 94, the preferred embodiment of the present invention also encompasses any optical fringe pattern which allow the read head to measure relative motion. As used herein, such fringe pattern means any periodic array of optical elements which provide for the measurement of motion. Such optical elements or fringe pattern could be mounted on a rotating or stationary disk as described above, or alternatively, could be deposited, secured or otherwise positioned or reside upon any of the relatively moving components (such as the shaft, bearings or housing) of the cartridge.

Indeed, the read head and associated periodic array or pattern does not necessarily need to be based on optics (as described above) at all. Rather, in a broader sense, the read head could read (or sense) some other periodic pattern of some other measurable quantity or characteristic which can be used to measure motion, generally rotary motion. Such other measurable characteristics may include, for example, reflectivity, opacity, magnetic field, capacitance, inductance or surface roughness. (Note that a surface roughness pattern could be read using a read head or sensor in the form of a camera such as a CCD camera). In such cases, the read head would measure, for example, periodic changes in magnetic field, reflectivity, capacitance, inductance, surface roughness or the like. As used herein therefore, the term "read head" means any sensor or transducer and associated electronics for analysis of these measurable quantities or characteristics with an optical read head being just one preferred example. Of course, the periodic pattern being read by the read head can reside on any surface so long as there is relative (generally rotary) motion between the read head and periodic pattern. Examples of the periodic pattern include a magnetic, inductive or capacitive media deposited on a rotary or stationary component in a pattern. Moreover, if surface roughness is the periodic pattern to be read, there is no need to deposit or otherwise provide a separate periodic media since the surface roughness of any component in communication with the associated read head (probably a camera such as a CCD camera) may be used.

Figure 11:
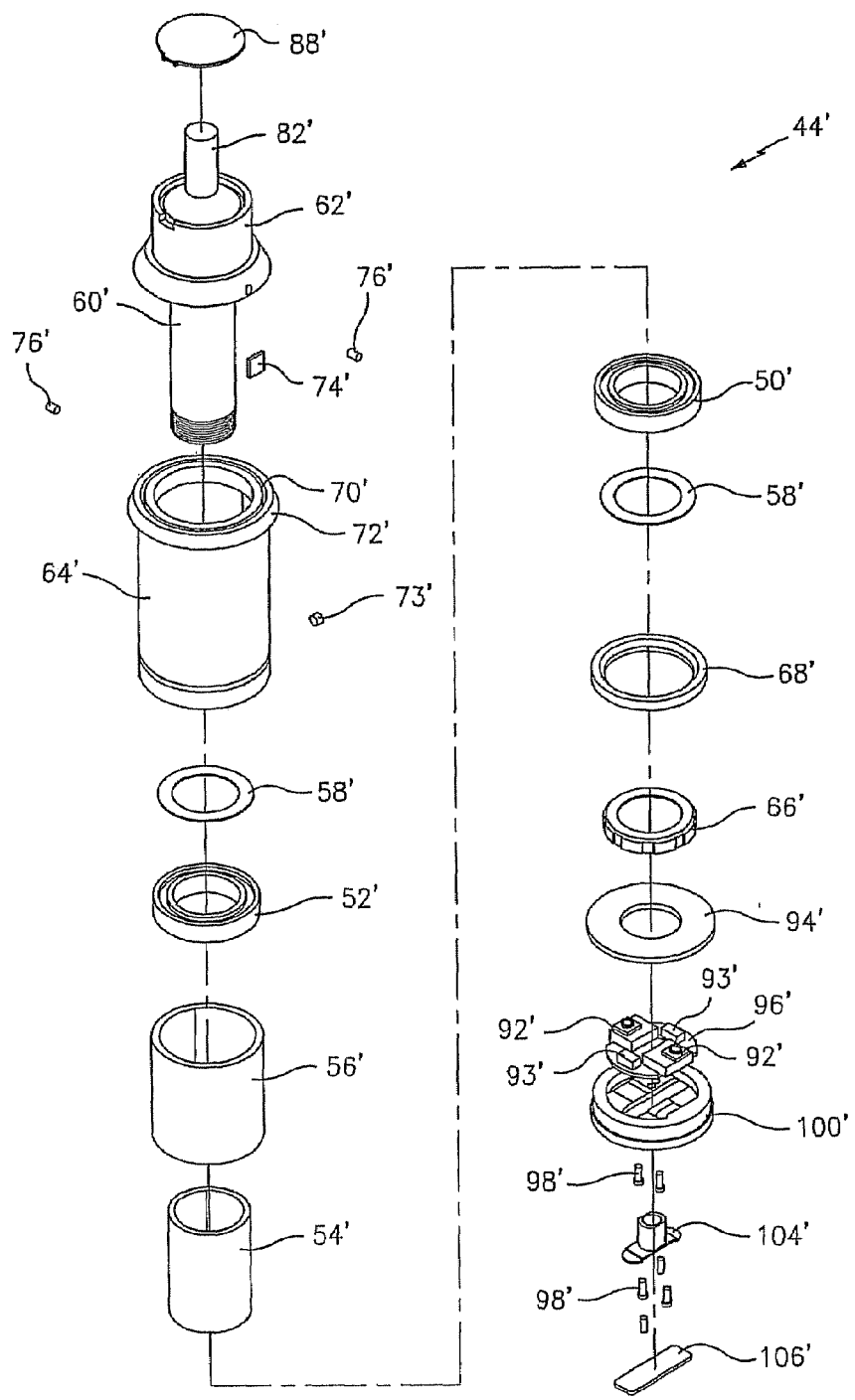
FIG. 11 is an exploded, perspective view of a long bearing/encoder cartridge in accordance with the present invention.
Figure 11A:
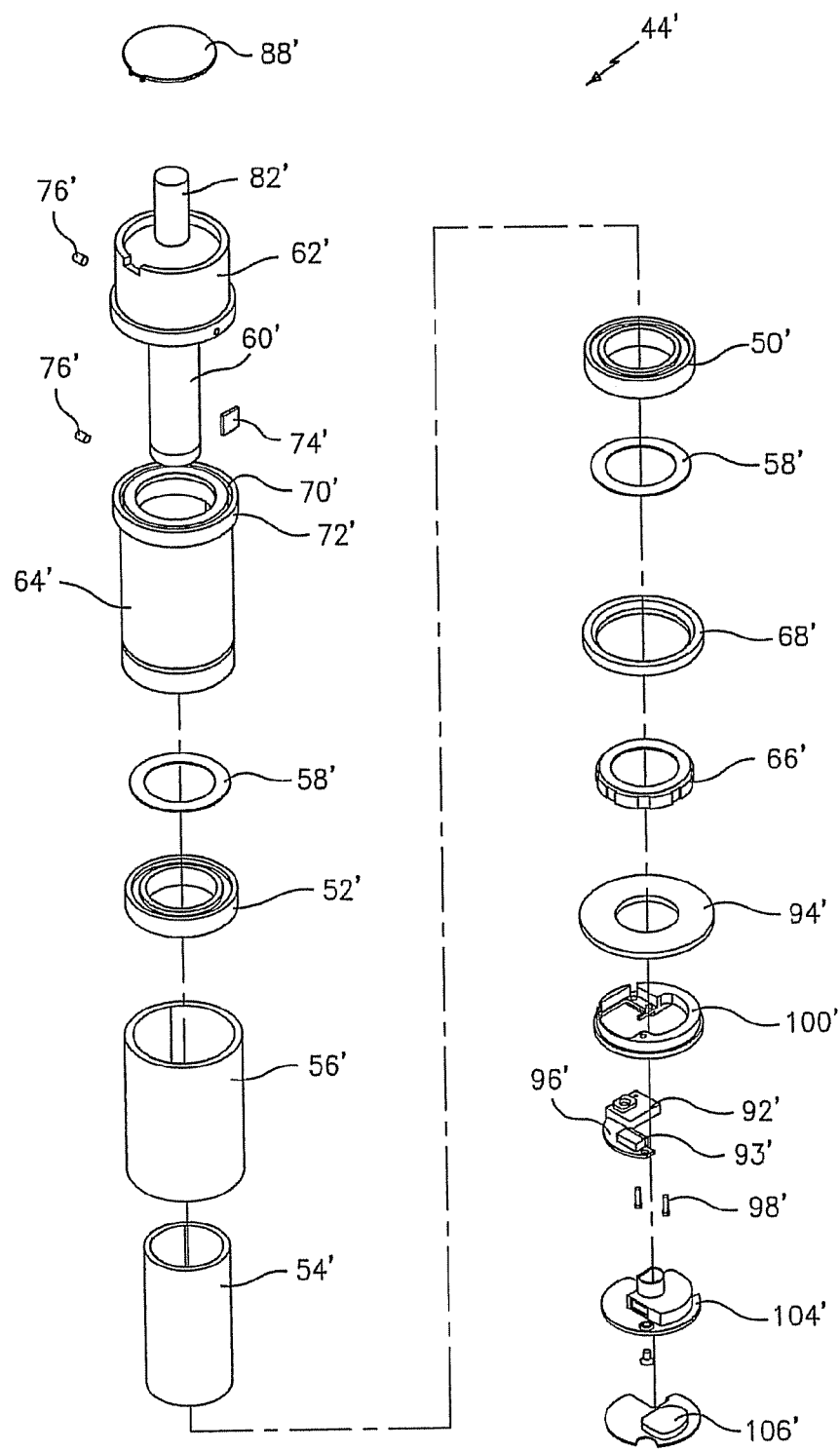
FIG. 11A is an exploded, perspective view similar to FIG. 11, but showing a single read head.

As mentioned, FIGS. 9 and 10 depict the elements of the modular bearing and encoder cartridge for axially long joint 16. FIGS. 11 and 12 depict the bearing and encoder cartridge for axial long joints 30 and 34. These cartridge assemblies are substantially similar to that shown FIGS. 9 and 10 and so are designated by 44'. Minor differences are evident from the FIGURES relative to cartridge 44 with respect to, for example, a differently configured wire cap/cover 88', slightly differing wire funnels/covers 104', 106' and the positioning of flange 72' at the upper end of housing 64'. Also, the flanges between housing 64' and shaft upper housing 62 are flared outwardly. Of course, the relative lengths of the various components shown in FIGS. 11 and 12 may differ slightly from that shown in FIGS. 9 and 10. Since all of these components are substantially similar, the components have been given the same identification numeral with the addition of a prime. FIG. 11A is similar to FIG. 11, but depicts a single read head embodiment.

Figure 13:
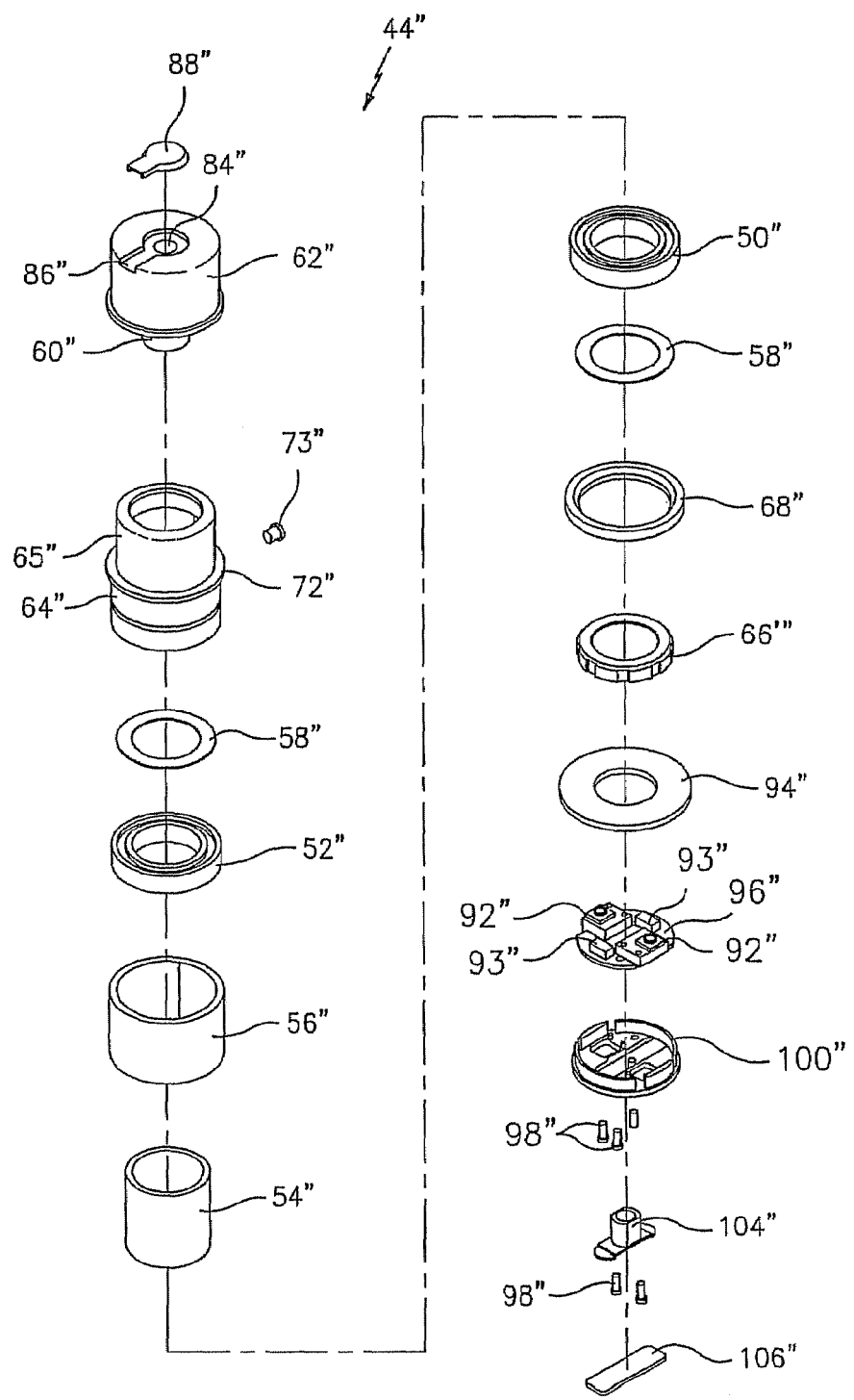
FIG. 13 is an exploded, perspective view of still another bearing/encoder cartridge in accordance with the present invention.
Figure 13A:
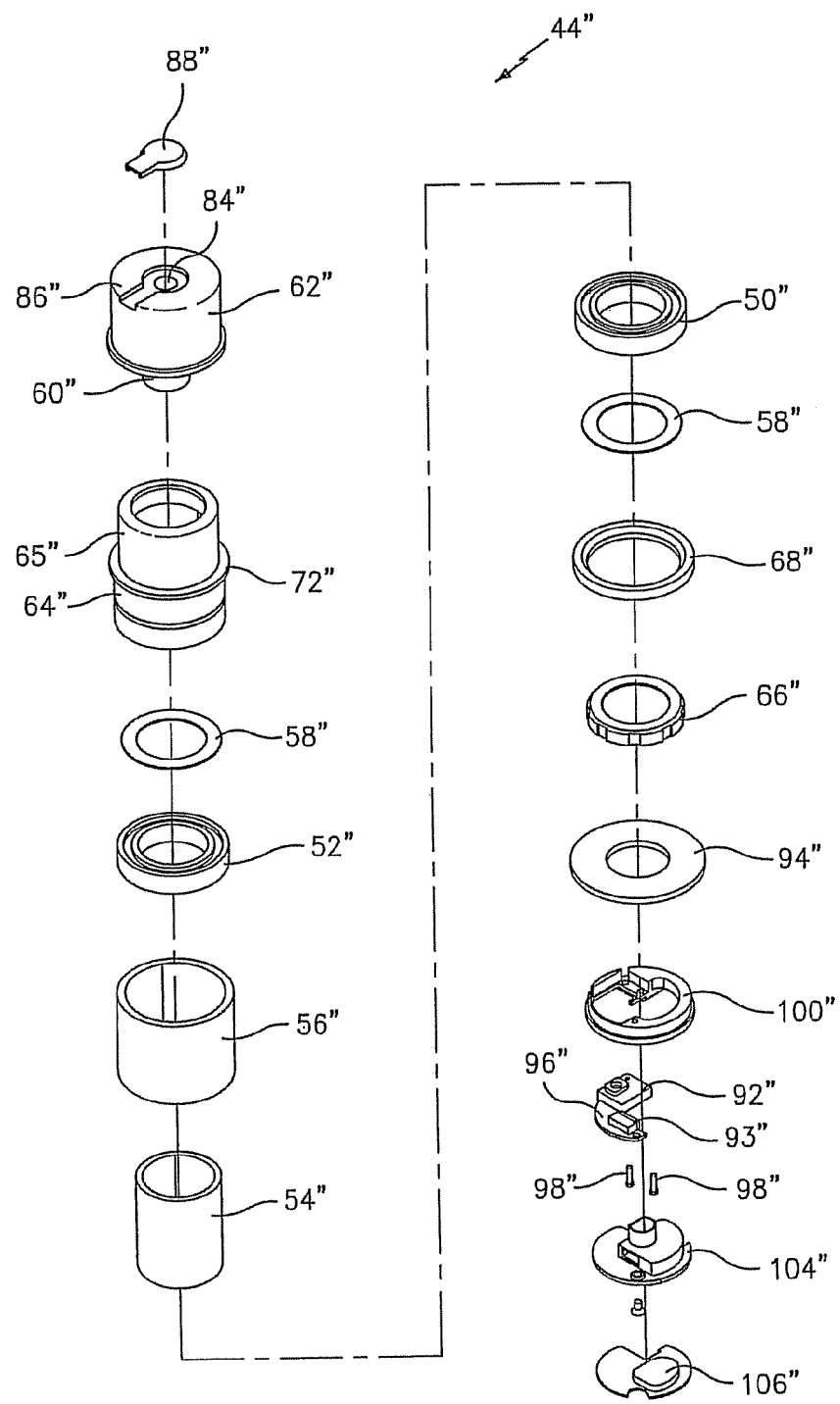
FIG. 13A is an exploded, perspective view similar to FIG. 13, but showing a single read head.
Figure 14:
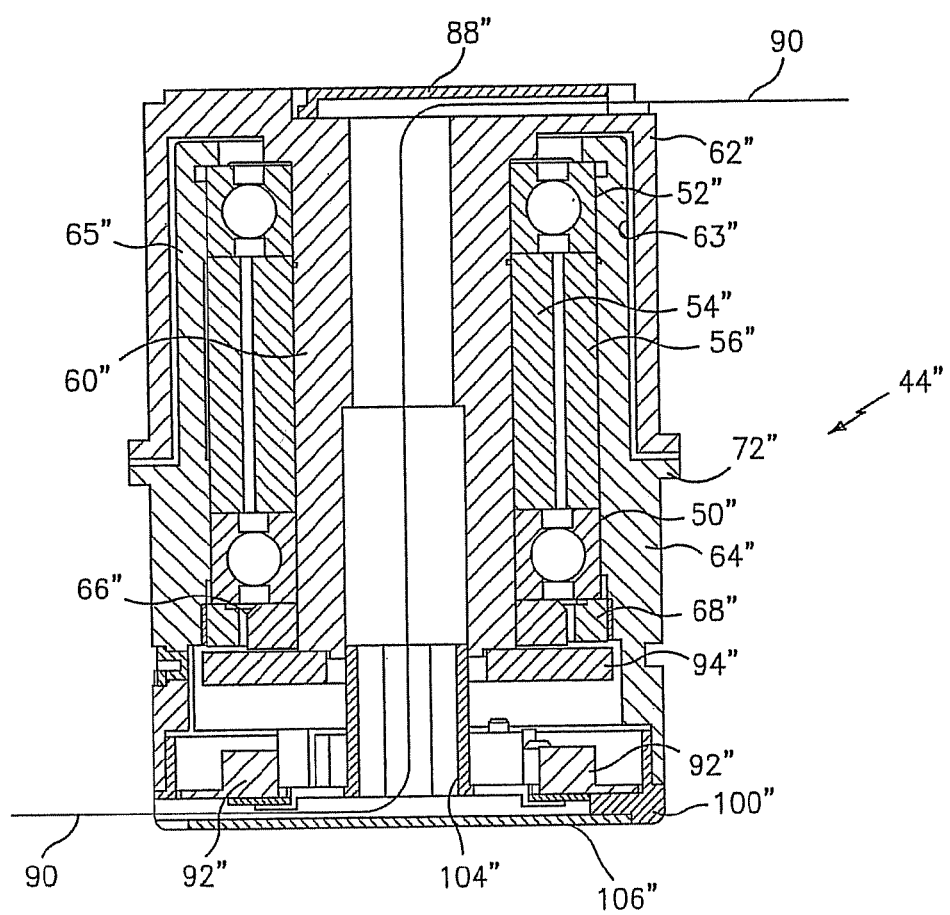
FIG. 14 is a cross-sectional elevation view of the cartridge of FIG. 13.

Turning to FIGS. 13 and 14, similar exploded and cross-sectional views are shown for the bearing and encoder cartridges in short hinge joints 32 and 36. As in the long axial joints 44' of FIGS. 11 and 12, the cartridges for the short hinge joints 32 and 36 are substantially similar to the cartridge 44 discussed in detail above and therefore the components of these cartridges are identified at 44" with similar components being identified using a double prime. It will be appreciated that because cartridges 44" are intended for use in short joints 32, 36, no slip ring assembly is required as the wiring will simply pass through the axial openings 78", 80" due to the hinged motion of these joints. FIG. 13A is similar to FIG. 13, but depicts a single read head embodiment.

Figure 15:
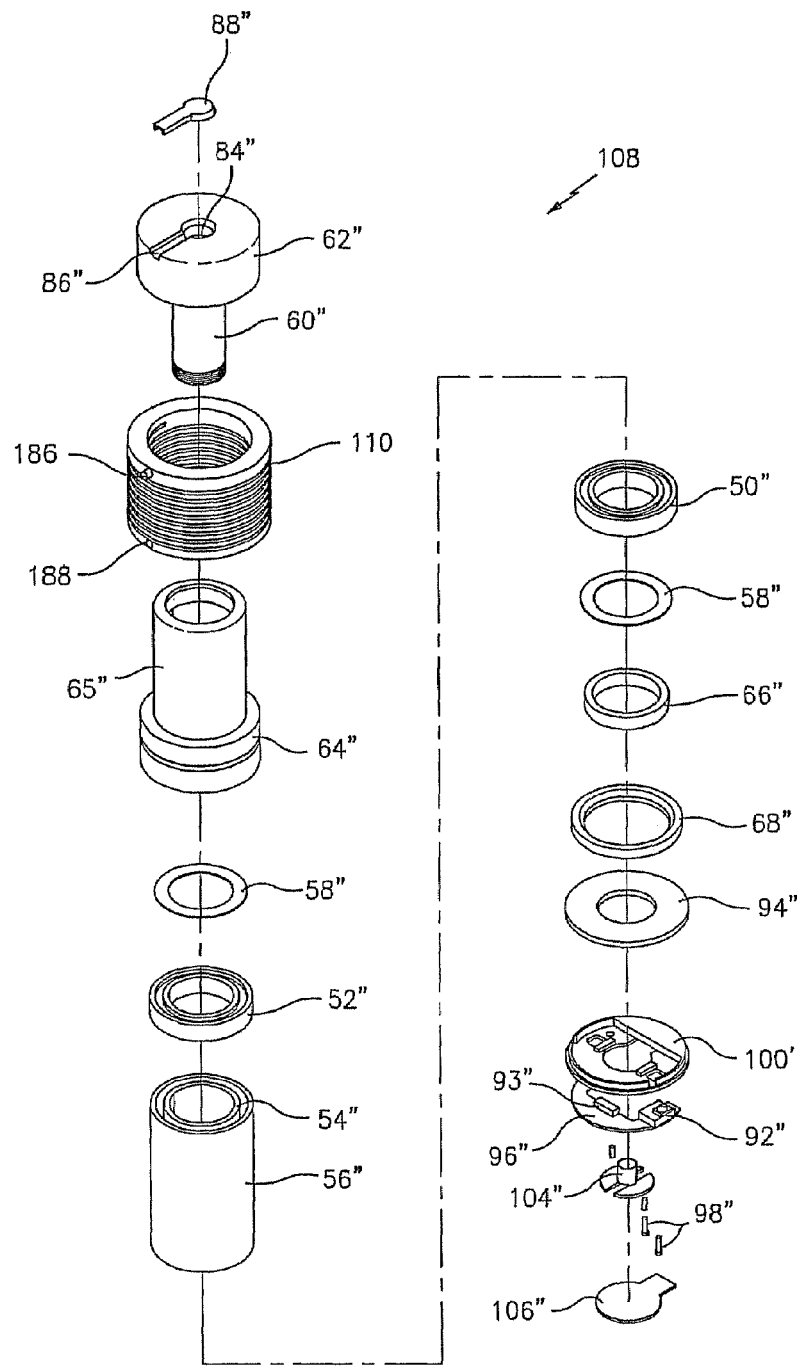
FIG. 15 is an exploded, perspective view of a bearing/encoder cartridge and counter balance spring in accordance with the present invention.
Figure 15A:
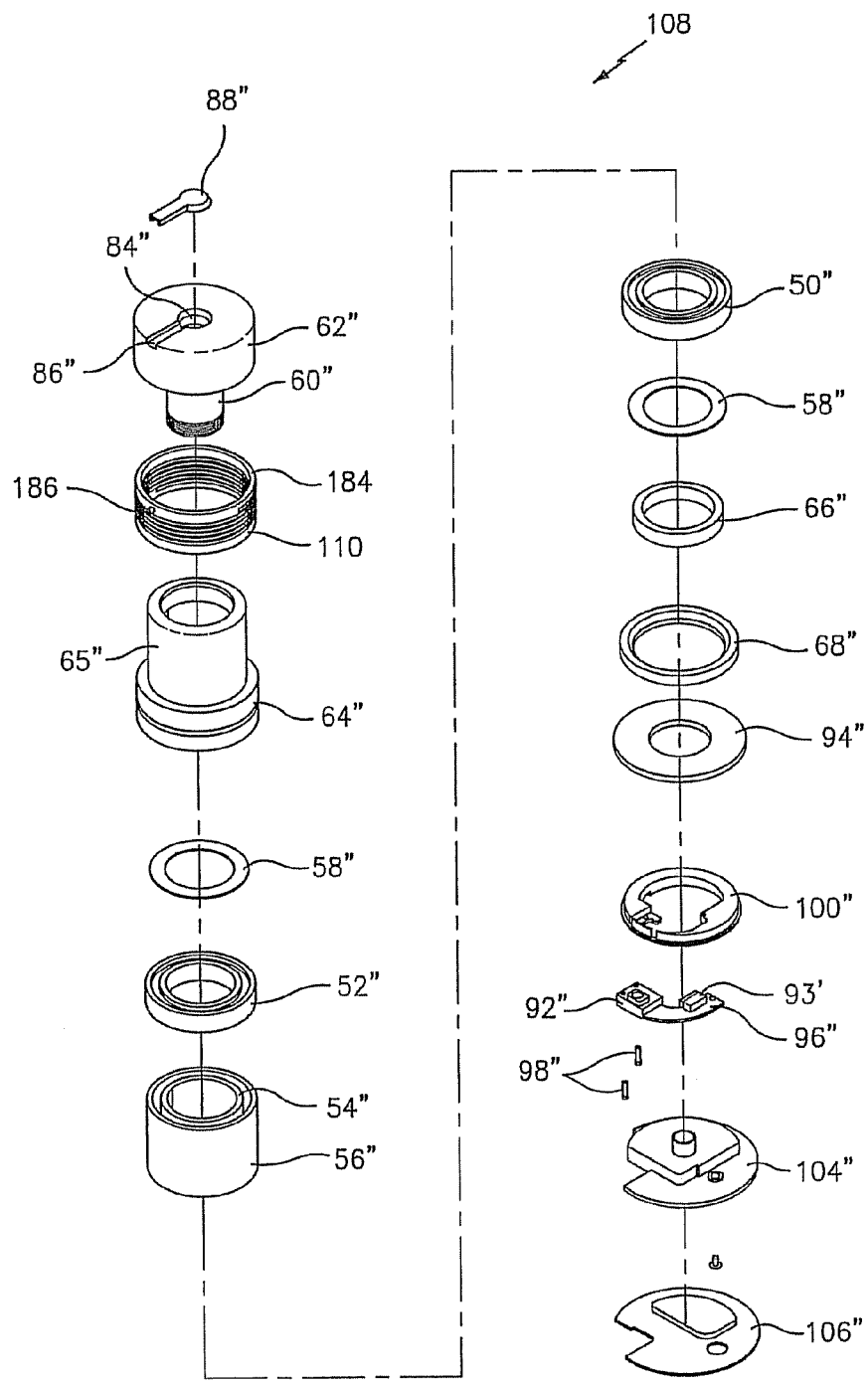
FIG. 15A is an exploded, perspective view similar to FIG. 15, but showing a single read head.
Figure 16:
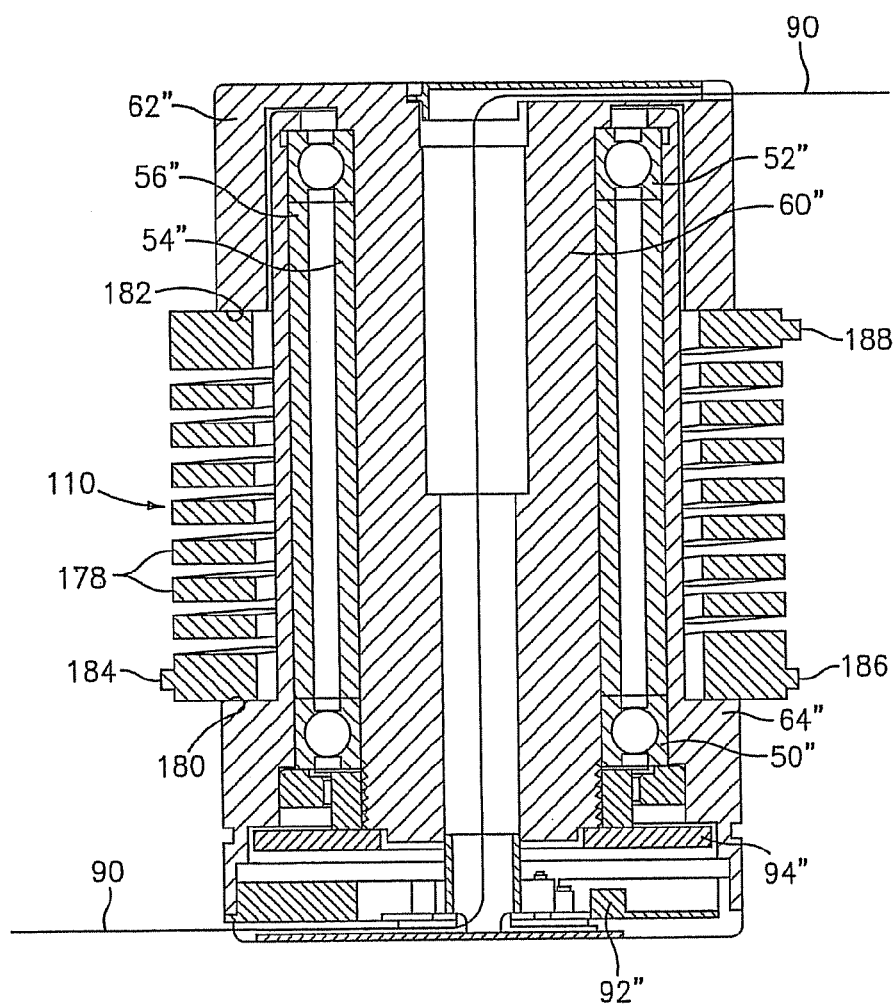
FIG. 16 is a cross-sectional elevation view of the cartridge and counter balance of FIG. 15.

Finally, with reference to FIGS. 15 and 16, the modular bearing/encoder cartridge for short hinge joint 18 is shown at 108. It will be appreciated that substantially all of the components of cartridge 108 are similar or the same as the components in cartridges 44, 44' and 44" with the important exception being the inclusion of a counter balance assembly. This counter balance assembly includes a counter balance spring 110 which is received over housing 64" and provides an important counter balance function to CMM 10. FIG. 15A is similar to FIG. 15, but depicts a single read head embodiment.

Figure 17:
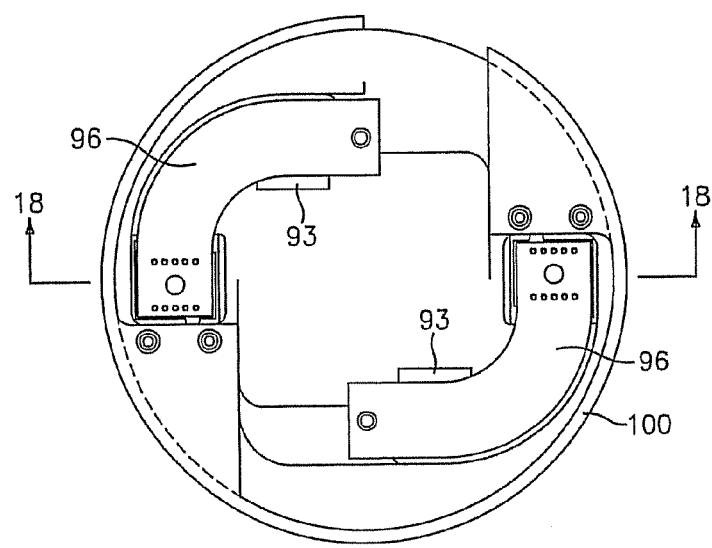
FIG. 17 is a top plan view of a dual read head assembly for a larger diameter bearing/encoder cartridge used in accordance with the present invention.
Figure 18:
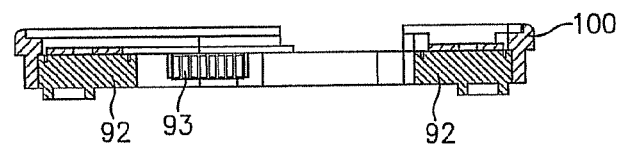
FIG. 18 is a cross-sectional elevation view along the line 18-18 of FIG. 17.
Figure 19:
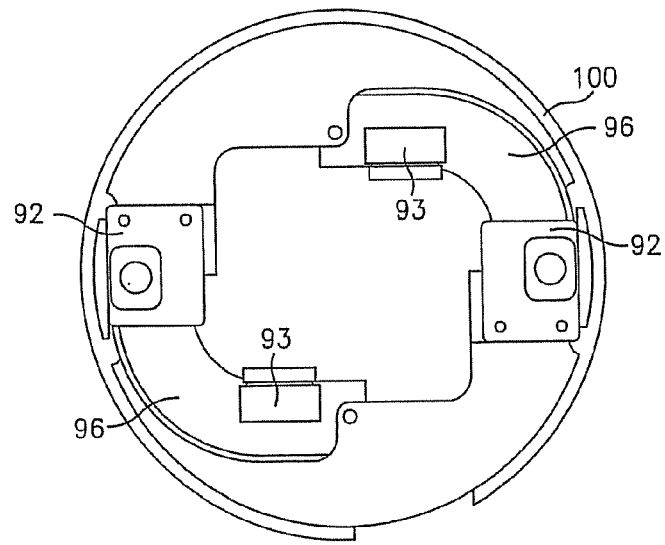
FIG. 19 is a bottom plan view of the dual read head assembly of FIG. 17.
Figure 20:
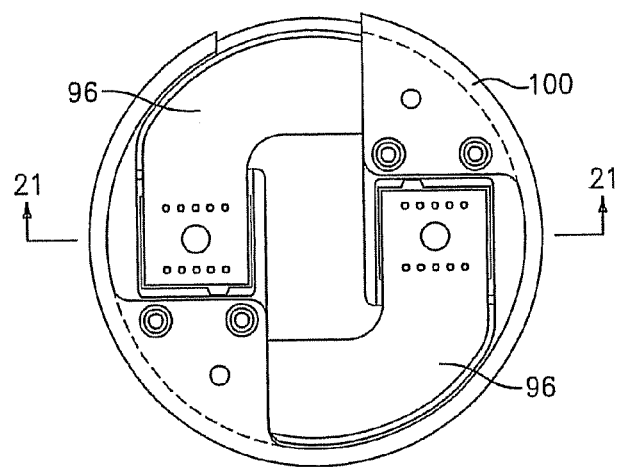
FIG. 20 is a top plan view of a dual read head assembly for a smaller diameter bearing/encoder cartridge in accordance with the present invention.
Figure 21:
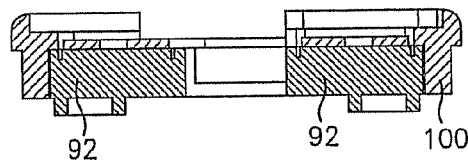
FIG. 21 is a cross-sectional elevation view along the line 21-21 of FIG. 20.
Figure 22:
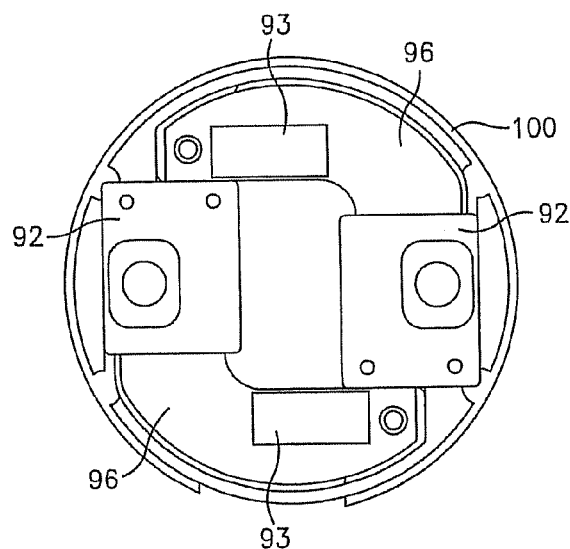
FIG. 22 is a bottom plan view of the dual read head assembly of FIG. 20.

As mentioned, in a preferred embodiment, more than one read head may be used in the encoder. It will be appreciated that angle measurement of an encoder is effected by disk run out or radial motion due to applied loads. It has been determined that two read heads positioned at 180° from each other will result in run out causing cancellation effects in each read head. These cancellation effects are averaged for a final "immune" angle measurement. Thus, the use of two read heads and the resultant error cancellation will result in a less error prone and more accurate encoder measurement. FIGS. 17-19 depict the bottom, cross-sectional and top views respectively for a dual read head embodiment useful in, for example, a larger diameter cartridge such as found in joints 16 and 18 (that is, those joints nearest the base). Thus, a cartridge end cap 100 has mounted thereto a pair of circuit boards 96 with each circuit board 96 having a read head 92 mechanically attached thereto. The read heads 92 are preferably positioned 180° apart from each other to provide for the error cancellation resulting from the run out or radial motion of the disk. Each board 96 additionally includes a connector 93 for attachment of the circuit board 96 to the internal bus and/or other wiring as will be discussed hereinafter. FIGS. 20-22 depict substantially the same components as in FIGS. 17-19 with the primary difference being a smaller diameter cartridge end cap 100. This smaller diameter dual read head embodiment would be associated with the smaller diameter cartridges of, for example, joints 30, 32, 34 and 36.

Figure 23A:
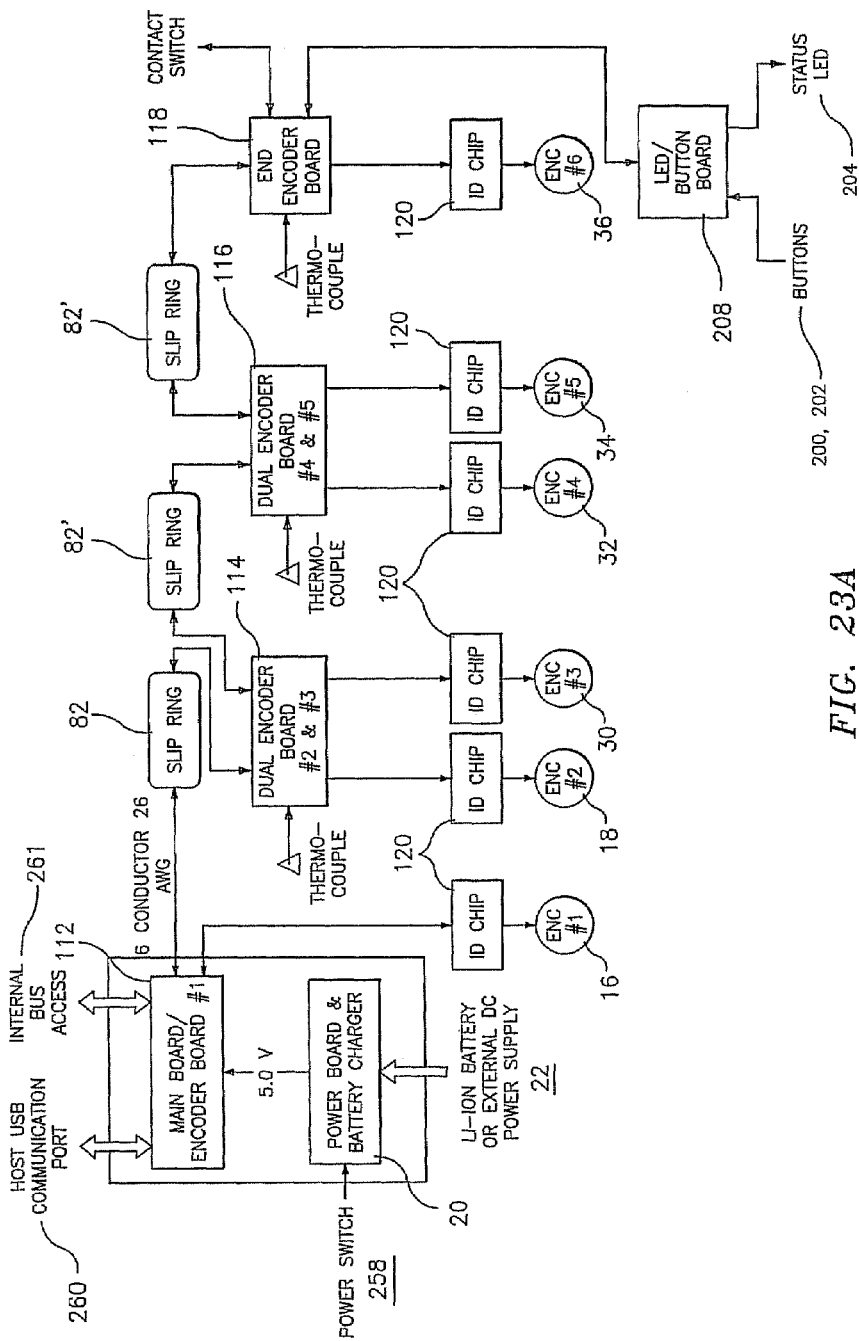
FIG. 23A is a block diagram depicting the electronics configuration for the CMM of the present invention using a single read head and FIG. 23B is a block diagram depicting the electronics configuration for the CMM of the present invention using a dual read head.

Turning now to FIG. 23A, a block diagram of the electronics is shown for the single read head embodiment of FIGS. 9A, 11A, 13A and 15A. It will be appreciated that CMM 10 preferably includes an external bus (preferably a USB bus) 260 and an internal bus (preferably RS-485) 261 which is designed to be expandable for more encoders as well as either an externally mounted rail or additional rotational axes such as a seventh axis. The internal bus is preferably consistent with RS485 and this bus is preferably configured to be used as a serial network in a manner consistent with the serial network for communicating data from transducers in a portable CMM arm as disclosed in commonly assigned U.S. Pat. No. 6,219,928, all of the contents of which have been incorporated herein by reference.

Figure 24:
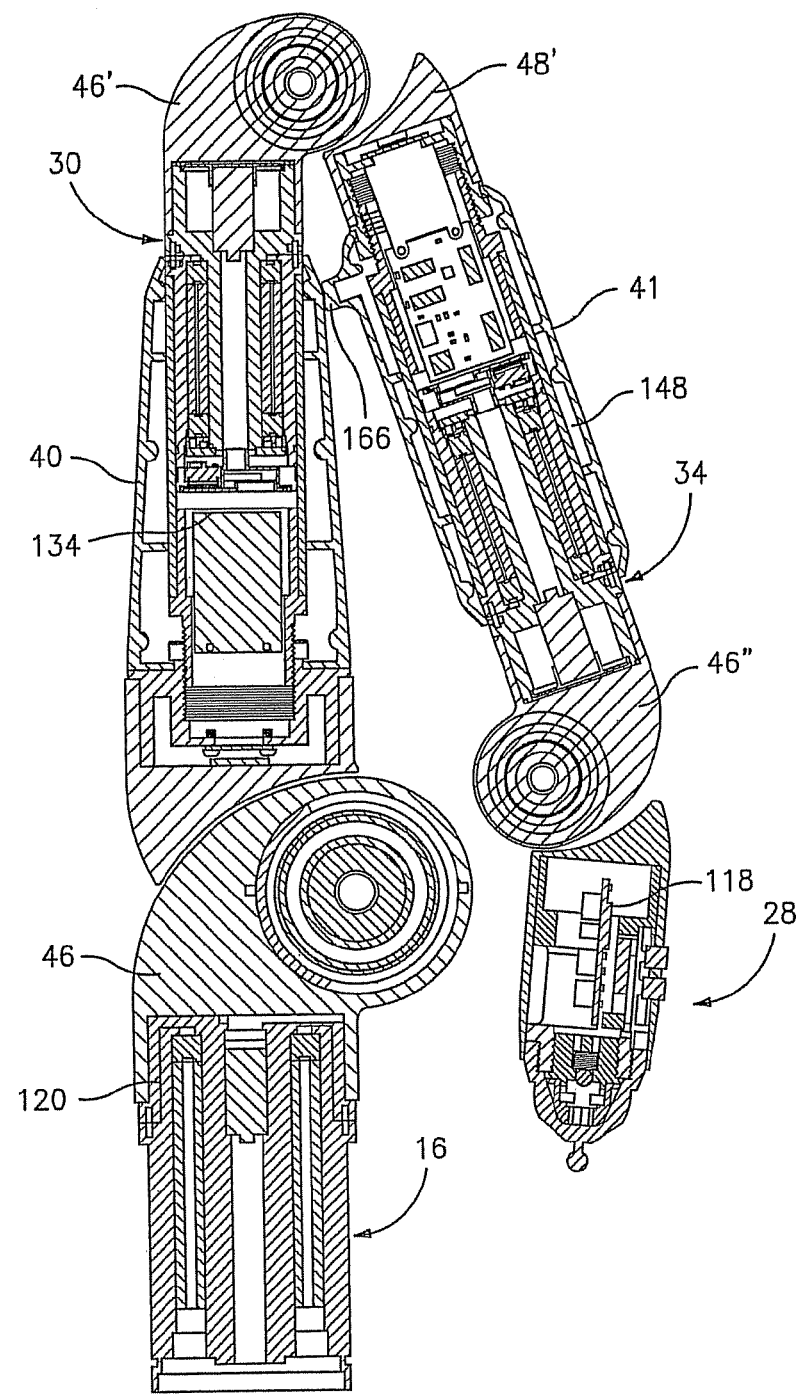
FIG. 24 is a cross-sectional elevation view longitudinally through the CMM of the present invention (with the base removed)

With reference to FIG. 23A, it will be appreciated that each encoder in each cartridge is associated with an encoder board. The encoder board for the cartridge in joint 16 is positioned within base 12 and is identified at 112 in FIG. 25. The encoders for joints 18 and 30 are processed on a dual encoder board which is located in the second long joint 30 and is identified at 114 in FIG. 26. FIG. 26 also depicts a similar dual encoder board 116 for the encoders used in joints 32 and 34, board 116 being positioned in third long joint 34 as shown in FIG. 26. Finally, the end encoder board 118 is positioned within measurement probe handle 28 as shown in FIG. 24 and is used to process the encoders in short joint 36. Each of the boards 114, 116 and 118 are associated with a thermocouple to provide for thermal compensation due to temperature transients. Each board 112, 114, 116 and 118 incorporates embedded analog-to-digital conversion, encoder counting and serial port communications. Each board also has read programmable flash memory to allow local storage of operating data. The main processor board 112 is also field programmable through the external USB bus 260. As mentioned, the internal bus (RS-485) 261 is designed to be expandable for more encoders which also includes either an externally mounted rail and/or seventh rotation axis. An axis port has been provided to provide internal bus diagnosis. Multiple CMMs of the type depicted at 10 in these FIGURES may be attached to a single application due to the capabilities of the external USB communications protocol. Moreover, multiple applications may be attached to a single CMM 10 for the very same reasons.

Preferably, each board 112, 114, 116 and 118 includes a 16-bit digital signal processor such as the processor available from Motorola under the designation DSP56F807. This single processing component combines many processing features including serial communication, quadrature decoding, A/D converters and on-board memory thus allowing a reduction of the total number of chips needed for each board.

In accordance with another important feature of the present invention, each of the encoders is associated with an individualized identification chip 120. This chip will identify each individual encoder and therefore will identify each individual bearing/encoder modular cartridge so as to ease and expedite quality control, testing, and repair.

Figure 23B:
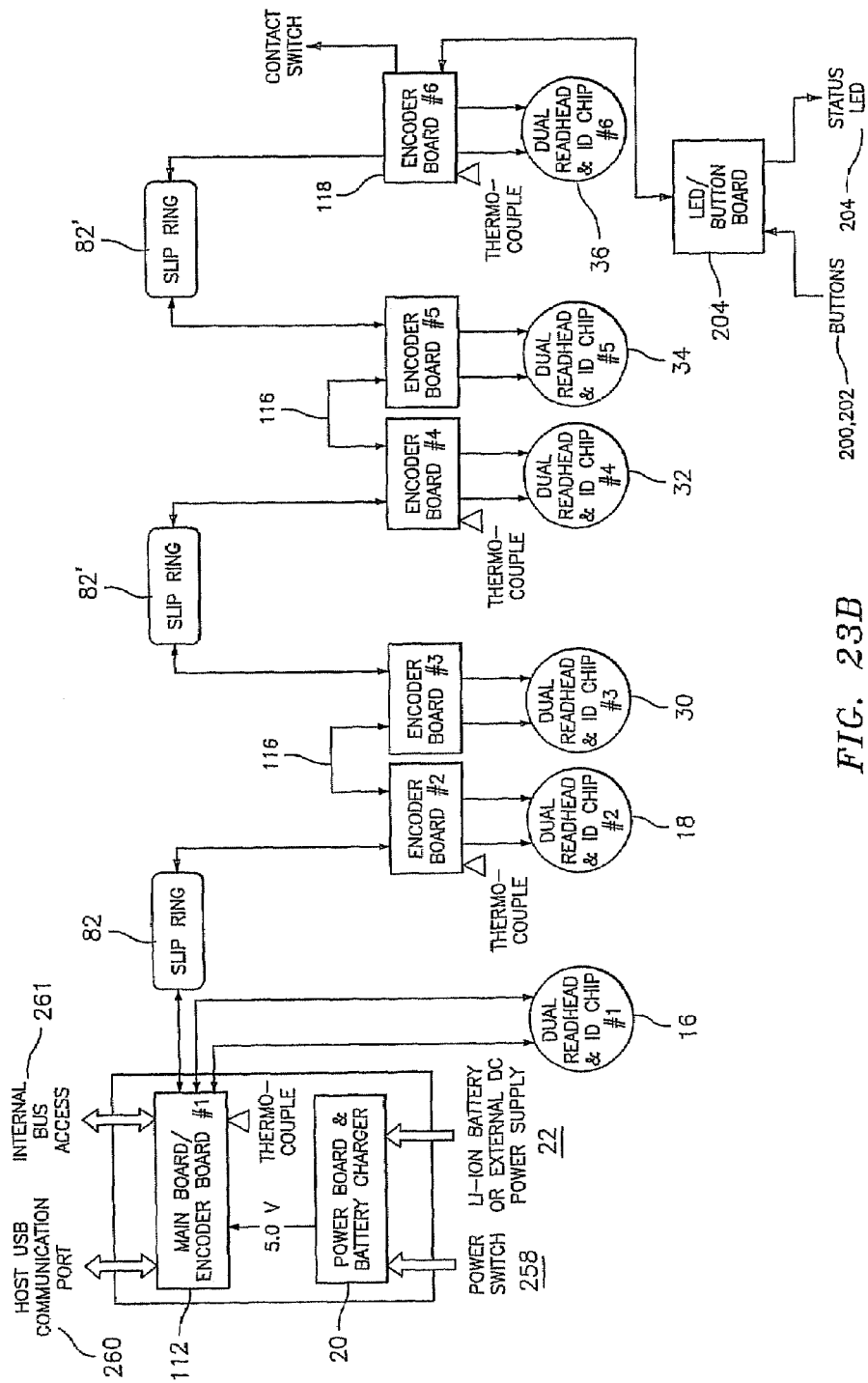

FIG. 23B is an electronics block diagram which is similar to FIG. 23A, but depicts the dual read head embodiment of FIGS. 10, 12, 14 and 16-22.

Figure 25:
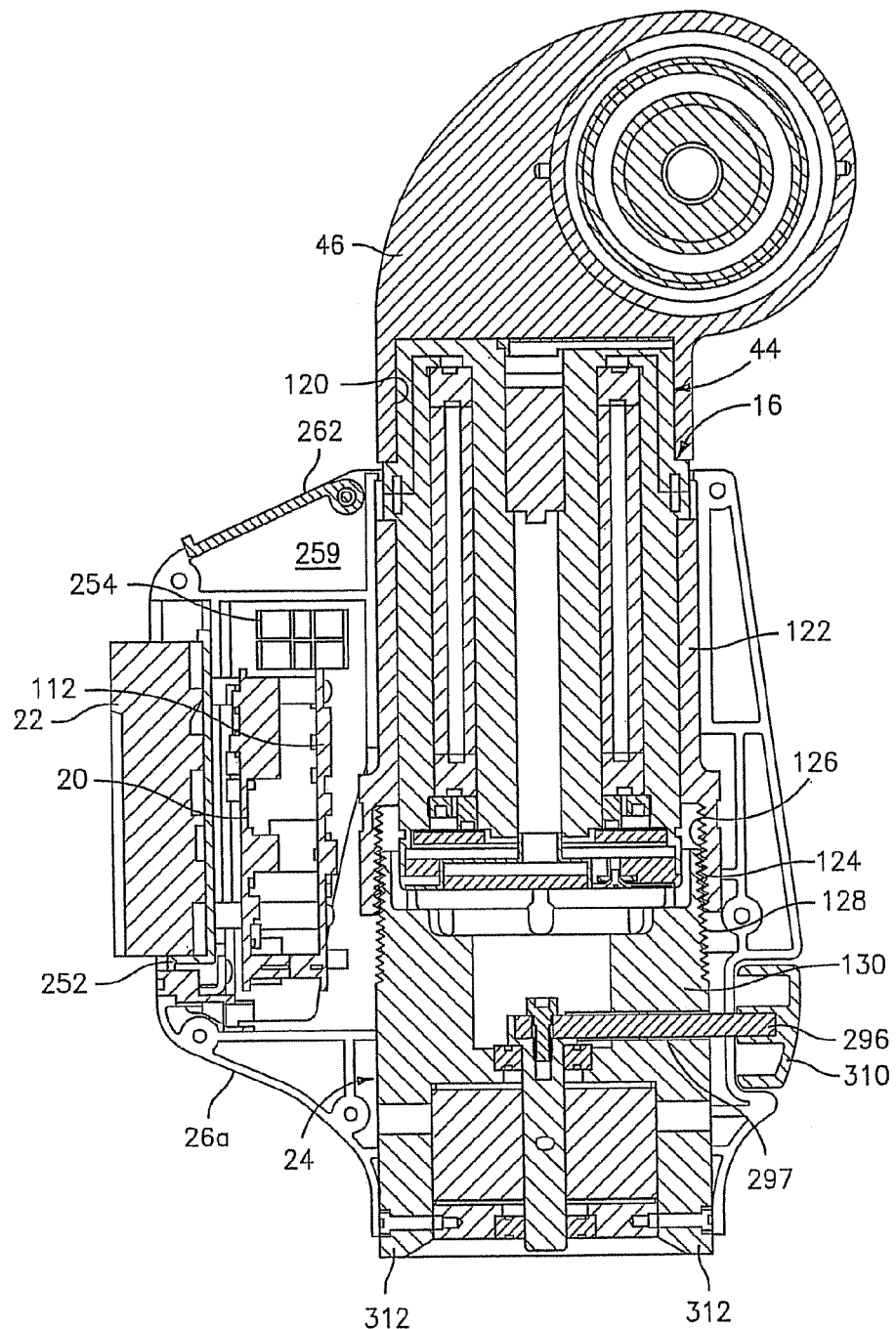
FIG. 25 is an enlarged cross-sectional view of a portion of FIG. 24 depicting the base and first long joint segment of the CMM of FIG. 24.
Figure 25B:
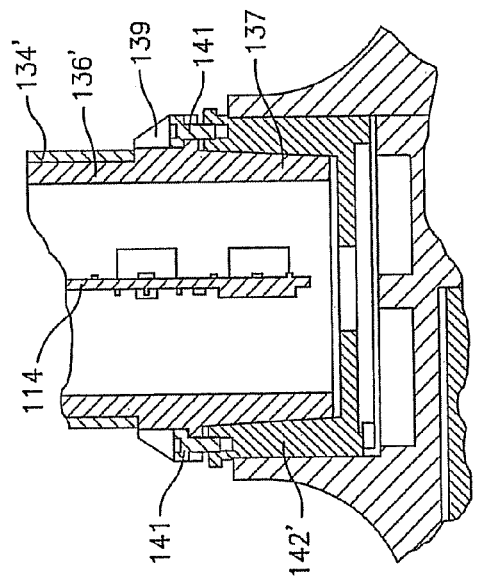
FIG. 25B is a cross-sectional elevation view longitudinally through a portion of FIG. 25A.
Figure 25A:
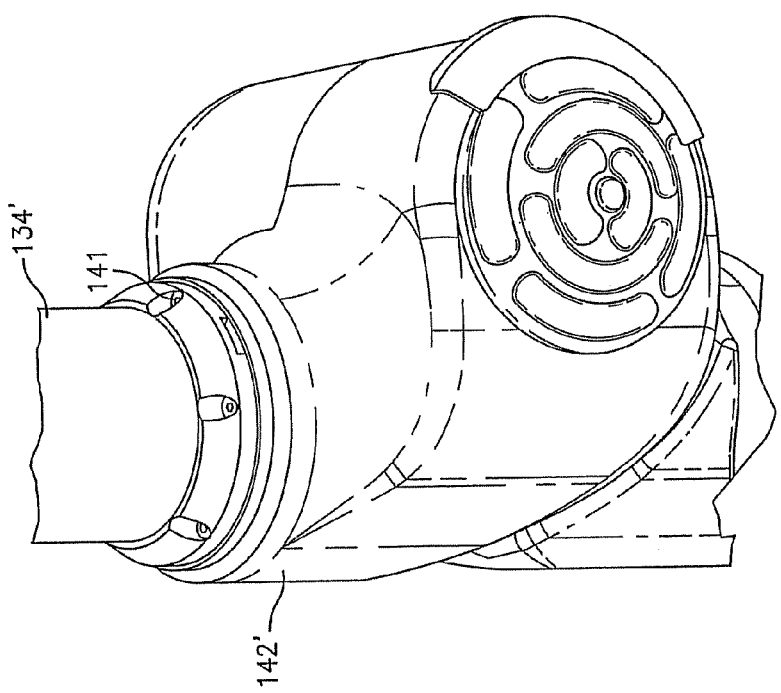
FIG. 25A is a perspective view of the interconnection between a long and short joint in accordance with an alternative embodiment of the present invention.
Figure 26:
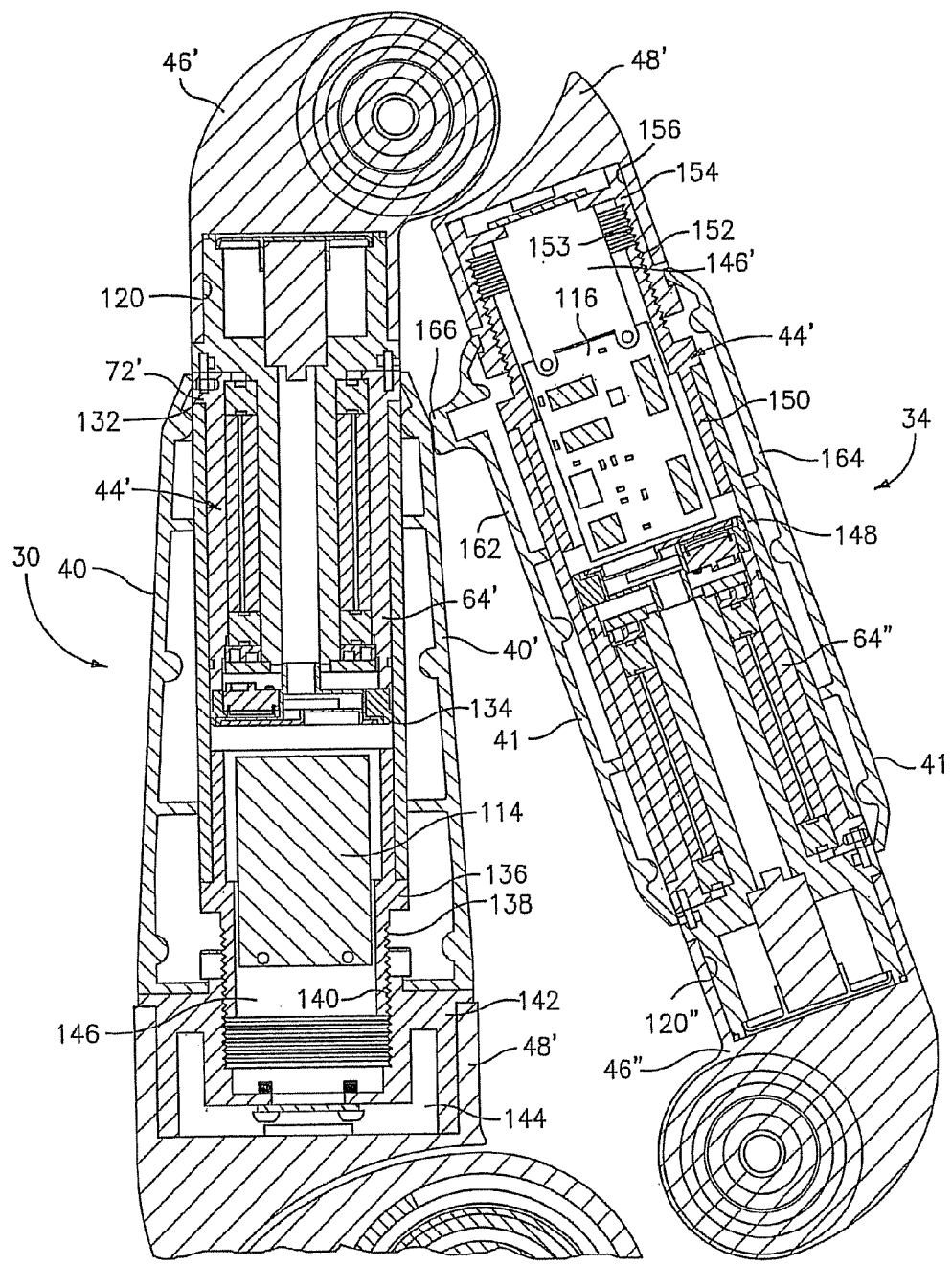
FIG. 26 is an enlarged cross-sectional view of a portion of FIG. 24 depicting the second and third long joint segments.

With reference to FIGS. 24-26, the assembly of each cartridge in the articulated arm 14 will now be described (note that FIG. 24 depicts arm 10 without base 12. Note also that FIGS. 24-26 employ the single read head embodiments of FIGS. 9A, 11A, 13A and 15A). As shown in FIG. 25, the first long joint 16 includes a relatively long cartridge 44, the upper end of which has been inserted into a cylindrical socket 120 of dual socket joint 46. Cartridge 44 is securely retained within socket 120 using a suitable adhesive. The opposite, lower end of cartridge 44 is inserted into an extension tube, which in this embodiment may be an aluminum sleeve 122 (but sleeve 122 may also be comprised of a stiff alloy or composite material). Cartridge 44 is secured in sleeve 122 again using a suitable adhesive. The lower end of sleeve 122 includes a larger outer diameter section 124 having internal threading 126 thereon. Such threading is outwardly tapered and is configured to threadably mate with inwardly tapered threading 128 on magnetic mount housing 130 as is clearly shown in FIG. 4. As has been discussed, all of the several joints of CMM 10 are interconnected using such tapered threading. Preferably, the tapered thread is of the NPT type which is self-tightening and therefore no lock nuts or other fastening devices are needed. This threading also allows for and should include a thread locking agent.

Turning to FIG. 26, as in first long joint 16, long cartridge 44' is adhesively secured in the cylindrical opening 120' of dual socket joint 46'. The outer housing 64' of cartridge 44' includes a shoulder 132 defined by the lower surface of flange 72'. This shoulder 132 supports cylindrical extension tube 134 which is provided over and surrounds the outer surface of housing 64'. Extension tubes are used in the joints to create a variable length tube for attachment to a threaded component. Extension tube 134 thus extends outwardly from the bottom of cartridge 64' and has inserted therein a threaded sleeve 136. Appropriate adhesive is used to bond housing 44' to extension tube 134 as well as to bond sleeve 136 and tube 134 together. Sleeve 136 terminates at a tapered section having outer threading 138 thereon. Outer threading threadably mates with internal threading 140 on connecting piece 142 which has been adhesively secured in opening 144 of dual socket joint 48. Preferably, extension tube 134 is composed of a composite material such as an appropriate carbon fiber composite while threadable sleeve 136 is composed of aluminum so as to match the thermal properties of the dual socket joint 48. It will be appreciated that PC board 114 is fastened to a support 146 which in turn is secured to dual socket joint support 142.

In addition to the aforementioned threaded connections, one, some or all of the joints may be interconnected using threaded fasteners as shown in FIGS. 25A-B. Rather than the threaded sleeve 136 of FIG. 26, sleeve 136' of FIG. 25B has a smooth tapered end 137 which is received in a complimentary tapered socket support 142'. A flange 139 extends circumferentially outwardly from sleeve 136' with an array of bolt holes (in this case 6) therethrough for receiving threaded bolts 141. Bolts 141 are threadably received in corresponding holes along the upper surface of socket support 142'. An extension tube 134' is received over sleeve 136' as in the FIG. 26 embodiment. The complimentary tapered male and female interconnections for the joints provide improved connection interfaces relative to the prior art.

Still referring to FIG. 26, long cartridge 44" of third long joint 34 is secured to arm 14 in a manner similar to cartridge 44' of long joint 30. That is, the upper portion of cartridge 44" is adhesively secured into an opening 120" of dual socket joint 46". An extension tube 148 (preferably composed of a composite material as described with respect to tube 134) is positioned over outer housing 64" and extends outwardly thereof so as to receive a mating sleeve 150 which is adhesively secured to the interior diameter of extension tube 148. Mating sleeve 150 terminates at a tapered section having outer threading 152 and mates with complimentary interior threading 153 on dual socket joint support 154 which has been adhesively attached to a cylindrical socket 156 within dual socket joint 148'. Printed circuit board 116 is similarly connected to the dual socket joint using the PCB support 146' which is secured to dual socket joint support 154.

As discussed with respect to FIGS. 7 and 8, the short cartridges 44' in FIGS. 13 and 14 and 108 of FIG. 15 are simply positioned between two dual socket joints 46, 48 and are secured within the dual socket joints using an appropriate adhesive. As a result, the long and short cartridges are easily attached to each other at right angles (or, if desired, at angles other than right angles).

The modular bearing/transducer cartridges as described above constitute an important technological advance in portable CMM's such as shown, for example, in U.S. Pat. No. 5,794,356 to Raab and U.S. Pat. No. 5,829,148 to Eaton. This is because the cartridge (or housing of the cartridge) actually defines a structural element of each joint which makes up the articulated arm. As used herein, "structural element" means that the surface of the cartridge (e.g., the cartridge housing) is rigidly attached to the other structural components of the articulated arm in order to transfer rotation without deformation of the arm (or at most, with only de minimis deformation). This is in contrast to conventional portable CMM's (such as disclosed in the Raab '356 and Eaton '148 patents) wherein separate and distinct joint elements and transfer elements are required with the rotary encoders being part of the joint elements (but not the transfer elements). In essence, the present invention has eliminated the need for separate transfer elements (e.g., transfer members) by combining the functionality of the joint and transfer elements into a singular modular component (i.e., cartridge). Hence, rather than an articulated arm comprised of separate and distinct joints and transfer members, the present invention utilizes an articulated arm made up of a combination of longer and shorter joint elements (i.e., cartridges), all of which are structural elements of the arm. This leads to better efficiencies relative to the prior art. For example, the number of bearings used in a joint/transfer member combination in the '148 and '582 patent was four (two bearings in the joint and two bearings in the transfer member) whereas the modular bearing/transducer cartridge of the present invention may utilize a minimum of one bearing (although two bearings are preferred) and still accomplish the same functionality (although in a different and improved way).

Figure 3A:
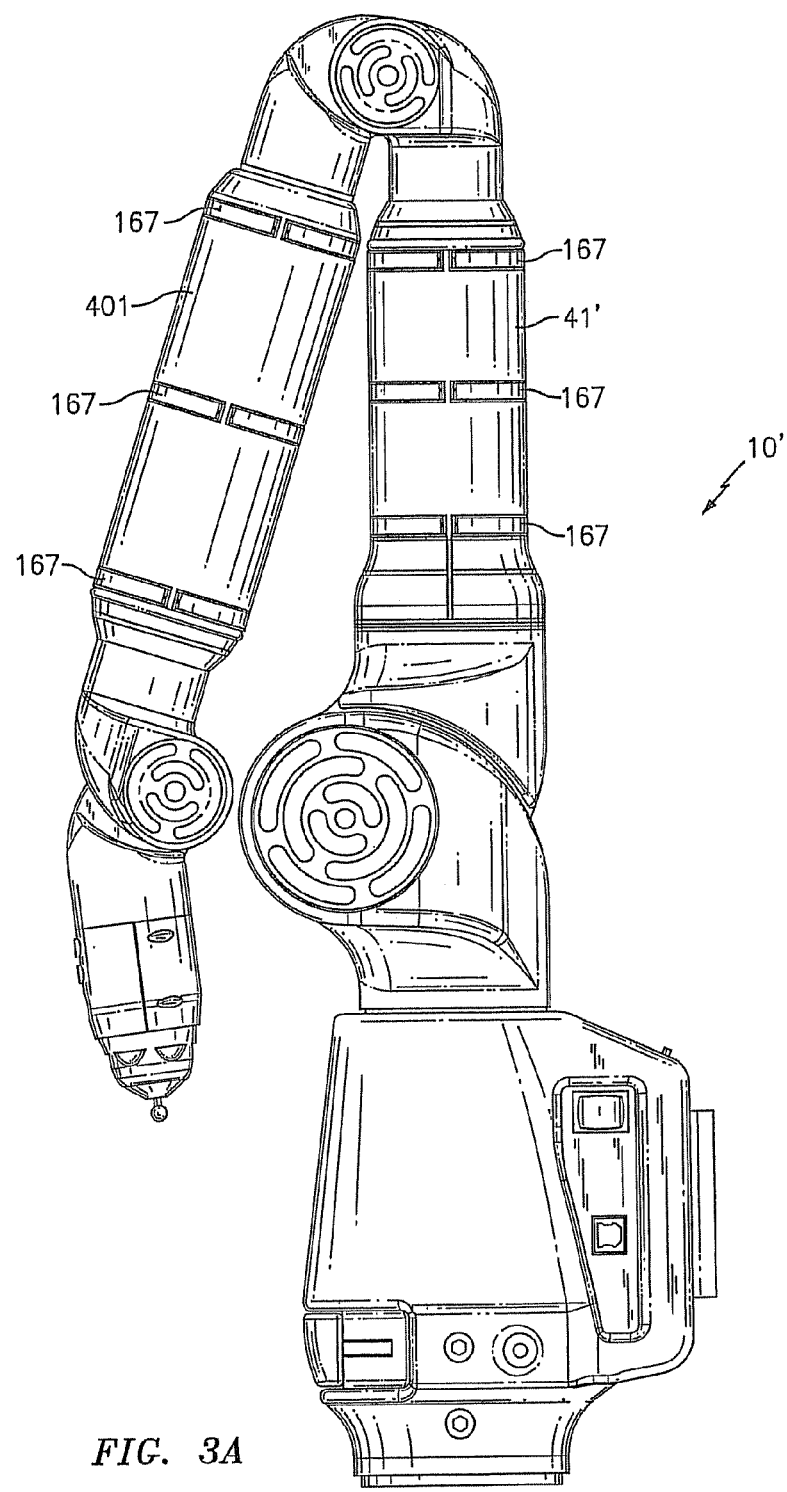
FIG. 3A is a right side view of the CMM of FIG. 1 with slightly modified protective sleeves covering two of the long joints.
Figure 24A:
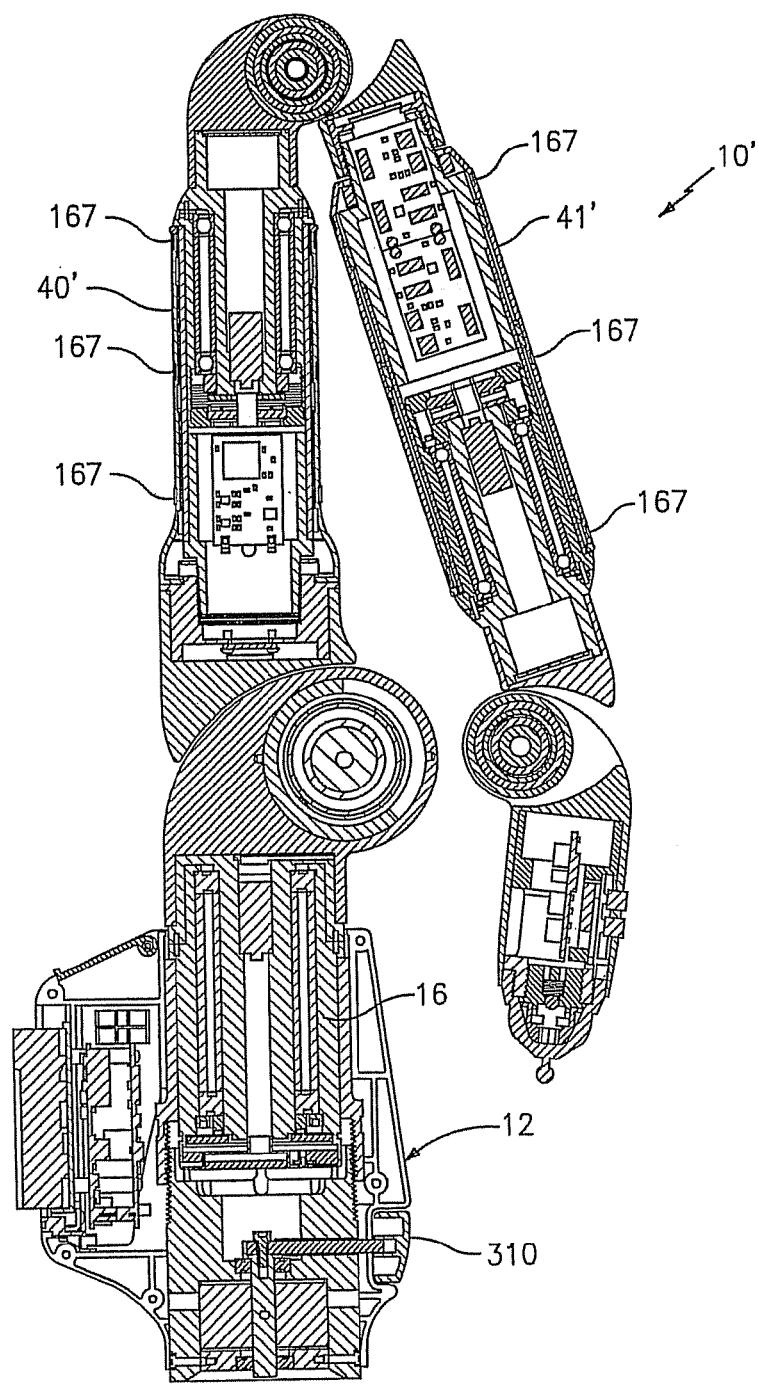
FIG. 24A is a cross-sectional elevation view of the CMM of FIG. 3A.
Figure 26A:
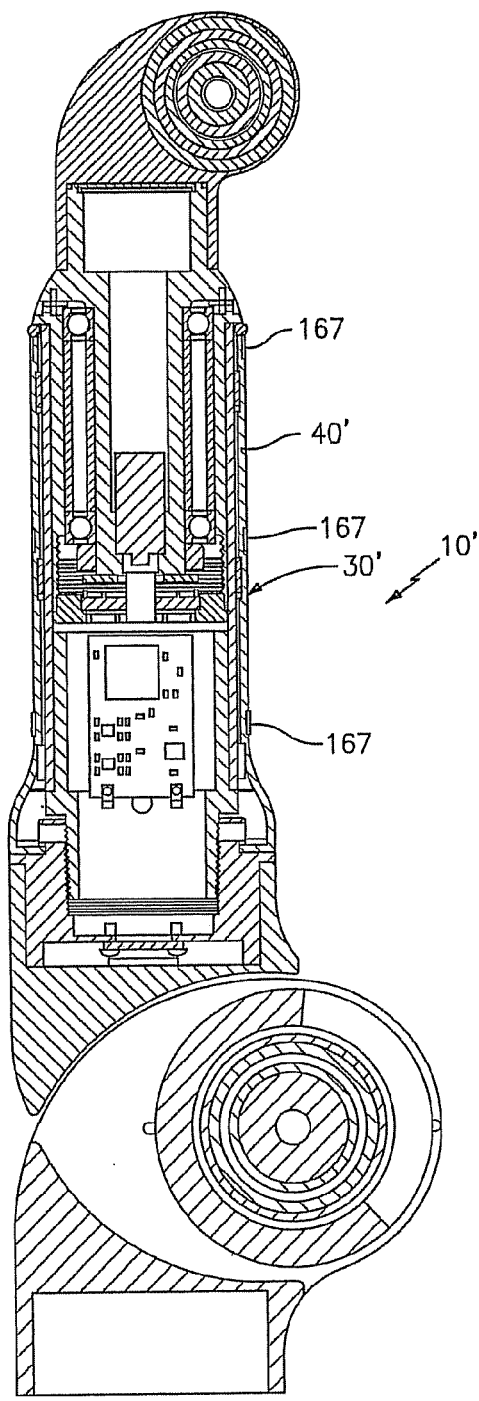
FIGS. 26A and B are enlarged cross-sectional views of portions of FIG. 24A depicting the second and third long joints as well as the probe.
Figure 26B:
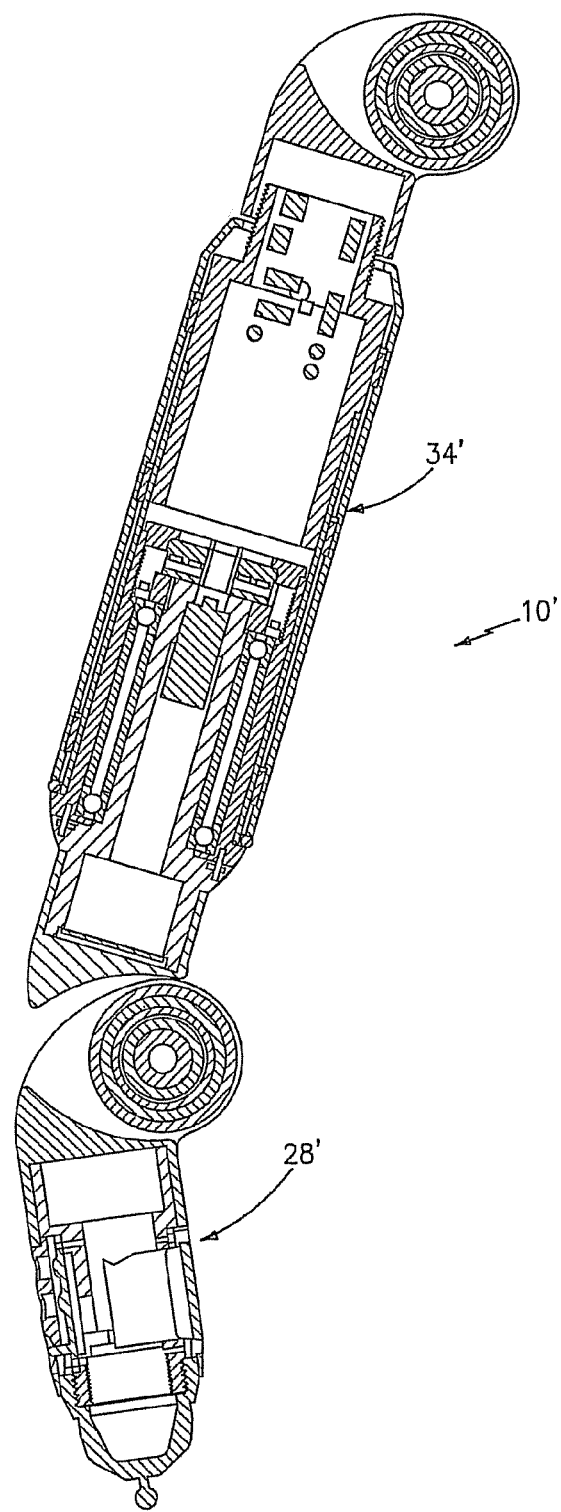

FIGS. 24A and 26A-B are cross-sectional views, similar to FIGS. 24-26, but showing the dual read head embodiments of FIGS. 10, 12, 14 and 16-22 and are further cross-sections of the CMM 10' shown in FIG. 3A.

The overall length of articulated arm 14 and/or the various arm segments may vary depending on its intended application. In one embodiment, the articulated arm may have an overall length of about 24 inches and provide measurements on the order of about 0.0002 inch to 0.0005 inch. This arm dimension and measurement accuracy provides a portable CMM which is well suited for measurements now accomplished using typical hand tools such as micrometers, height gages, calipers and the like. Of course, articulated arm 14 could have smaller or larger dimensions and accuracy levels. For example, larger arms may have an overall length of 8 or 12 feet and associated measurement accuracies of 0.001 inch thus allowing for use in most real time inspection applications or for use in reverse engineering.

CMM 10 may also be used with a controller mounted thereto and used to run a relatively simplified executable program as disclosed in aforementioned U.S. Pat. No. 5,978, 748 and application Ser. No. 09/775,226; or may be used with more complex programs on host computer 172.

With reference to FIGS. 1-6 and 24-26, in a preferred embodiment, each of the long and short joints are protected by an elastomeric bumper or cover which acts to limit high impact shock and provide ergonomically pleasant gripping locations (as well as an aesthetically pleasing appearance). The long joints 16, 30 and 34 are all protected by a rigid plastic (e.g., ABS) replaceable cover which serves as an impact and abrasion protector. For the first long joint 16, this rigid plastic replaceable cover comes in the form of the two-piece base housing 26A and 26B as is also shown in FIG. 4. Long joints 30 and 34 are each protected by a pair of cover pieces 40 and 41 which, as shown in FIGS. 5 and 6 may be fastened together in a clam shell fashion using appropriate screws so as to form a protective sleeve. It will be appreciated that in a preferred embodiment, this rigid plastic replaceable cover for each long joint 30 and 34 will surround the preferably composite (carbon fiber) extension tube 134 and 148, respectively.

Preferably, one of the covers, in this case cover section 41, includes a slanted support post 166 integrally molded therein which limits the rotation at the elbow of the arm so as to restrict probe 28 from colliding with base 12 in the rest position. This is best shown in FIGS. 3, 24 and 26. It will be appreciated that post 166 will thus limit unnecessary impact and abrasion.

Figure 31:
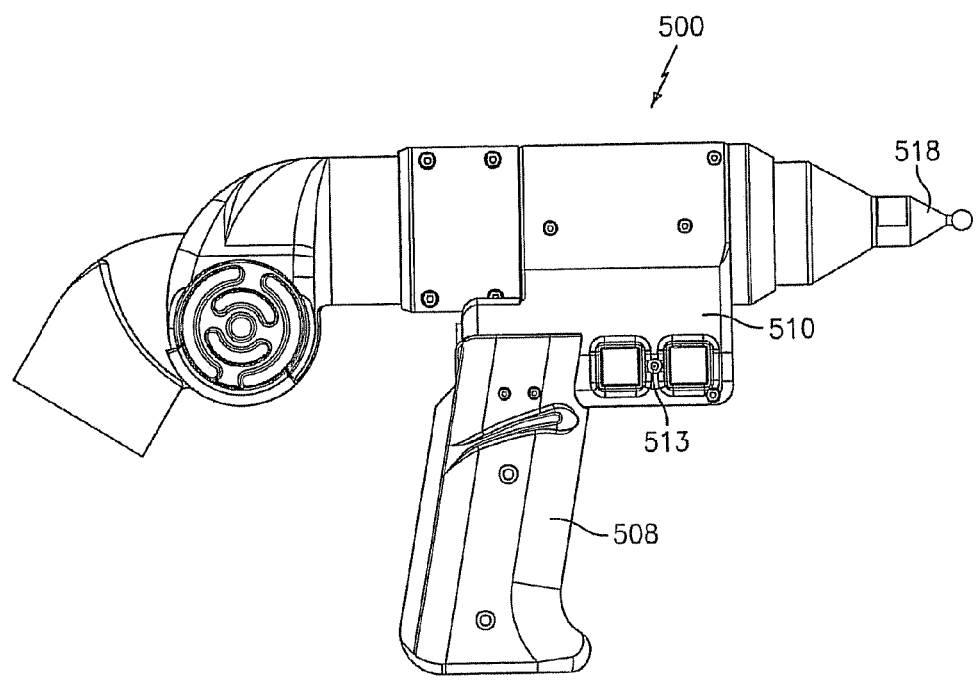
FIG. 31 is a side elevation view, similar to FIG. 30, but including a removable handle.
Figure 33:
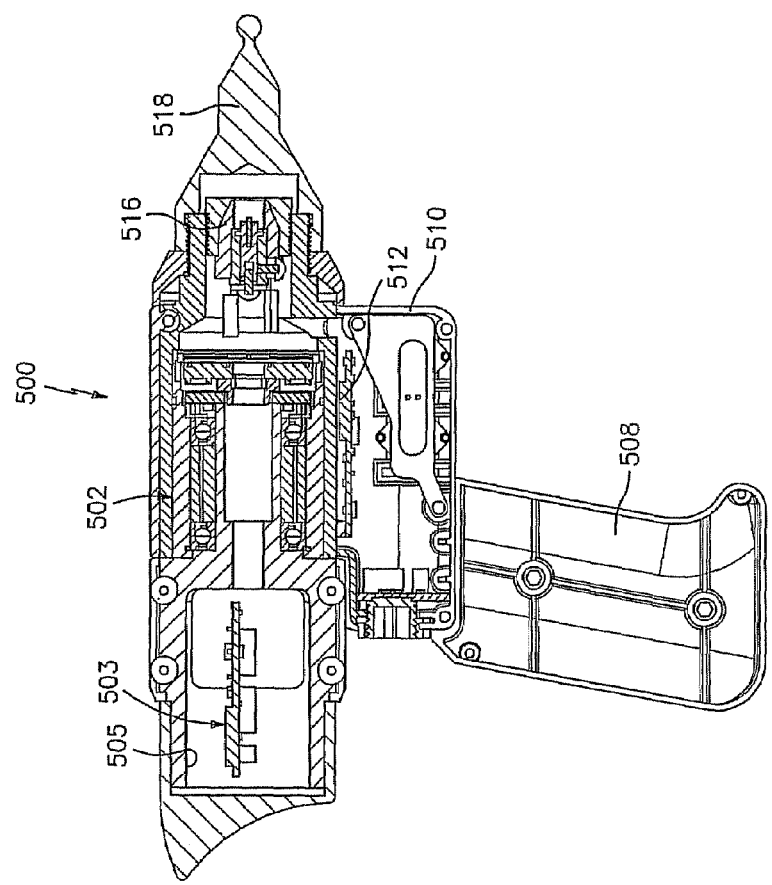
FIG. 33 is a cross-sectional elevation view of the measurement probe of FIG. 31.
Figure 32:
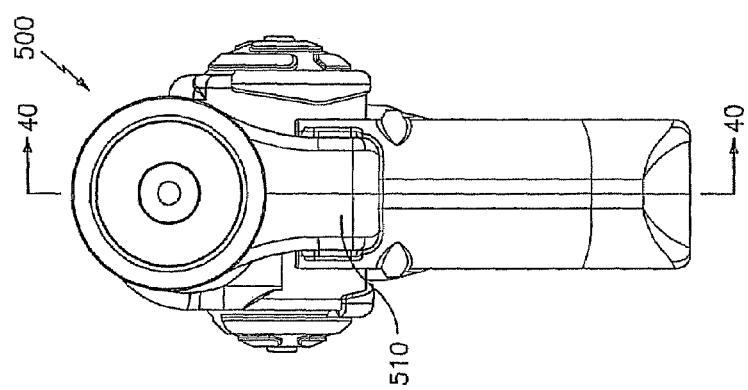
FIG. 32 is an end view of the measurement probe of FIG. 31.

As will be discussed with respect to FIGS. 29 and 31, probe 28 may also include a replaceable plastic protective cover made from a rigid plastic material.

FIGS. 3A, 24A and 26A-B depict alternative protective sleeves 40', 41' which also have a clam shell construction, but are held in place using straps or spring clips 167 rather than threaded fasteners.

Each of the short joints 18, 32 and 36 include a pair of elastomeric (e.g., thermoplastic rubber such as Santoprene®) bumpers 38 as previously mentioned and as shown clearly in FIGS. 1-3 and 5-6. Bumpers 38 may either be attached using a threaded fastener, a suitable adhesive or in any other suitable manner. Elastomeric or rubber bumper 38 will limit the high impact shock as well as provide an aesthetically pleasing and ergonomically pleasant gripping location.

The foregoing covers 40, 41, 40', 41' and bumpers 38 are all easily replaceable (as is the base housing 26A, 26B) and allow arm 14 to quickly and inexpensively be refurbished without influencing the mechanical performance of CMM 10.

Still referring to FIGS. 1-3, base-housing 26A, B includes at least two cylindrical bosses for the mounting of a sphere as shown at 168 in FIG. 3. The sphere may be used for the mounting of a clamp type computer holder 170 which in turn supports a portable or other computer device 172 (e.g., the "host computer"). Preferably, a cylindrical boss is provided on either side of base housing 26A, B so that the ball and clamp computer mount may be mounted on either side of CMM 10.

Figure 27:
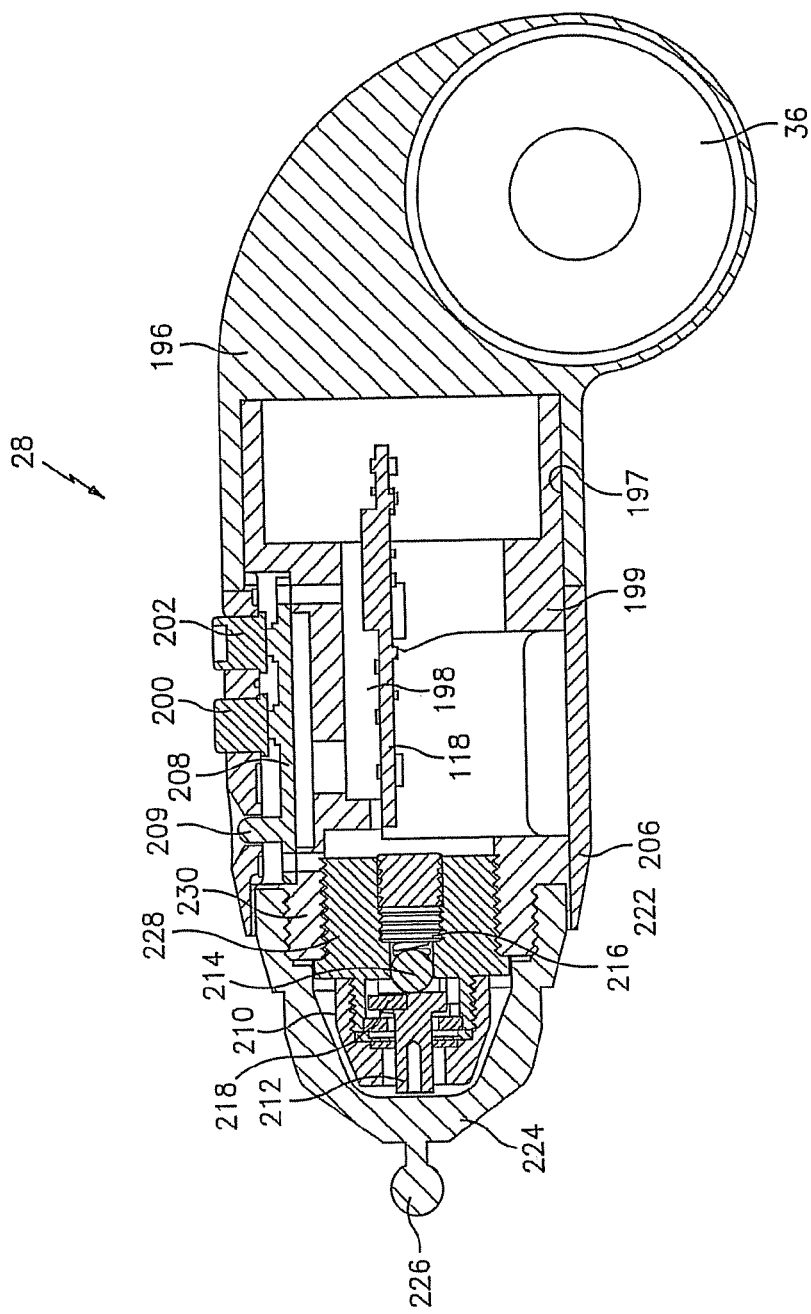
FIG. 27 is a cross-sectional, side elevation view through a first embodiment of the measurement probe in accordance with the present invention.

Turning now to FIGS. 27 and 28 A-C, a preferred embodiment of the measurement probe 28 will now be described. Probe 28 includes a housing 196 having an interior space 198 therein for housing printed circuit board 118. It will be appreciated that housing 196 constitutes a dual socket joint of the type described above and includes a socket 197 in which is bonded a support member 199 for supporting circuit board 118. Preferably, handle 28 includes two switches, namely a take switch 200 and a confirm switch 202. These switches are used by the operator to both take a measurement (take switch 200) and to confirm the measurement (confirm switch 202) during operation. In accordance with an important feature of this invention, the switches are differentiated from each other so as to minimize confusion during use. This differentiation may come in one or more forms including, for example, the switches 200, 202 being of differing height and/or differing textures (note that switch 202 has an indentation as opposed to the smooth upper surface of switch 200) and/or different colors (for example, switch 200 may be green and switch 202 may be red). Also in accordance with an important feature of this invention, an indicator light 204 is associated with switches 200, 202 for indicating proper probing. Preferably, the indicator light 204 is a two-color light so that, for example, light 204 is green upon taking of a measurement (and pressing the green take button 200) and is red for confirming a measurement (and pressing the red button 202). The use of a muticolored light is easily accomplished using a known LED as the light source for light 204. To assist in gripping, to provide improved aesthetics and for impact resistance, an outer protecting covering of the type described above is identified at 206 and provided over a portion of probe 28. A switch circuit board 208 is provided for the mounting of buttons 200, 202 and lamp 204 and is supported by support member 199. Switch board 208 is electrically interconnected with board 118 which houses components for processing the switches and light indicator as well as for the processing of short hinge joint 36.

Figure 28A:
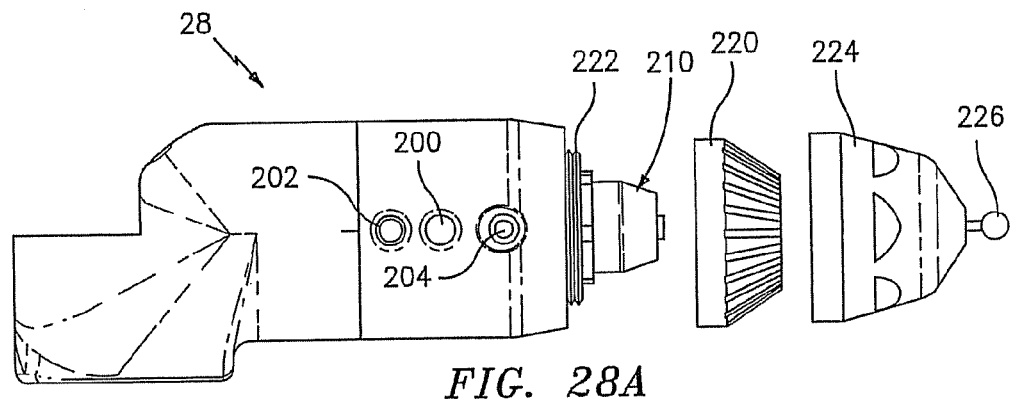
FIGS. 28A-C are sequential elevation plan views depicting the integrated touch probe assembly and conversion to hard probe assembly in accordance with the present invention.
Figure 28B:
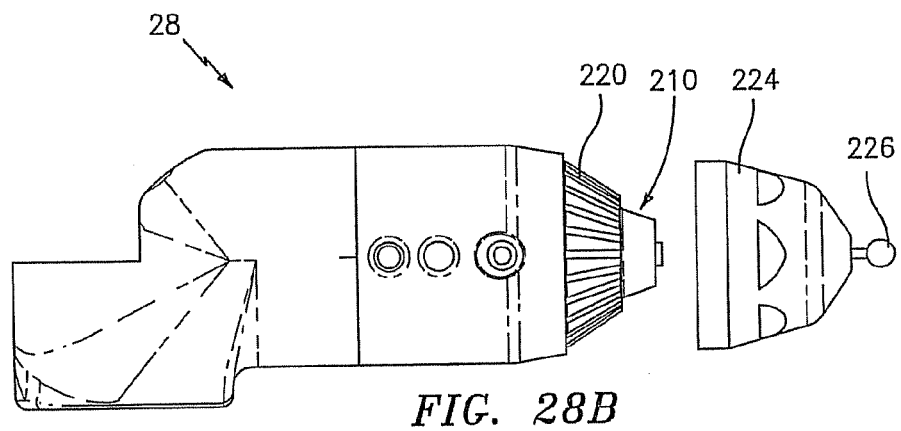
Figure 28C:
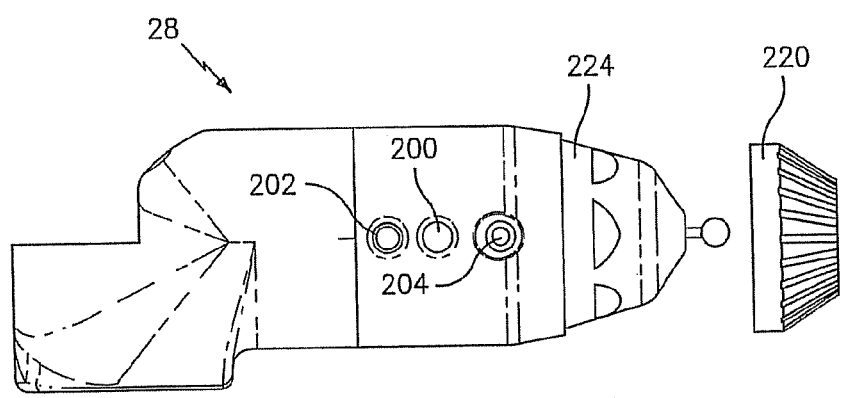

In accordance with another important feature of the present invention, and with reference to both FIG. 27 as well as FIGS. 28A-C, probe 28 includes a permanently installed touch trigger probe as well as a removable cap for adapting a fixed probe while protecting the touch trigger probe. The touch probe mechanism is shown at 210 in FIG. 27 and is based on a simplified three point kinematics seat. This conventional construction comprises a nose 212 which contacts a ball 214 biased by a contact spring 216. Three contact pins (one pin being shown at 218) are in contact with an underlying electric circuit. Application of any forces against the probe nose 212 results in lifting of any one of the three contact pins 218 resulting in an opening of the underlying electric circuit and hence activation of a switch. Preferably, touch trigger probe 210 will operate in conjunction with the front "take" switch 200.

As shown in FIG. 28B, when using touch trigger probe 210, a protective threaded cover 220 is threadably attached to threading 222 surrounding trigger probe 210. However, when it is desired to use a fixed probe rather than the touch trigger probe, the removable cap 220 is removed and a desired fixed probe such as that shown at 224 in FIGS. 27 and 28A-C is threadably attached to threading 222. It will be appreciated that while fixed probe 224 has a round ball 226 attached thereto, any different and desired fixed probe configuration may be easily threadably attached to probe 28 via threading 222. Touch trigger probe assembly 210 is mounted in a housing 228 which is threadably received into threaded connector 230 which forms a part of probe housing 196. This threadable interconnection provides for the full integration of touch trigger probe 210 into probe 28. The provision of a fully integrated touch probe represents an important feature of the present invention and is distinguishable from prior art detachable touch probes associated with prior art CMMs. In addition, the permanently installed touch trigger probe is also easily convertible to a hard probe as described above.

FIGS. 27A-C disclose yet another preferred embodiment for a measurement probe in accordance with the present invention. In FIGS. 27A-C, a measurement probe is shown at 28' and is substantially similar to measurement probe 28 in FIG. 27 with the primary difference residing in the configuration of the "take" and "confirm" switches. Rather than the discrete button type switches shown in FIG. 27, measurement probe 28' utilizes two pairs of arcuate oblong switches 200*a-b* and 202*a-b*. Each respective pair of oblong switches 202*a-b* and 200*a-b* correspond respectively to the take switch and the confirm switch as described above with respect to FIG. 27. An advantage of the measurement probe 28' embodiment relative to the measurement probe 28 embodiment is that each pair of oblong switches 202 and 200 surround virtually the entire circumference (or at least the majority of the circumference) of the measurement probe and therefore are more easily actuatable by the operator of the portable CMM. As in the FIG. 27 embodiment, an indicator light 204 is associated with each switch with the light 204 and switches 200, 202 being mounted on respective circuit boards 208'. Also, as in the FIG. 27 embodiment, switches 200, 202 may be differentiated using for example, different heights, different textures and/or different colors. Preferably, switches 200, 202 have a slight float such that the button may be actuated when pressed down in any location therealong. As in the FIG. 27 embodiment, an outer protective covering of the type described above is used at 206 and provided over a portion of probe 28'.

Figure 29:
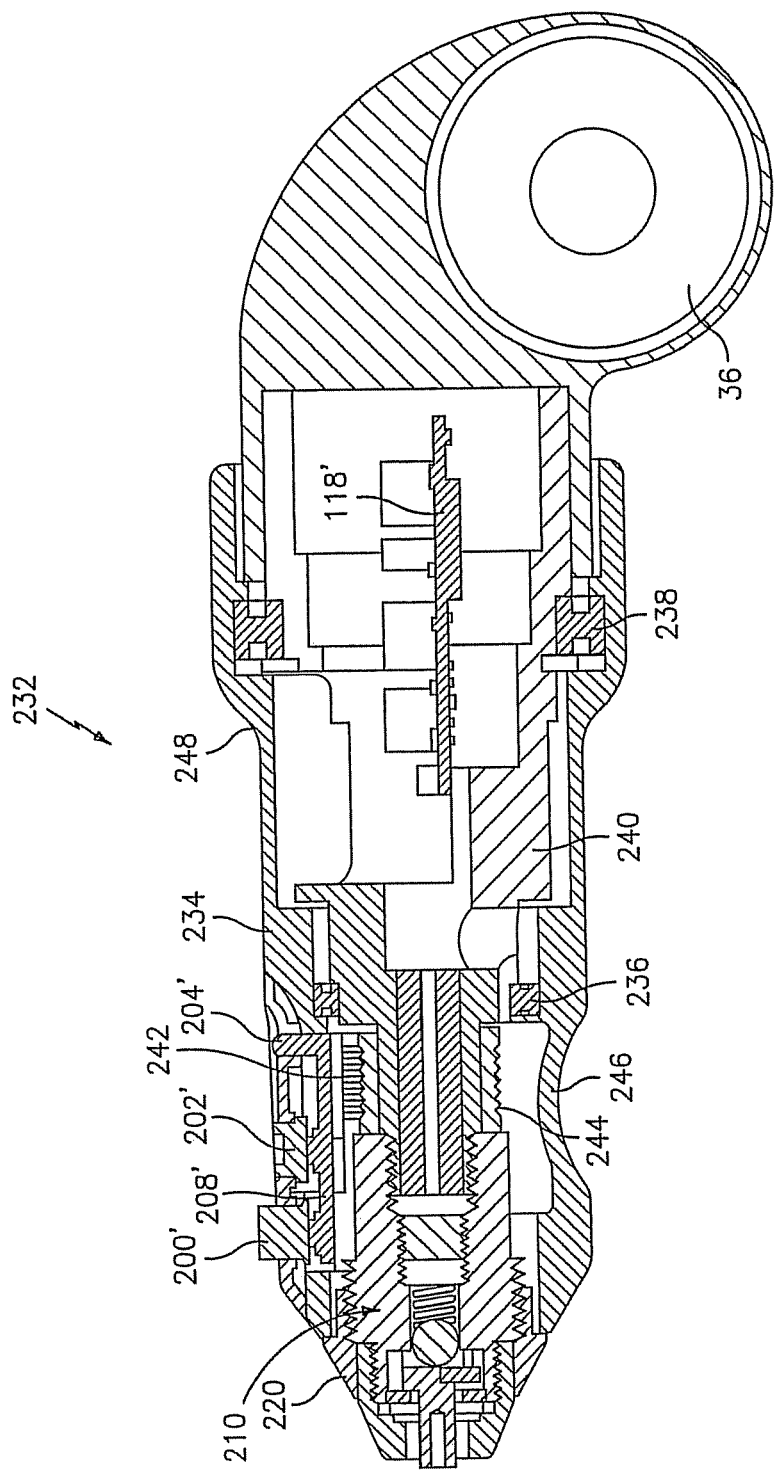
FIG. 29 is a cross-sectional, side elevation view through still another embodiment of a measurement probe in accordance with the present invention.

Referring now to FIG. 29, an alternative measurement probe for use with CMM 10 is shown generally at 232. Measurement probe 232 is similar to measurement probe 28 of FIG. 27 with the primary difference being that probe 232 includes a rotating handle cover 234. Rotating cover 234 is mounted on a pair of spaced bearings 236, 238 which in turn are mounted on an inner core or support 240 such that cover 234 is freely rotatable (via bearings 236, 238) about inner core 240. Bearings 236, 238 are preferably radial bearings and minimize the parasitic torques on the arm due to probe handling. Significantly, the switch plate 208' and corresponding switches 200', 202' and LED 204' are all mounted to rotating handle cover 234 for rotation therewith. During rotation, electrical connectivity to processing circuit board 118' is provided using a conventional slip ring mechanism 242 which comprises a known plurality of spaced spring fingers 242 which contact stationary circular channels 244. In turn, these contact channels 244 are electrically connected to circuit board 118'. The rotating handle cover 234 and switch assembly is thus electrically coupled to the inner core or probe shaft 240 and electronics board 118' using the slip ring conductor 242. The rotation of the probe handle 234 permits switches 200', 202' to be oriented conveniently for the user. This allows the articulated arm 14' to measure accurately during handling by minimizing undocumented forces. The cover 234 is preferably comprised of a rigid polymer and is provided with appropriate indentations 246 and 248 to allow easy and convenient gripping and manipulation by the probe operator.

It will be appreciated that the remainder of probe 232 is quite similar to probe 28 including the provision of a permanently and integrally installed touch probe 210 in cover 220. Note that switches 200', 202' are of differing heights and surface textures so as to provide ease of identification.

The rotating cover 234 is a significant advance in the CMM field in that it can alleviate the need for an additional (i.e., seventh) axis of rotation at the probe such as disclosed in aforementioned U.S. Pat. No. 5,611,147. It will be appreciated that the addition of a seventh axis leads to a more complex and expensive CMM as well as the addition of possible error into the system. The use of the rotatable probe 232 alleviates the need for a "true" seventh axis as it permits the probe to provide the rotation needed for handle position at the probe end without the complexity of a seventh transducer and associated bearings, encoder and electronics.

In the event that it is desired to utilize a measurement probe having a "true" seventh axis, that is, having a measurement probe with a seventh rotary encoder for measuring rotary rotation, such a measurement probe is shown in FIGS. 30-33. With reference to such FIGURES, a measurement probe 500 is shown with such measurement probe being substantially similar to the measurement probe in FIG. 27 with the primary difference being the insertion of a modular bearing/transducer cartridge 502 of the type described above, the presence of the take and confirm switches. 504, 506 on the sides of the measurement probe and the inclusion of a removable handle 508.

It will be appreciated that the modular bearing/transducer cartridge 502 is substantially similar to the cartridges described in detail above and include a rotatable shaft, a pair of bearings on the shaft, an optical encoder disk, at least one and preferably two optical read heads spaced from and in optical communication with the encoder disk and a housing surrounding the bearings, optical encoder disk, read head(s) and at least a portion of the shaft so as to define the discrete modular bearing/transducer cartridge. A circuit board 503 for the encoder electronics resides in an opening 504 with probe 500. Pairs of take and confirm buttons 504, 506 are positioned on either side of a downwardly projected housing portion 510 of probe 500 with the buttons being connected to an appropriate PC board 512 as in the measurement probe of the FIG. 27 embodiment. Similarly, an indicator light 513 is positioned between buttons 504, 506 as in the previously discussed embodiments. A pair of threaded openings 514 in housing 510 receive fasteners for removable attachment of handle 508 which provides for ease of rotary manipulation during use of measurement probe 500.

In all other substantial respects, measurement probe 500 is similar to measurement probe 28 of FIG. 27 including the preferred use of permanently installed touch trigger probe at 516 as well as a removable cap for adapting a fixed probe 518 while protecting the touch trigger probe. It will be appreciated that the seventh rotary encoder 502 included in measurement probe 500 facilitates the use of CMM 10 in connection with known line laser scanners and other peripheral devices.

Turning now to FIGS. 2-4, 23 and 25, in accordance with an important feature of the present invention, a portable power supply is provided to power CMM 10 thus providing a fully portable CMM. This is in contrast to prior art CMMs where power supply was based only on an AC cord. In addition, CMM 10 may also be powered directly by an AC cord through an AC/DC adapter via a conventional plug-in socket. As shown in FIGS. 2, 3 and 25, a conventional rechargeable battery (e.g., Li-ion battery) is shown at 22. Battery 22 is mechanically and electrically connected into a conventional battery support 252 which in turn is electrically connected to a conventional power supply and battery recharger circuit component 254 located on circuit board 20. Also communicating with board 20 is an on/off switch 258 (see FIG. 3) and a high-speed communication port 260 (preferably a USB port). The joint electronics of arm 14 is connected to board 20 using an RS-485 bus. Battery 22 can be charged on a separate charger, or charged in place in cradle 252 as is commonly found in conventional video cameras. It will be appreciated that portable computer 172 (see FIG. 2) can operate for several hours on its built-in batteries and/or in the alternative, may be electrically connected to the power supply unit 254 of CMM 10.

The on-board power supply/recharger unit in accordance with the present invention is preferably positioned as an integral part of CMM 10 by locating this component as an integral part of base 12 and more specifically as a part of the plastic base housing 26A, B. Note also that preferably, base housing 26A, B includes a small storage area 259 having a pivotable lid 262 for storing spare batteries, probes, or the like.

Figure 34A:
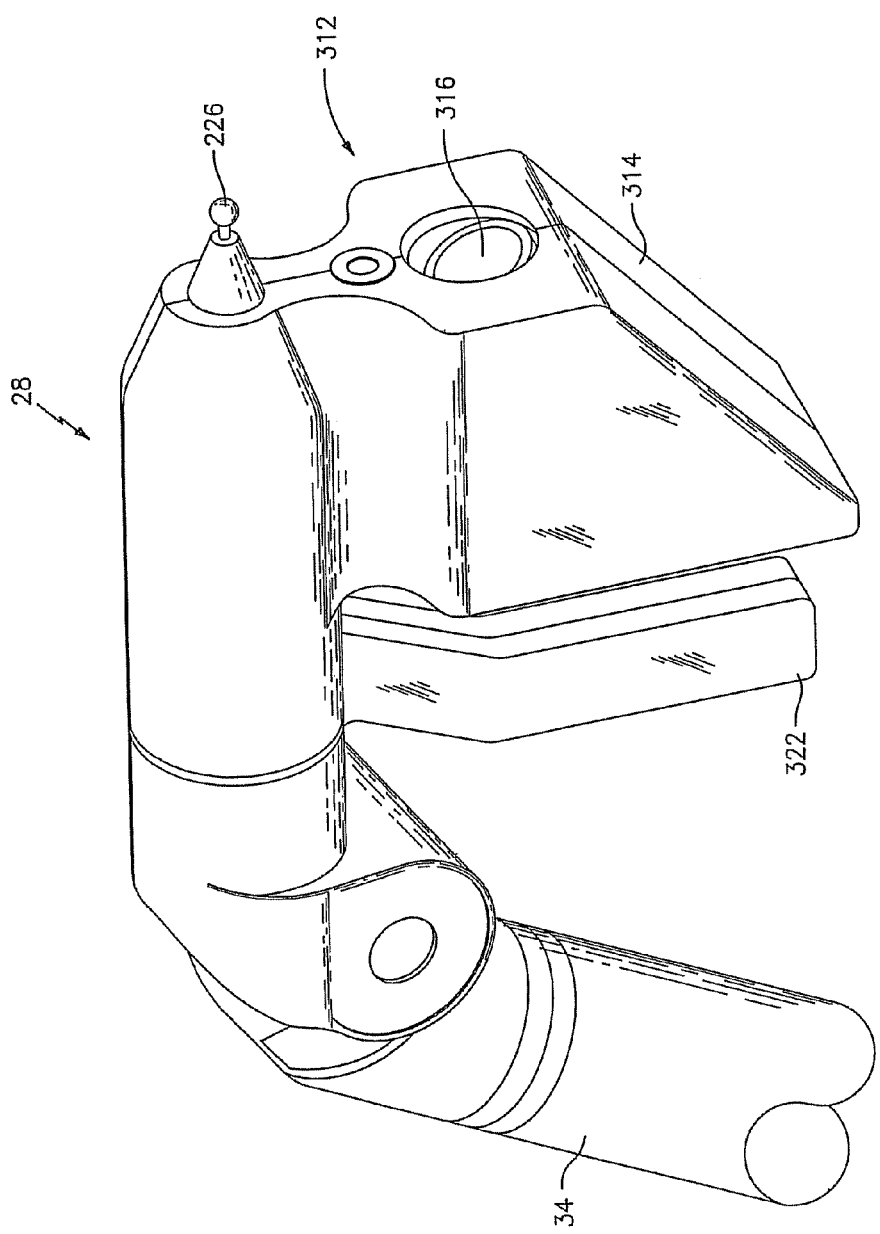
FIG. 34A is a side-perspective view of a first embodiment of the integrated line scanner of the present invention.
Figure 34B:
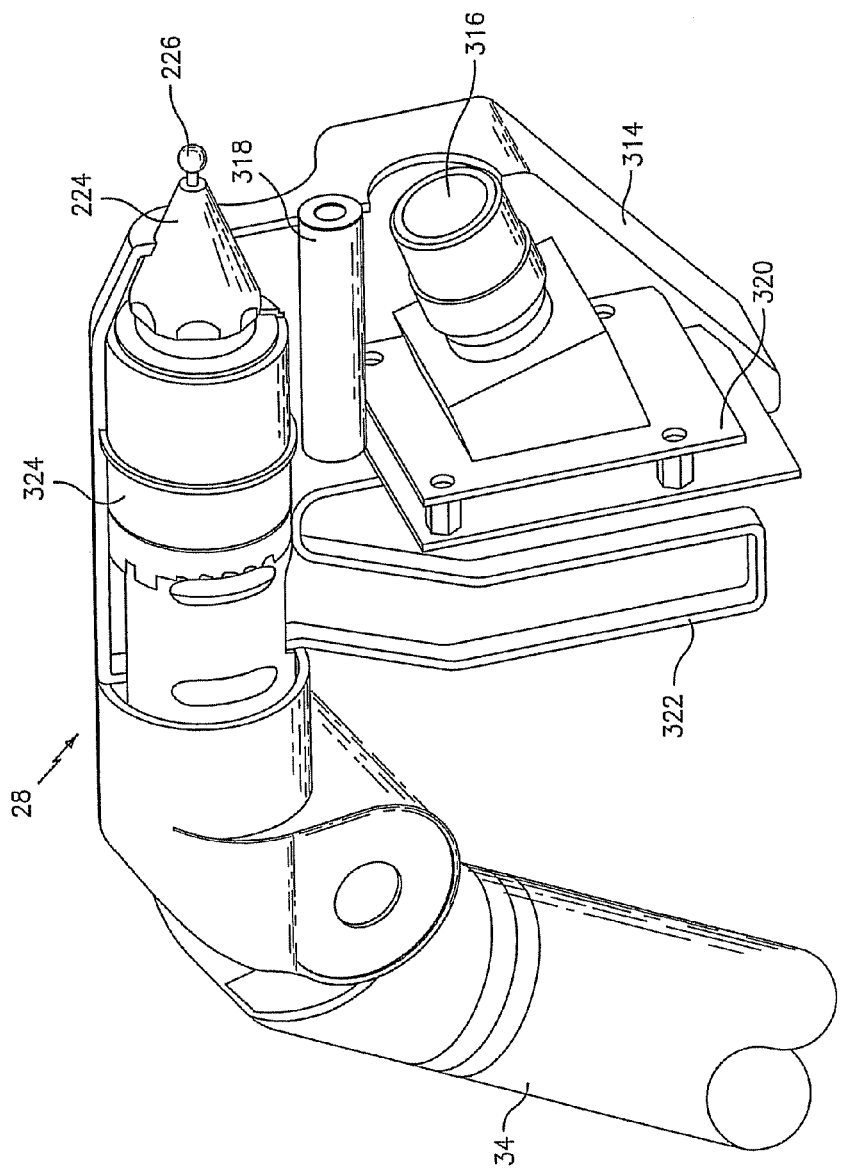
FIG. 34B is a partially cut-away, perspective view of the integrated line scanner of FIG. 34A.
Figure 35:
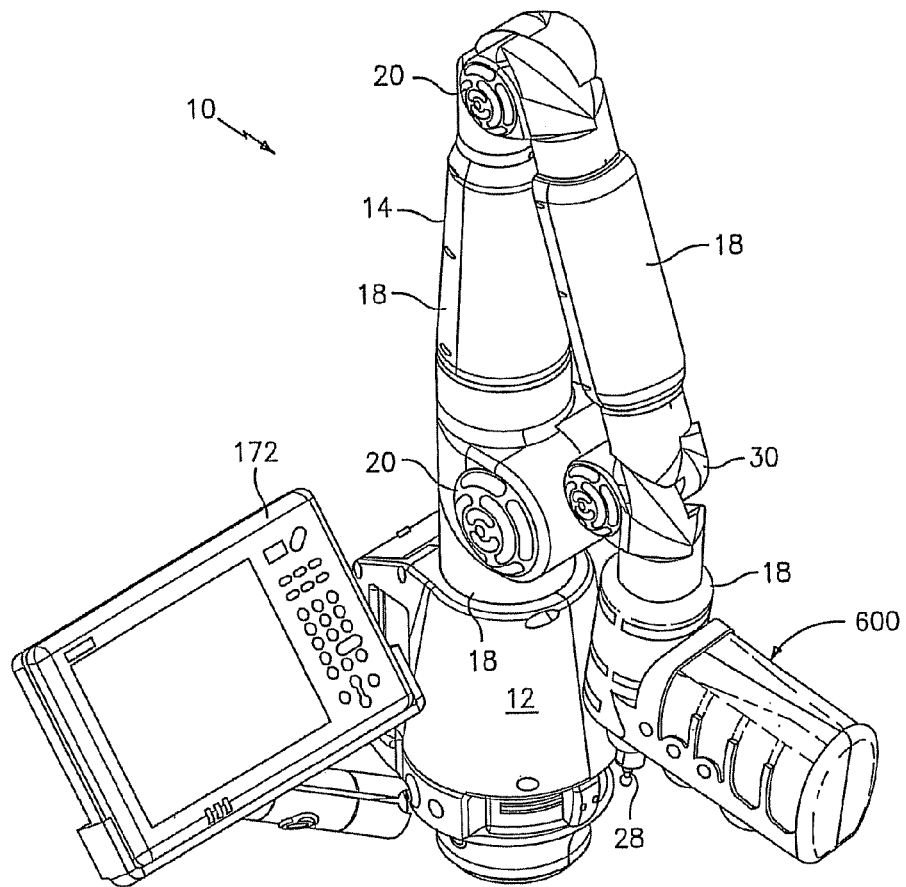
FIG. 35 is a front perspective view of the portable CMM of the present invention including an articulated arm with integrated line laser scanner and attached host computer.

Turning now to FIGS. 34A and 34B, a line laser scanner 312 is shown which has been fully integrated onto probe 28, 28,' 232, or more preferably, probe 500. Line laser scanner 312 includes a housing 314 for housing a digital camera 316, a line laser 318 and the appropriate electronic circuitry 320. Housing 314 surrounds the probe 28 and includes a handle 322 extending downwardly therefrom. Handle 322 is easily accessible by the operator during use of the laser scanner. It is important that the laser scanner be rotatable so as to ensure correct, on-line measurements. To that end, housing 312 is mounted on an additional (i.e., seventh) axis of rotation using an appropriate bearing structure 324. In the preferred embodiment, this additional axis of rotation includes a transducer and thus constitute a totally separate joint in addition to the typically five or six joints in the articulated arm 14. More preferably, the additional axis is part of a three-axis wrist for the arm (leading to the typical 2-1-3 or 2-2-3 arm configuration).

Preferably, the integrated touch probe and hard probe cover attachment as described in FIGS. 27 and 28A-C are also employed in the embodiment of FIGS. 34A-B. The integrated line laser scanner 312 will operate in a known and conventional fashion but unlike prior art devices which must be retrofitted onto the end of a portable CMM, the present invention is fully integrated onto the CMM. Thus, electronic circuitry 320 will be fully integrated to the power and signal bus in articulated arm 14. As a result, the laser scanner and CMM probe will be located in the same housing, utilize the same internal wiring and constitute a unified mechanical structure. This structure will also permit the simultaneous use or access of the laser scanner and the touch probe or hard probe. Moreover, circuitry 320 in cooperation with host computer 172 will provide on-board image analysis and processing in real time and in an easy to operate environment with signals from the laser scanner being transmitted via the RS-485(or similar) serial communications bus.

Figure 36:
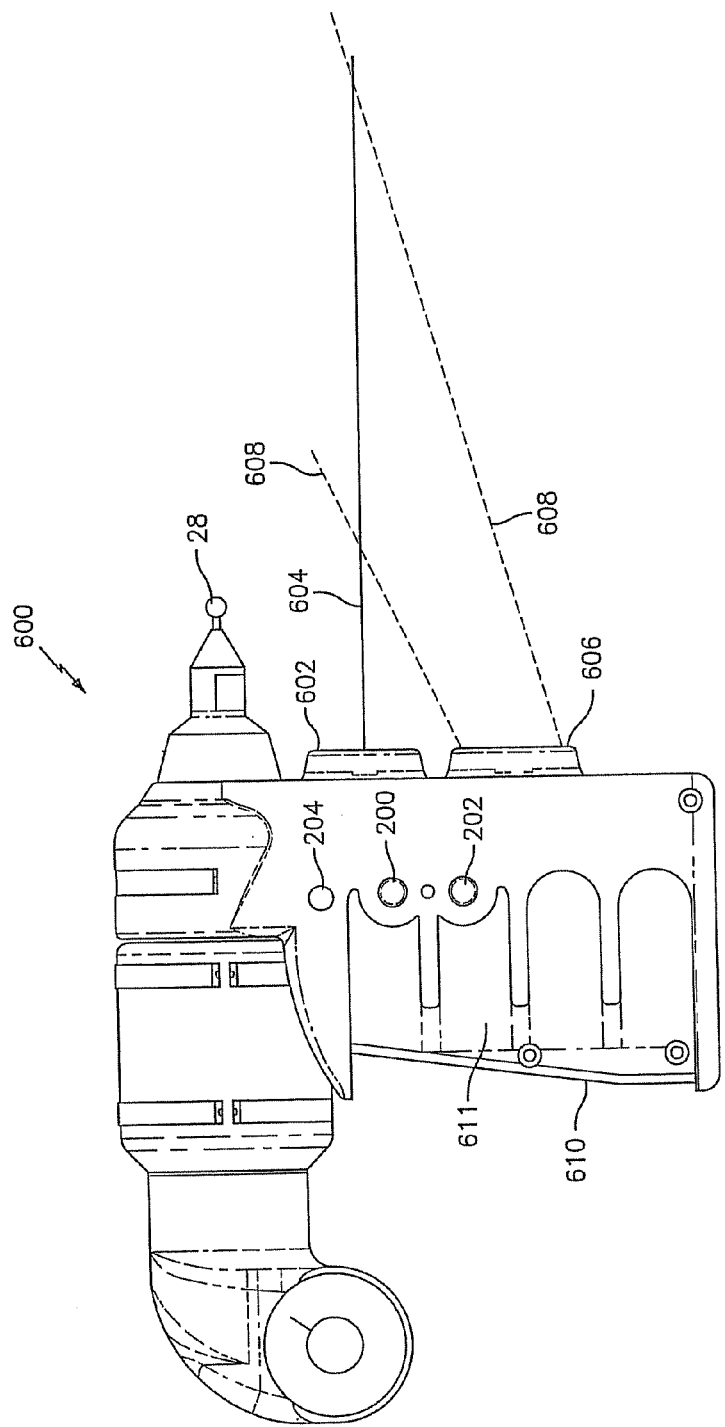
FIG. 36 is a side profile of the hand-held line laser scanner unit portion of the articulated arm of FIG. 35 schematically showing operation thereof.
Figure 37:
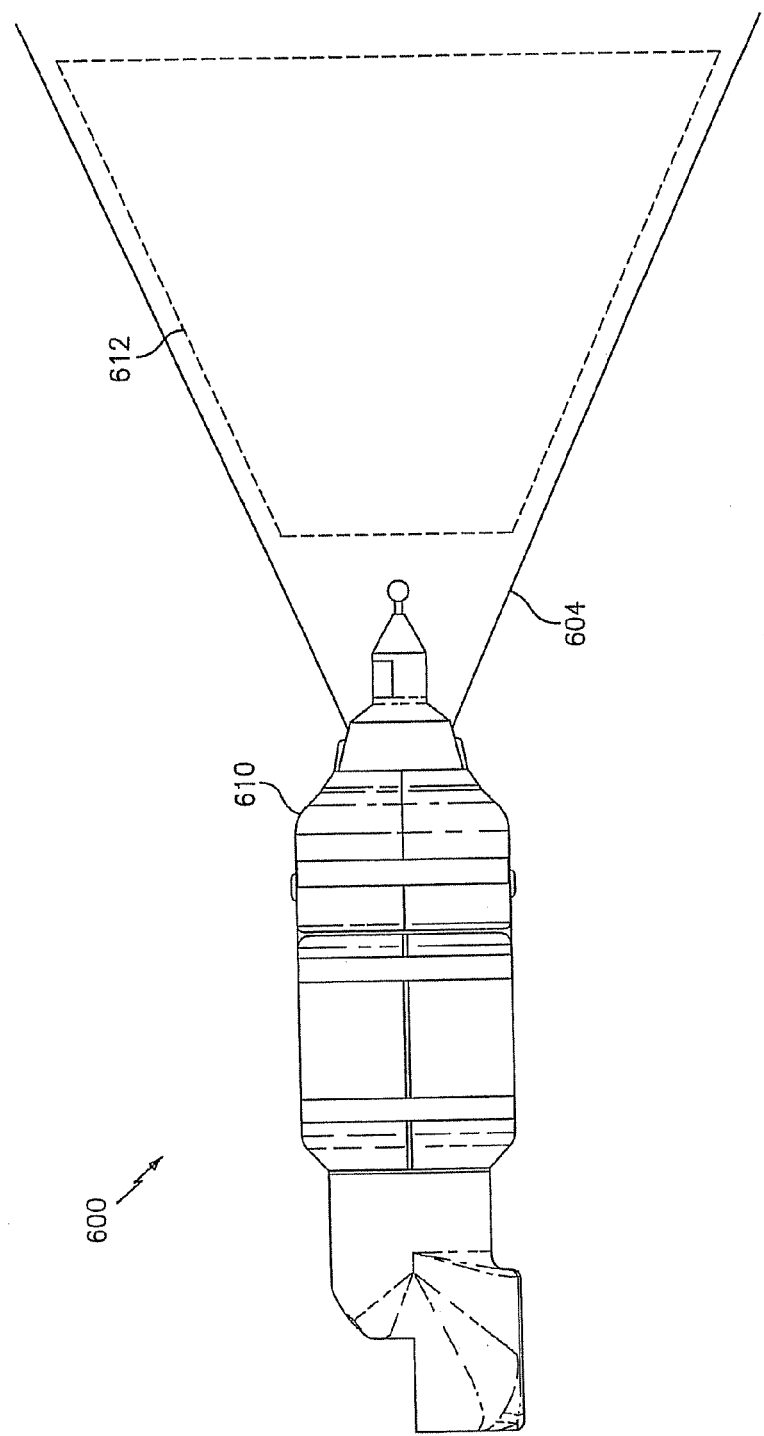
FIG. 37 is a top plan view of the hand held line laser scanner unit of FIG. 36 showing operation thereof.

Another embodiment of an integrated line laser scanner is shown in FIGS. 35-39 where CMM 10 is shown with integrated line laser scanner/probe 600 attached to probe 28. As shown in FIGS. 36 and 37, spaced back from probe 28 is a laser emitter window through which a scanning laser beam 604 is emitted from scanning laser 601. Scanning laser 604 scans across a plane that lies perpendicular to the page as show in FIG. 36 and parallel to the page as shown in FIG. 37, which shows a plan view of scanner/probe 600. Below laser emitter window 602 is CCD window 606. CCD window 606 may be in fact a focusing lens of a CCD 605 located within housing 610 as will be described in further detail below. CCD 605 has a field of view (FOV) as shown by dashed lines 608. The FOV of the CCD 605 intersects the plane defined by scanning laser beam 604 within the area 612 shown by dashed lines in FIG. 37. As will therefore be appreciated, when an object is passed through area 612, the locus of points intersecting area 612 on the object that face towards scanner/probe 600 will be illuminated by scanning laser beam 604 and imaged by CCD 605.

The locus of points of an object illuminated by scanning laser beam 604 will appear as a contour image on CCD 605. Since the location and orientation of line laser scanner/probe 600 is known by CMM 10, the precise position of area 612 on the plane defined by scanning laser beam 604 is known. As a point on an object that is illuminated by the beam is moved closer or farther away from line laser scanner/probe 600, an image of light reflected by the laser is moved up or down on the CCD imaging plane (not shown), while points to the left and right on the imaging plane of CCD 605 correspond to locations to the left and right of an object intersecting area 612 and illuminated by scanning laser beam 604. Thus, each pixel of CCD 605 is associated with a corresponding location in area 612 that is potentially illuminated by scanning laser beam 604 and within the FOV of CCD 605.

Figure 38:
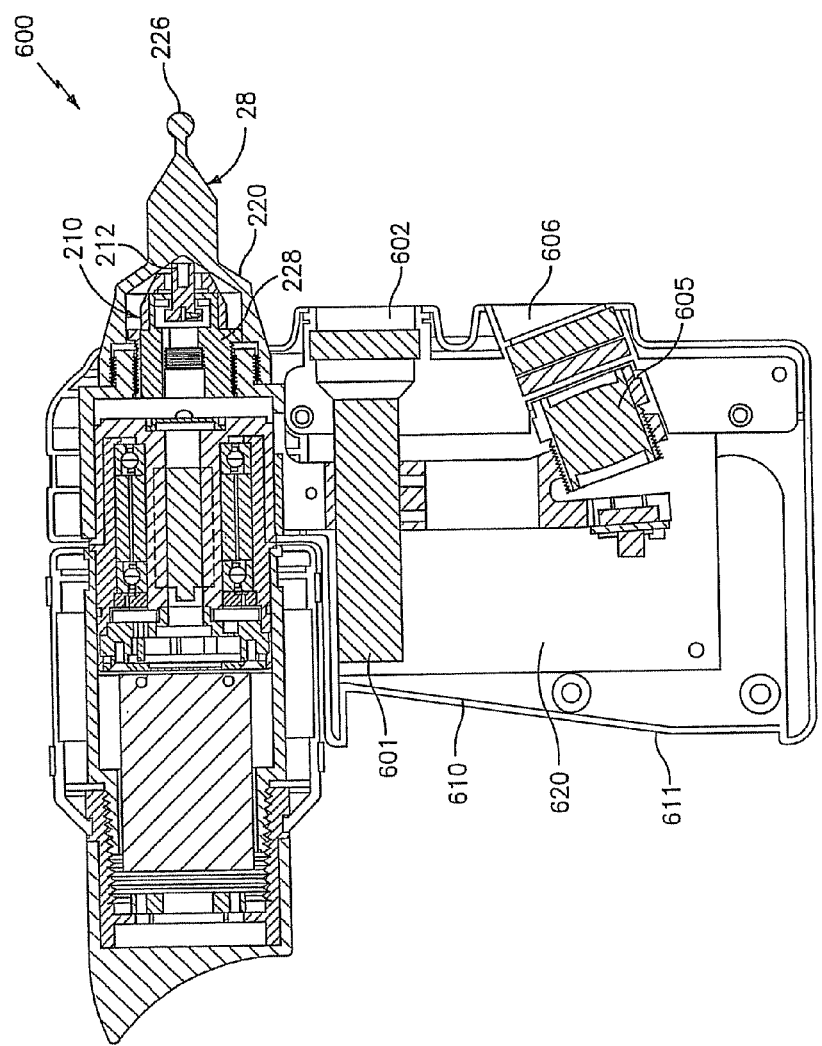
FIG. 38 is a cross-section view of the hand-held line laser scanner of FIG. 36.
Figure 39:
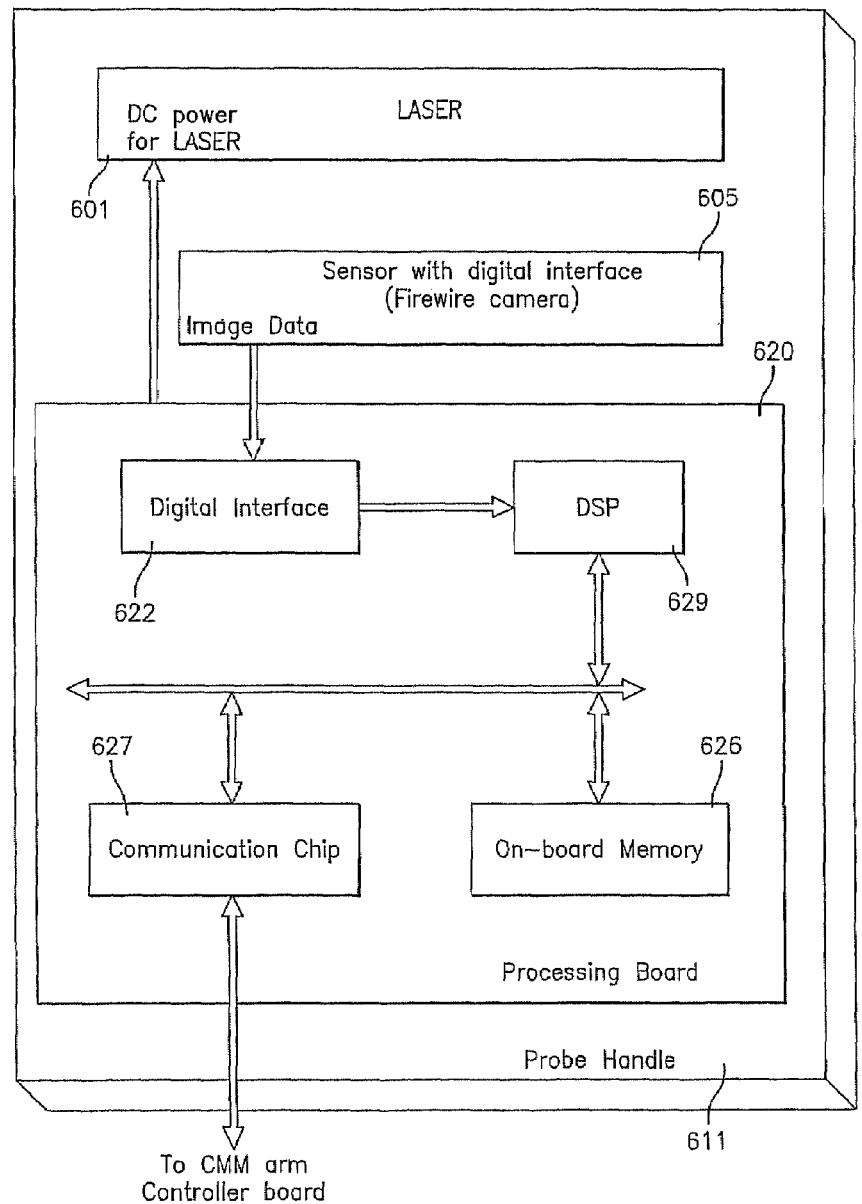
FIG. 39 is a block diagram depicting operation of the articulated arm of FIG. 35 with integrated line laser scanner.

Referring to FIGS. 38 and 39, image data from CCD 605 is processed on image processing board 620, which is a circuit board within handle 611 of housing 610. CCD 605 includes a sensor board for capturing images detected by CCD 605 and converting them into a digital format, such as the FIREWIRE data format established by Apple Computers, Inc. (or any suitable high speed data communications protocol). The complete image is relayed in real time to novel image processing board 620. Image processing board 620 includes FIREWIRE interface 622, digital signal processor (DSP) 624, and memory 626. As the DSP receives image data, it processes it in real time. Software algorithms process each frame to determine the precise location of the measured object with sub-pixel accuracy. This is possible because the profile across the line laser approximates a Gaussian function, and extends across multiple rows of pixels on the CCD image plane. Selecting the appropriate pixel to represent the line location is an important function of the software. The software algorithm analyzes the line profile along a pixel column and calculates the "center of gravity" (COV), which can be a fractional pixel location and is the point that best represents the exact location of the line.

The algorithm proceeds to calculate the COV for each column in the frame. Once the frame is processed, the original image is discarded and only the processed data is kept. The retained information is sent via communication chip 627 to the board at the base of the CMM in a manner similar to other data generated by the various digital encoders found at each joint. The data packet generated by image processing board 620 is a fraction of the size of the original image size and does not require a significant amount of communication bandwidth. From the main CMM processor, the data is sent to the host CPU along with the coincident arm position. The novel image processing board thus allows for on-board image processing within the arm 10 as opposed to the prior art where such image processing is accomplished in a separate unit or computer hardwired to the laser scanner via an external retrofit.

As in previously discussed embodiments, handle 611 includes two switches, namely a take switch 200 and a confirm switch 202. These switches are used by the operator in a probing mode to both take a measurement (take switch 200) and to confirm the measurement (confirm switch 202) during operation. Also, an indicator light 204 is associated with switches 200, 202 for indicating proper probing. Preferably, the indicator light 204 is a two-color light so that, for example, light 204 is green upon taking of a measurement (and pressing the green take button 200) and is red for confirming a measurement (and pressing the red button 202). The use of a muticolored light is easily accomplished using a known LED as the light source for light 204.

In a scanning mode, take switch 200 activates the scanning process described above while the confirm switch 202 may be used for some other purpose, e.g., to cancel the previous scan. In either mode, the function of the switches may be assigned by the software program.

Figure 30:
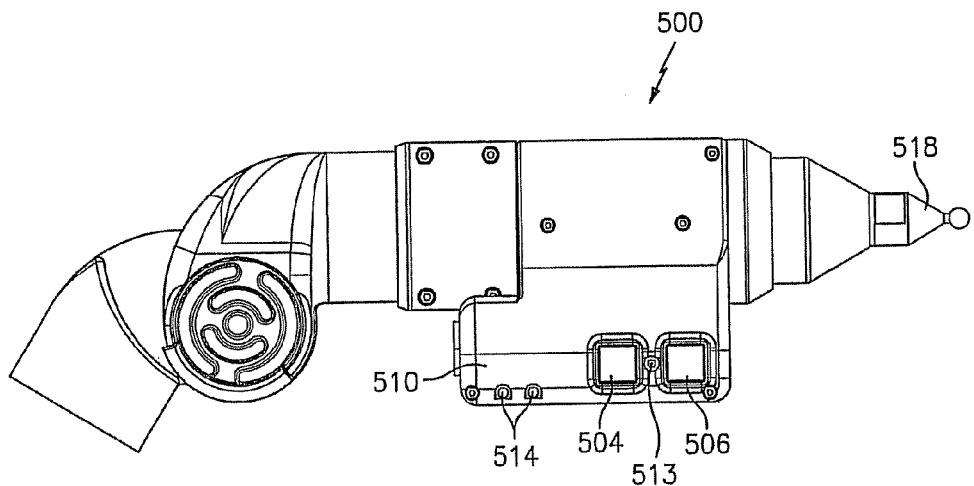
FIG. 30 is a side elevation view of a measurement probe with a seventh axis transducer.

Probe 28 in FIG. 38 includes touch probe mechanism 210 and hard probe cover 220 as previously described in FIGS. 27 and 30. Touch probe mechanism 210 comprises a nose 212 which contacts a spring biased element. Three contact pins are in contact with an underlying electric circuit. Application of force against the probe nose 212 results in lifting of one of the three contact pins resulting in an opening of the underlying electric circuit and hence activation of a switch. Preferably, touch trigger probe 210 will operate in conjunction with the front "take" switch 200 in a probe mode.

When using touch probe mechanism 210, a probe cover 220 is threadably removed. However, when it is desired to use a fixed probe rather than the touch trigger probe, probe cover 220 is attached as shown. It will be appreciated that while probe cover 220 has a round ball 226 attached thereto, any different and desired fixed probe configuration may be easily threadably attached to probe 28. Touch probe mechanism 210 is mounted in a housing 228 which is threadably received into a threaded connector which forms a part of probe housing 110.

Figure 40:
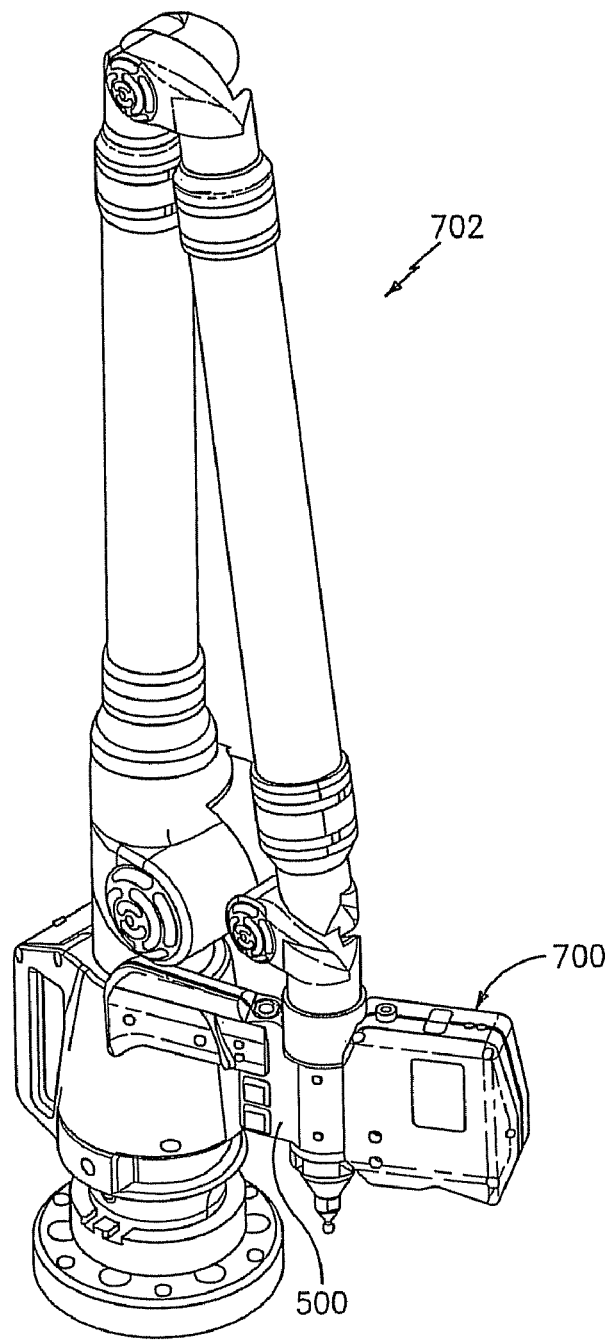
FIG. 40 is a perspective view of yet another embodiment of a line laser scanner mounted on the measurement probe of FIG. 31.
Figure 42:
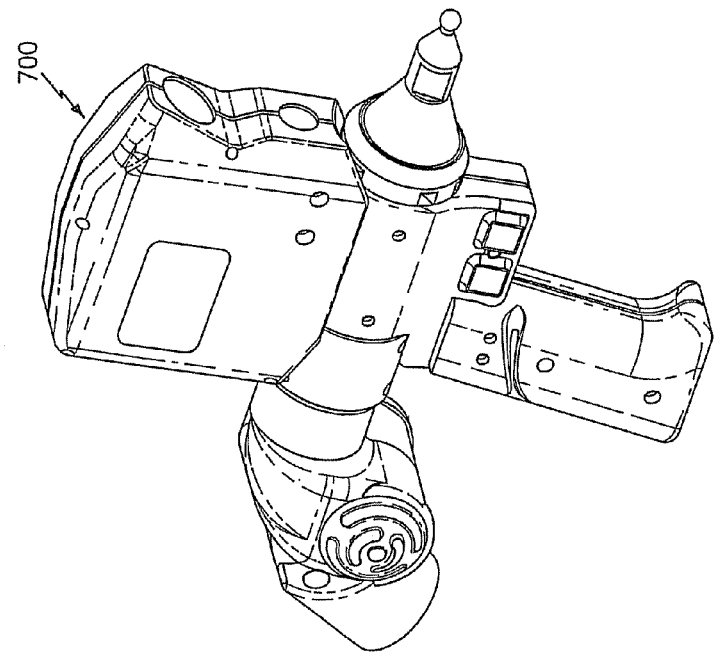
FIGS. 41 and 42 are respectively rear and front perspective views of the line laser scanner of FIG. 40.
Figure 41:
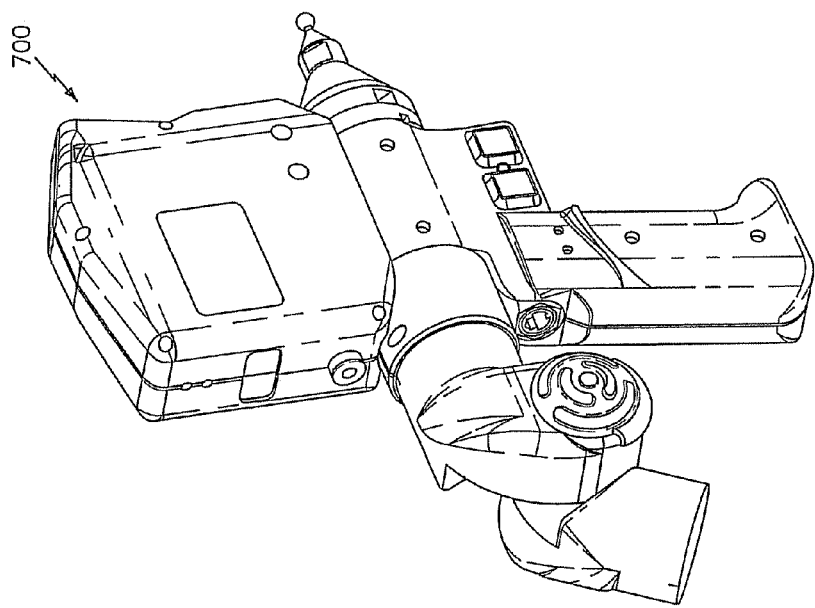
Figure 44:
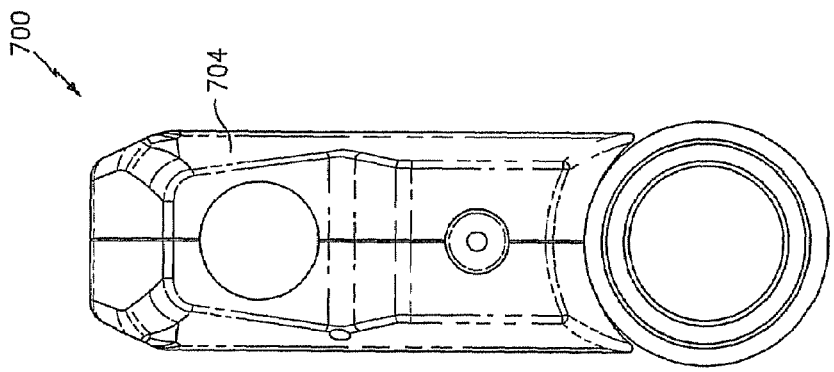
FIGS. 43, 44 and 45 are respectively side-elevation, front, and rear views of the line laser scanner of FIG. 40.
Figure 43:
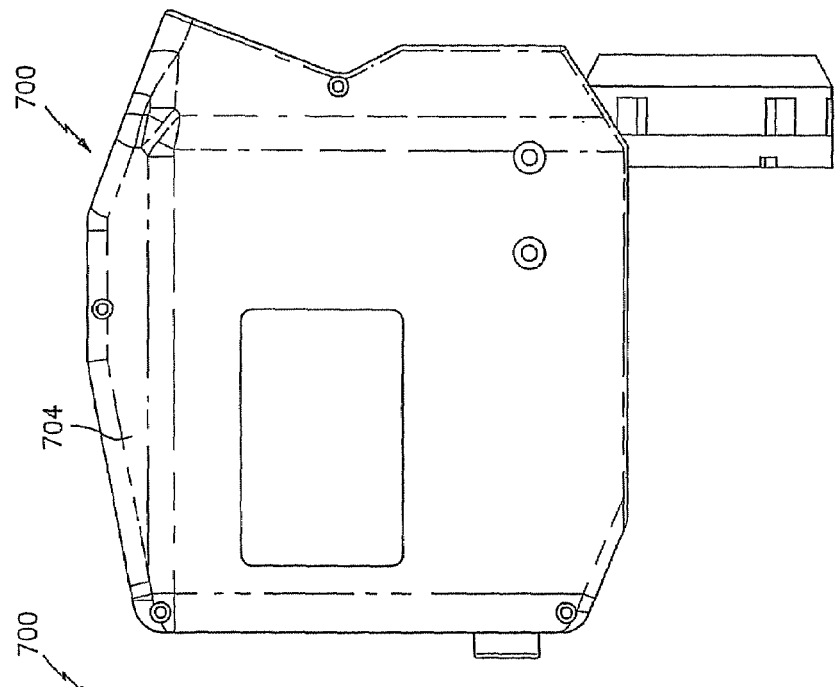
Figure 45:
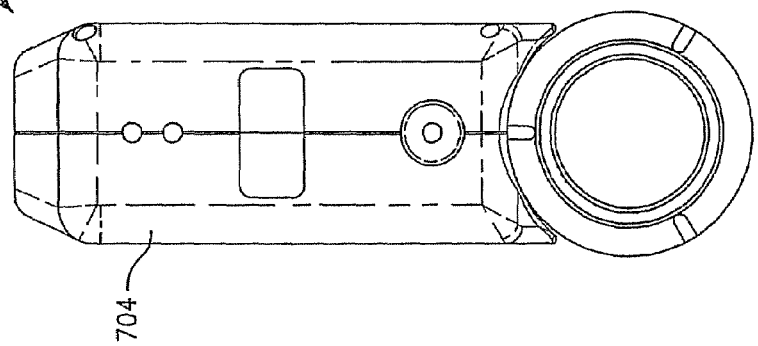
Figure 46:
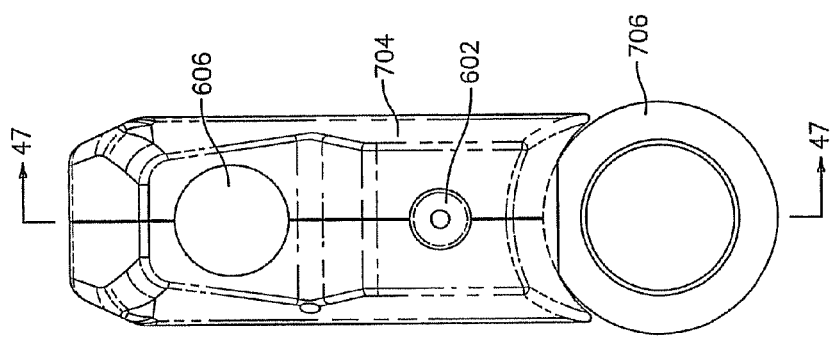
FIG. 46 is a front elevation view, similar to FIG. 44 of the line laser scanner of FIG. 40.
Figure 47:
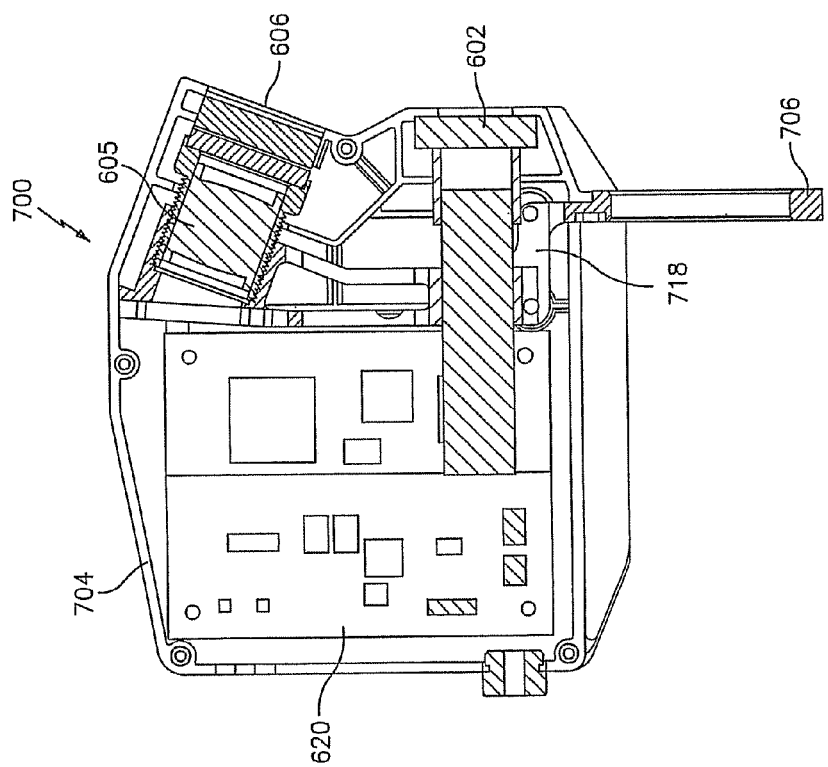
FIG. 47 is a cross-sectional elevation view along the line 47-47 of FIG. 46.
Figure 48:
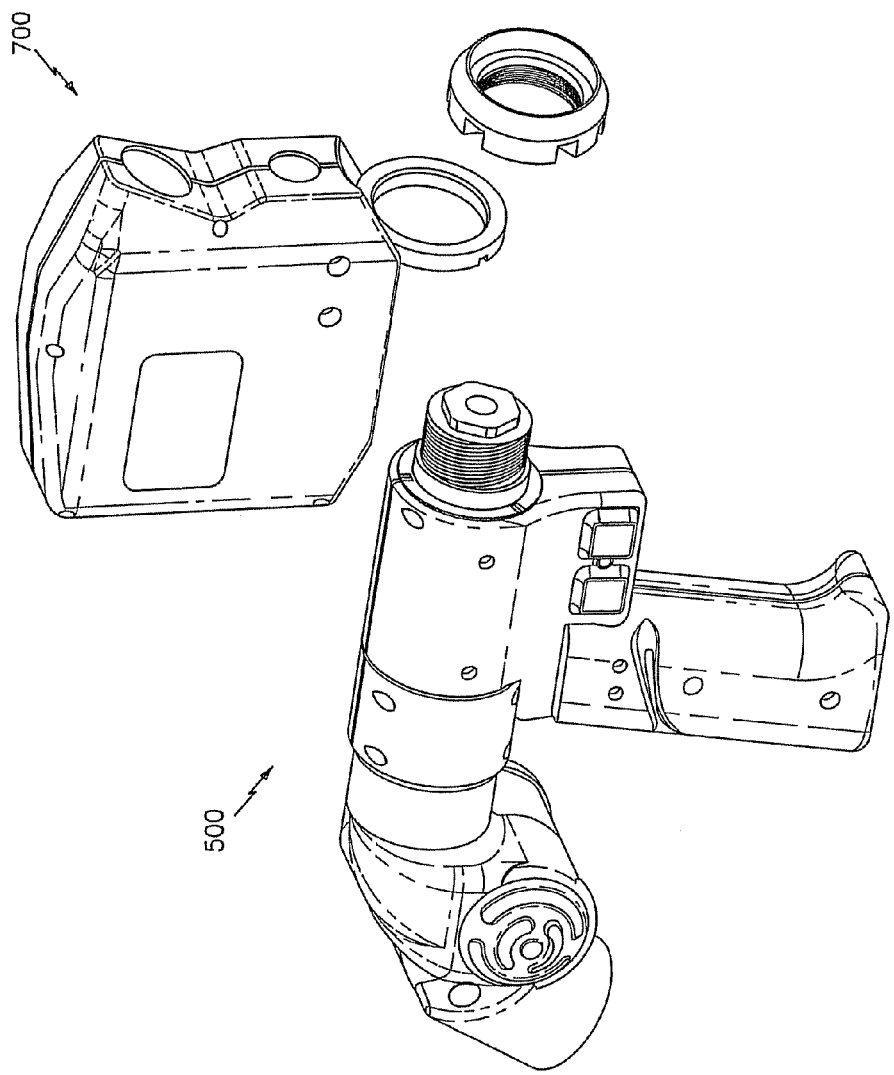
FIG. 48 is a partially exploded view depicting the attachment of a line laser scanner onto the probe of FIG. 31.

Referring now to FIGS. 40-48, yet another embodiment of the line laser scanner is depicted at 700. In FIG. 40, laser scanner 700 is shown attached to a CMM 702 having the probe 500 of the type described in FIGS. 30-32. Turning to FIG. 47, laser scanner 700 includes a housing 704 for housing the CCD window 606, focusing lens 605, image processing board 620, high speed data communications protocol interface board 622, digital signal processor 624 and memory 626, all of which have been described above in connection with the FIG. 38 embodiment.

Figure 49:
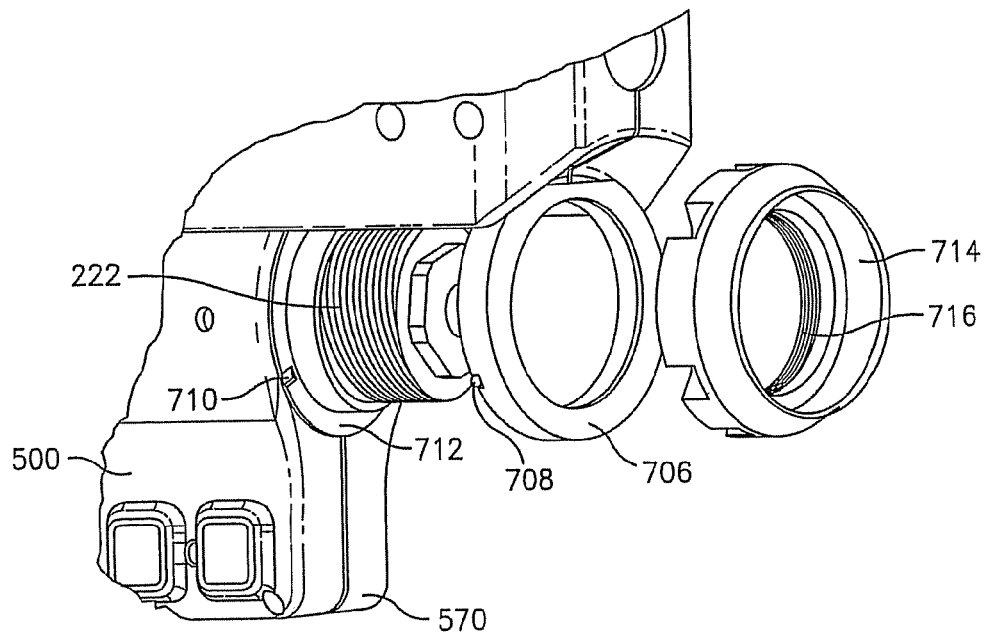
FIG. 49 is a front perspective view depicting a kinematic mount used with the line laser scanner of FIG. 40.
Figure 50:
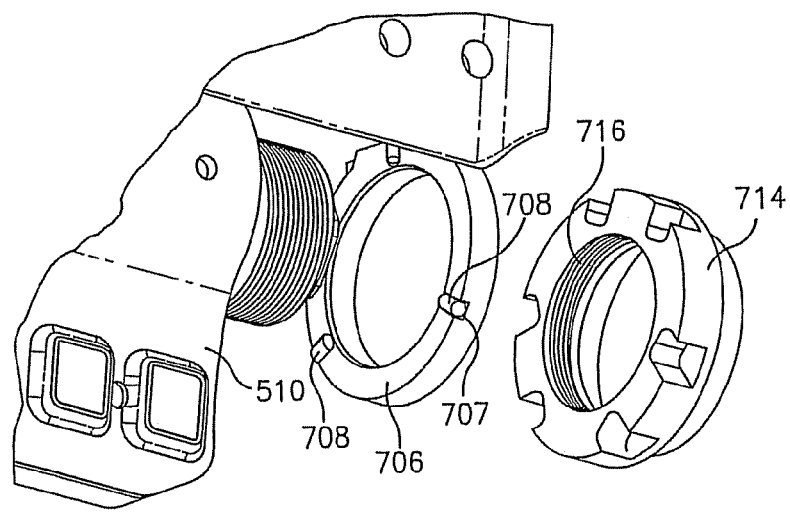
FIG. 50 is a rear perspective view of the kinematic mount of FIG. 49.

Extending outwardly and downwardly from housing 704 is a kinematic ring which is best shown in FIGS. 49 and 50, and which includes three spaced (preferably, equidistantly or at 180 degrees apart) cut-outs or openings 707. Each opening 707 receives a small cylindrical rod 708 therein. Cylindrical rods 708 are received in correspondingly spaced and complimentary shaped openings 710 on an inner face 712 of downwardly projected housing portion 510 of probe 500. A retaining ring 714 has internal threading 716 which is threadably received by threading 222 of probe 500 which then connects housing 504 tightly to probe 500 in a precise alignment (resulting from the kinematic seat 706).

While laser scanner 700 operates in a similar manner to laser scanner 600 of FIG. 38, scanner 700 has the advantage of being easily removably attachable to the additional axis probe 500 (as opposed to the more permanently attached laser scanners of FIGS. 24A and 38). Like the previously described laser scanner embodiments, the line laser scanner of FIGS. 40-48 provides a fully integrated scanning device comprised of the line laser, optical filters and digital camera, all of which are connected to a high-speed data communications protocol (i.e., FIREWIRE) to a digital image processor, a DSP processor and memory for image analysis and three dimensional analysis and finally to a communications processor for communication of the resulting data packet to the bus of the articulated arm of CMM 10 and ultimately to the host computer 172. Significantly, the laser scanner 700 will utilize the power supply which is already integrated into the arm of CMM 10. The only external cable necessary in this embodiment is a short cable from the scanner housing 704 to a connector on probe 500. This cable carries the power and signal bus connection for transmitting the data packet. Communication with the host CPU 172 is integrated within the articulated arm so that no external communications cable is required as in the prior art devices. Thus, the laser scanner of this invention allows the internal digital imaging processor board 620 to analyze imaging sensor data in real time with the results of such an analysis being communicated back to the host CPU with the coincident encoder position data. As discussed above, the prior art requires an external video processing unit and power supply which included cumbersome, bulky external cables.

In accordance with another feature of scanner 700, it is important that there be a rigid thermal and stable orientation between laser 602 and camera 605, as well as a thermally stable connection between the housing 704 and the additional axis probe 500. To that end, in accordance with a preferred embodiment, the internal construction of the frame 718 within housing 704 is made of a low coefficient of thermal expansion (CTE) material (for example, a mean CTE of between $1.0 \times 10^{-6}$ to $10 \times 10^{-6}$ in/in/° F.) which is preferably a metal alloy such as a steel/nickel alloy, for example Invar (preferably Invar 36). This metal frame 718 extends beyond the usually plastic housing 704 in the form of attachment ring 706 and allows the direct connection to the three point kinematic mount described above. As mentioned, the three point kinematic mount 710 is positioned at the base of the probe mount of the arm for receipt of scanner housing 704. In addition, it will be appreciated that the kinematic mount 710 may also receive any other externally mounted sensor as necessary.

The laser scanner of FIGS. 34-48 may not only be used with the CMMs described herein, but may be used with any other portable CMM having articulated arms such as described in the aforementioned U.S. Pat. Nos. 5,796,356 or 5,829,148 or those articulated CMM arms manufactured by Kosaka, Cimcore, Romer or others.

Figure 52:
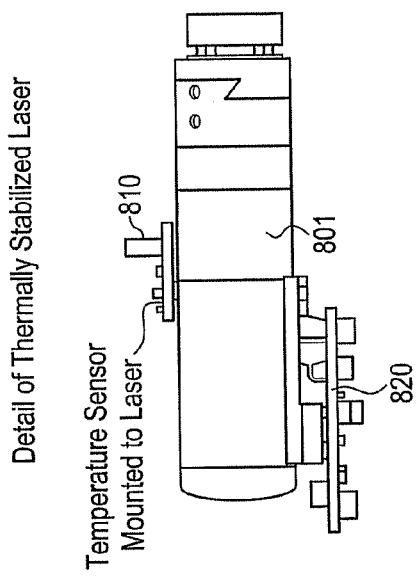
FIG. 52 is a side view of the thermally stabilized laser of FIG. 51.
Figure 51:
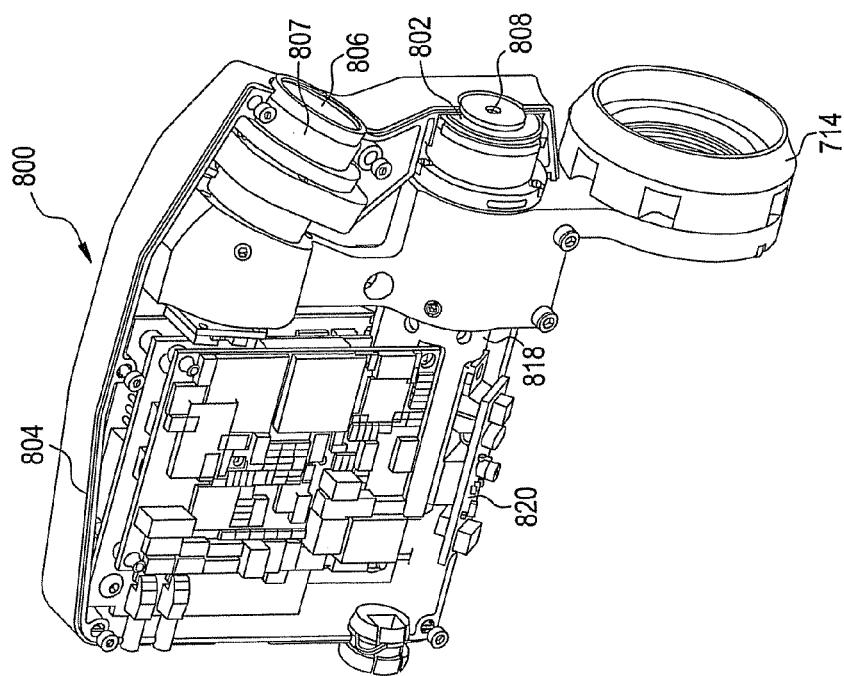
FIG. 51 is a perspective view of an additional embodiment having a thermally stabilized laser.

Turning to an additional embodiment, as shown in FIGS. 51-52, several additional features may be incorporated in comparison to the embodiment shown in FIG. 47. Elements which correspond to the elements shown in FIG. 47 have the identical reference numerals indicated herein in FIG. 51-52. The corresponding elements have been respectfully described above in connection with the embodiment of FIG. 47; however, the additional elements described below may be used with any of the above embodiments.

As shown in FIG. 51, laser scanner 800 includes a housing 804. Unlike the embodiment shown in FIG. 47 however, housing 804 does not include the CCD window 806, which may comprise a clear window for example, because in this embodiment, CCD window 806 is mounted directly to the lens assembly 807. This eliminates any potential for movement between CCD window 806 and lens assembly 807.

Figure 53:
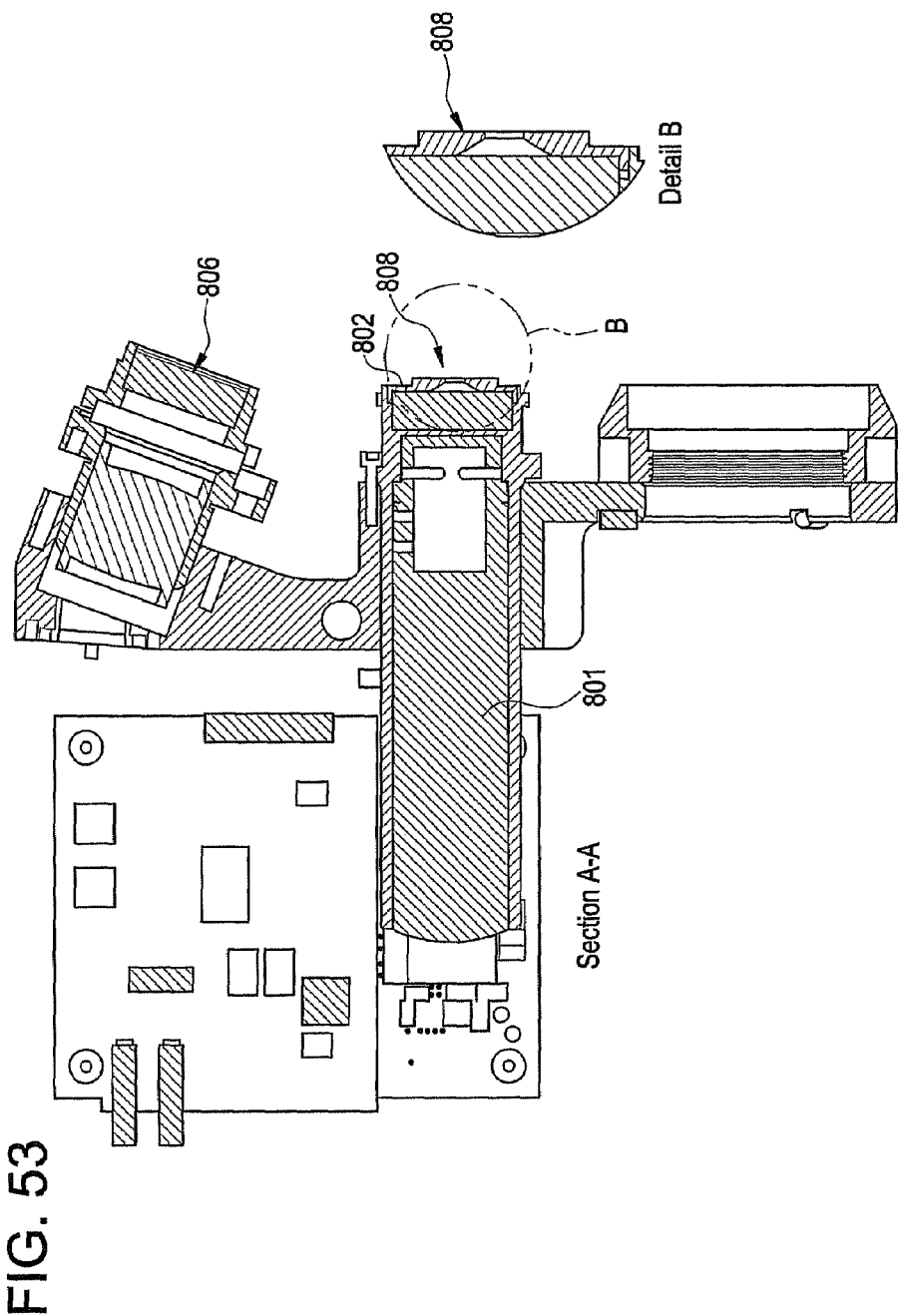
FIG. 53 is a cross-sectional side view of the line laser scanner of FIG. 51.
Figure 54:
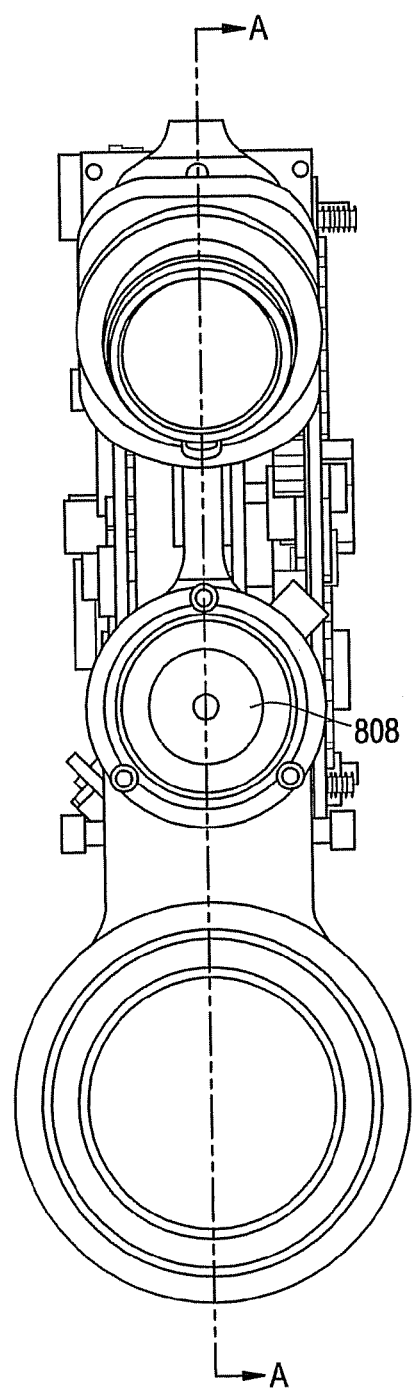
FIG. 54 is a front view of the line laser scanner of FIG. 51 taken along section A-A of FIG. 53.

Additionally as shown in FIGS. 51 and 53, a beam attenuator 808 has been added after the laser emitter window 802 to reduce the width of the scanning laser beam 604. The laser emitter window 802 may also be mounted directly to the scanning laser 801 or associated parts of the scanning laser 801 to reduce movement between the laser emitter window 802 and the scanning laser 801.

Also, as shown in FIG. 52, the scanning laser 801 is thermally stabilized in this embodiment and may include at least one temperature sensor 810 mounted to the scanning laser 801 for example and a heater assembly 820 for example, which with control electronics (not shown), control and stabilize the temperature of the scanning laser 801. A thermally insulated sleeve 818 may also be located proximate to the scanning laser 801 as shown in FIG. 52 for example.

Plane Calibration

Additionally, any of the embodiments described above may include a useful and time saving plane calibration method as software or hardware for example which also reduces manufacturing costs. As described below, the method calibrates the embodiment CMM by use of the both the ball probe 226 and the laser line scanner 800 using a single plane of reference. For example, 6 degrees of freedom of the position of the line laser scanner 800 may be found with respect to the last short joint 38 of the arm nearest the probe 226 may be found using a single plane of reference.

Figure 55:
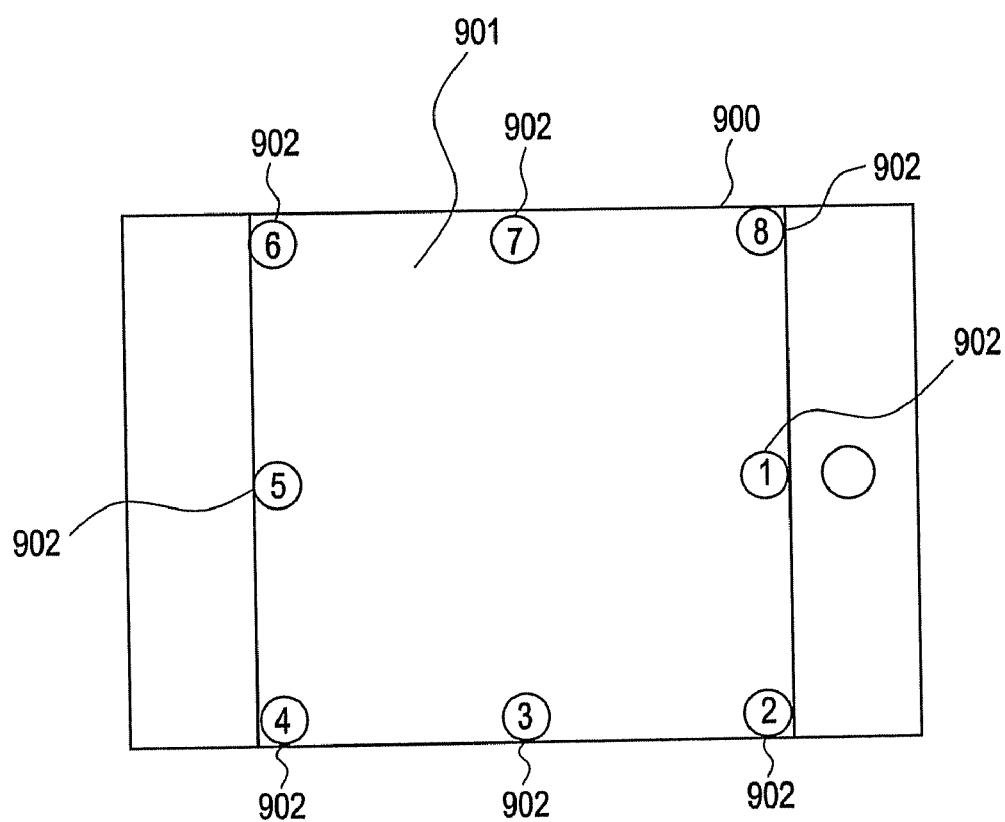
FIG. 55 is a top view of the calibration plate.

As shown in FIG. 55, to calibrate the CMM, a calibration plate 900 will be digitized, first using the ball probe 226, and then second using the laser line scanner 800.

Using the all probe 226, the white area 901 of the Calibration Plate 900 will be digitized with the ball probe 226 touching the white surface with the ball probe and digitizing eight points 902 on the white area 901 surface. Next, the ball probe is moved away from the white area 901. The flatness of the white area 901 surface is calculated and the results are displayed in a dialog box (not shown).

Figure 56:
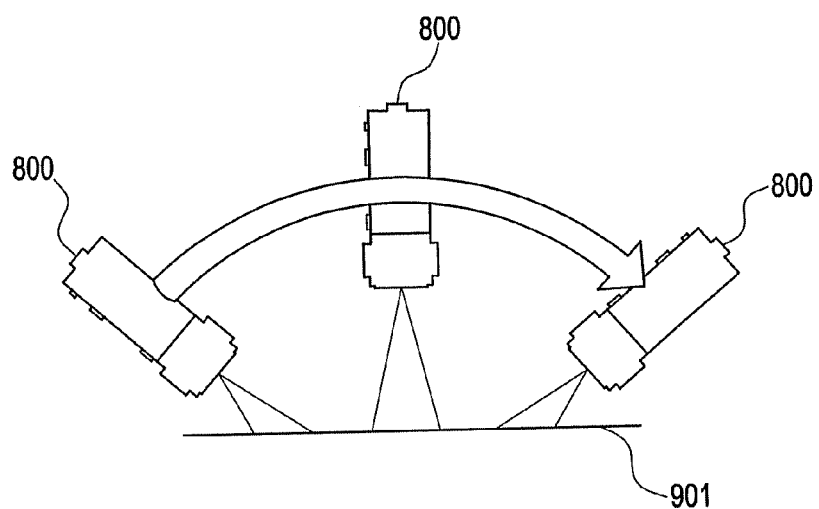
FIG. 56 is side view of the line laser scanner moving about the calibration plate.

Next, as shown in FIG. 56, the white area 901 of the calibration plate 900 is digitized using with the laser line scanner 800 also known as the Laser Line Probe (LLP). First, the laser is aimed at the middle of the white area 901 surface. The laser line scanner 800 is moved until the laser is pointed in the center range by moving the laser line scanner 800 to the center of the white area surface 901 in relation to the eight points 902.

Figure 57:
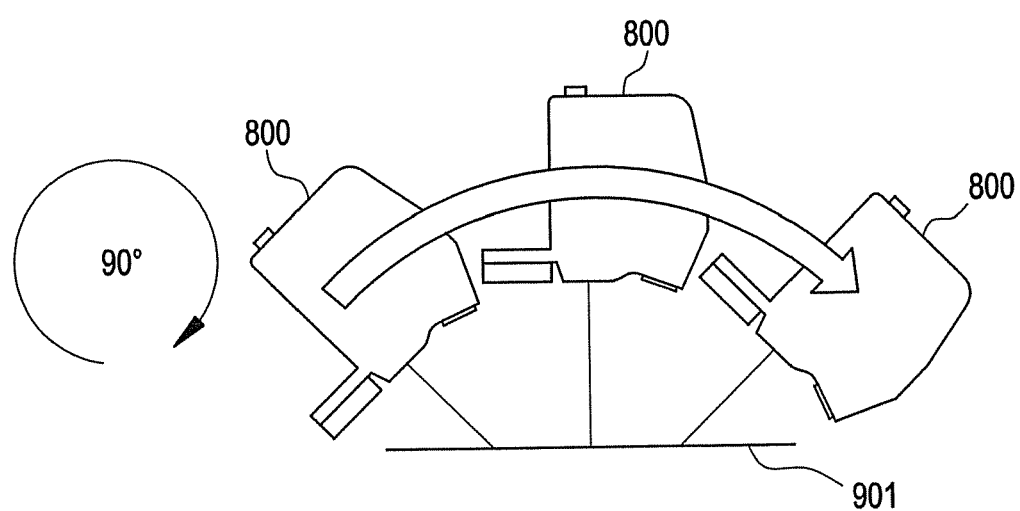
FIG. 57 is side view of the line laser scanner rotated 90 degrees from the position FIG. 56 moving about the calibration plate.

Next as shown in FIG. 57, the laser line scanner 800 is rotated 90° and the process above is repeated.

Figure 58:
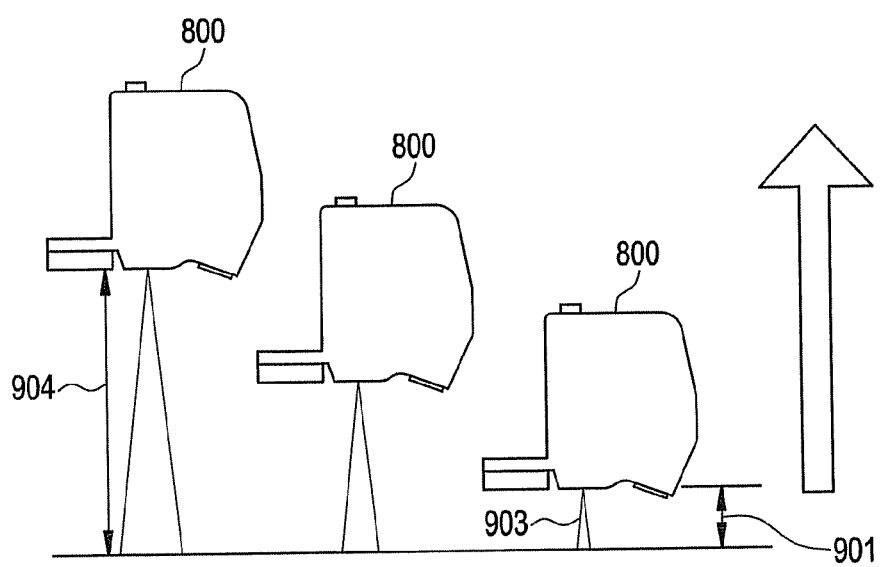
FIG. 58 is side view of the line laser scanner moving about the calibration plate.

Next as shown in FIG. 58, the laser line scanner 800 is aimed at the middle of the white surface 901 as above. However, the laser line scanner 800 is moved towards the white surface 901 until the laser is in the Near Range 903, i.e., close to the surface of the white area 901. Then the laser line scanner 800 is moved to the Far Range 904 while pointing to the center of the white surface.

The calibration points are then calculated and the probe Calibration Status is updated. If the probe passes, then the current date and time is added to the probe information.

DRO

An embodiment software package may add a Digital ReadOut (DRO) Window to the screen. The DRO window displays the current location of the probe in the current coordinate system.

If the Laser Line Probe (LLP) is in range, the X, Y, Z coordinate is the center of the laser line. Note that this may not be the center of the complete laser line because some part of the laser line may be out of range.

One of ordinary skill in the art can appreciate that a computer or other client or server device can be deployed as part of a computer network, or in a distributed computing environment. In this regard, the methods and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different power plants or different power generator units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus of described above and/or claimed herein. Further, any storage techniques used in connection with the methods and apparatus described above and/or claimed herein may invariably be a combination of hardware and software.

While preferred embodiments have been shown and described, various modifications and substitutions may be made thereto without departing from the spirit and scope of the invention. Accordingly, it is to be understood that the present invention has been described by way of illustrations and not limitation.

This written description uses examples to disclose the invention, including the best mode, and also to enable any person skilled in the art to make and use the invention. The patentable scope of the invention is defined by the claims, and may include other examples of devices, methods, and articles of manufacture that occur to those skilled in the art. Such other examples are intended at least to be within the scope of the claims if they have structural elements that do not differ from the literal language of the claims, or if they include equivalent structural elements with insubstantial differences from the literal languages of the claims and/or as allowed by law.

Furthermore, the skilled artisan will recognize the interchangeability of various features from different embodiments. Similarly, the various features described, as well as other known equivalents for each feature, can be mixed and matched by one of ordinary skill in this art.

What is claimed is:

1. A portable coordinate measurement machine (CMM) for measuring the position of an object in a selected volume, comprising:
    a manually positionable articulated arm having opposed first and second ends, said arm including a plurality of jointed arm segments, each arm segment including at least one position transducer for producing a position signal;
    a thermally stabilized laser scanner at said first end of said arm;
    an electronic circuit which receives the position signals from the transducers and provides a digital coordinate corresponding to the position of the first end of said arm in a selected volume; and
    at least one internally positioned bus within said articulated arm for internally transmitting at least one of power and data signals to said laser scanner, said laser scanner including circuitry communicating with said at least one bus.

2. The CMM of claim 1 further comprising:
    at least one attenuator located to reduce the width of a laser line emitted from the thermally stabilized laser.

3. The CMM of claim 1 further comprising:
    at least one clear window mounted on the thermally stabilized laser scanner.

4. The CMM of claim 1 further comprising:
    a handle extending from said first end of said arm.

5. The CMM of claim 1 wherein said first end of said arm includes three degrees of freedom and wherein one of said three degrees of freedom is a rotation axis for rotating said thermally stabilized laser scanner.

6. The CMM of claim 5 wherein said CMM includes three additional degrees of freedom such that said jointed arm segments have degrees of freedom in a 2-1-3 configuration.

7. The CMM of claim 5 wherein said CMM includes four additional degrees of freedom such that said jointed arm segments have degrees of freedom in a 2-2-3 configuration.

8. The CMM of claim 1 wherein said at least one bus comprises a serial communications bus and wherein said thermally stabilized laser scanner is connected to said bus.

9. The CMM of claim 8 wherein said serial communications bus is RS-485 type.

10. The CMM of claim 1 wherein:
    said laser scanner is detachably mounted onto said first end of said arm.

11. The CMM of claim 1 further comprising:
    a kinematic mount for detachably mounting said thermally stabilized laser scanner to said first end of said arm.

12. The CMM of claim 1 wherein said laser scanner includes a scanner housing for housing a laser and a camera, said housing being mounted to said first end of said arm.

13. The CMM of claim 12 wherein said scanner housing is permanently mounted to said first end of said arm.

14. The CMM of claim 12 wherein said scanner housing is detachably mounted to said first end of said arm.

15. The CMM of claim 12 wherein at least said laser and camera are mounted on a low CTE frame.

16. The CMM of claim 15 wherein said low CTE frame comprise a steel/nickel alloy.

17. The CMM of claim 16 wherein said steel/nickel alloy comprises Invar.

18. The CMM of claim 1 wherein said laser scanner further comprises:
    a digital interface communicating with said camera;
    a digital signal processor (DSP) communicating with said digital interface for processing images from said scanner;
    a memory communicating with said DSP; and
    a communications processor communicating with said DSP.

19. The CMM of claim 17 wherein said digital interface comprises:
    a high speed data communications interface for communicating between said camera and said digital interface.

20. The CMM of claim 17 wherein:
    said high speed data communications interface uses a Firewire data format.

21. The CMM of claim 1 wherein said at least one bus transmits both power and data signals.

22. The CMM of claim 1 wherein said arm includes circuitry for simultaneously transmitting data from said transducers and from said laser scanner to a host computer.

23. The CMM of claim 1 wherein said laser scanner includes on-board image processing circuitry which converts image data to dimensional data.

24. The CMM of claim 21 wherein said dimensional data is transferred using said at least one bus.

25. The CMM of claim 16 wherein said DSP includes on-board image processing circuitry which converts image data to dimensional data.

26. The CMM of claim 1 wherein said laser scanner includes on-board image processing circuitry which generates processed data, such processed data being in an amount which is smaller than the amount of data associated with the original data derived from the image received from said camera.

27. A portable coordinate measurement machine (CMM) for measuring the position of an object in a selected volume, comprising:
    a manually positionable articulated arm having opposed first and second ends, said arm including a plurality of jointed arm segments, each arm segment including at least one position transducer for producing a position signal;
    a laser scanner at said first end of said arm;
    at least one clear window mounted on the laser scanner;
    an electronic circuit which receives the position signals from the transducers and provides a digital coordinate corresponding to the position of the first end of said arm in a selected volume; and
    at least one internally positioned bus within said articulated arm for internally transmitting at least one of power and data signals to said laser scanner, said laser scanner including circuitry communicating with said at least one bus; wherein said laser scanner includes at least one attenuator located to reduce the width of a laser line emitted from the laser.

28. A method for calibrating a coordinate measurement machine (CMM) for measuring the position of an object, comprising:

digitizing a calibration plate using a ball probe, and also using a laser line scanner which are both attached to the CMM comprising:

touching the ball probe to an area of the calibration plate and digitizing a plurality of reference points on the surface;

calculating the flatness of the surface from the position of the reference points;

aiming the laser line scanner at the center of the surface of the calibration plate in relation to the plurality of reference points;

rotating the laser line scanner 90° and aiming the laser line scanner at the center of the surface of the calibration plate in relation to the plurality of reference points;

aiming the laser line scanner at the center of the surface of the calibration plate in relation to the plurality of reference points and moving the laser line scanner towards the surface to a range close to the surface of the calibration plate; and moving the laser line scanner away from the surface of the calibration plate while pointing to the center of the surface; and calculating calibration points for the line laser scanner from the position of the reference points in relation to the laser scanner aiming ad rotating steps performed above; and updating a stored probe calibration status of the ball probe.

* * * * *